(12) United States Patent
Lamport et al.

(10) Patent No.: US 7,249,280 B2
(45) Date of Patent: Jul. 24, 2007

(54) CHEAP PAXOS

(75) Inventors: Leslie B. Lamport, Palo Alto, CA (US); Michael T. Massa, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 585 days.

(21) Appl. No.: 10/872,338

(22) Filed: Jun. 18, 2004

(65) Prior Publication Data

US 2005/0283659 A1    Dec. 22, 2005

(51) Int. Cl.
*G06F 11/00* (2006.01)

(52) U.S. Cl. .................. 714/11; 714/4; 714/7; 714/10; 714/12

(58) Field of Classification Search .............. 714/4–8, 714/10–14; 709/220–222
See application file for complete search history.

(56) References Cited

U.S. PATENT DOCUMENTS

| | | | | |
|---|---|---|---|---|
| 5,261,085 | A | * | 11/1993 | Lamport ..................... 714/4 |
| 6,108,699 | A | * | 8/2000 | Moiin ........................ 709/221 |
| 6,192,401 | B1 | * | 2/2001 | Modiri et al. ............... 709/220 |
| 6,671,821 | B1 |   | 12/2003 | Castro et al. |
| 2003/0023680 | A1 | * | 1/2003 | Shirriff ...................... 709/204 |

OTHER PUBLICATIONS

Neilsen-M-L, A dynamic probe strategy for quorum systems, IEEE, Abstract.*

Lamport, Leslie, "Time, Clocks, and the Ordering of Events in a Distributed System", *Communication of the ACM*, 21(7):558-565, Jul. 1978.

Lamport, Leslie, "The Part-Time Parliament", *ACM Transactions on Computer Systems* 16, 2 (May 1998), pp. 133-169. Also appeared as SRC Research Report 49.

Lamport, Leslie, "Paxos Made Simple", *ACM SIGACT* News (Distributed Computing Column), 32,4 (Whole No. 121, Dec. 2001) pp. 18-25.

Lampson, Butler W., "The ABCD's of Paxos", Presented at *Principles of Distributed Computing*, 2001, as one of the papers celebrating Leslie Lamport's 60th Birthday, retrieved from http://research.microsoft.com/lampson/65-ABCDPaxos/Acrobat.pdf.

Castro, Miguel, et al., "Practical Byzantine Fault Tolerance", appears in *Proceedings of the Third-Symposium on Operating Design and Implementation*, New Orleans, USA, Feb. 1999, pp. 1-14.

(Continued)

*Primary Examiner*—Robert Beausoliel
*Assistant Examiner*—Charles Ehne
(74) *Attorney, Agent, or Firm*—Woodcock Washburn LLP

(57) ABSTRACT

A distributed computing system can be operated in a fault tolerant manner using a collection of auxiliary computing devices and more main computing devices than the number of faults the system can tolerate. A quorum of all of the main computing devices can be used. In the event of a failure, an alternative quorum from a selected set of quorums, comprising at least one main computing device and some or all of the auxiliary computing devices, can be used to complete pending operations and to select a new set of quorums. Alternatively, another state machine, comprising at least one main computing device and some or all of the auxiliary computing devices, can select a new quorum comprising the currently operating main computing devices, and the new quorum can then complete pending operations and can continue to select proposals using the proposal number assigned by the other state machine.

39 Claims, 51 Drawing Sheets

OTHER PUBLICATIONS

Castro, Miguel, et al., "Proactive Recovery in a Byzantine-Fault-Tolerant System", appears in the *Proceedings of the Fourth Symposium on Operating Systems Design and Implementation* (OSDI '00), San Diego, USA, Oct. 2000, pp. 1-15.

Huang, Yennun, et al., "Software Rejuvenation: Analysis, Module and Applications", *Proc. International Symposium on Fault Tolerant Computing*, pp. 381-390, (1995).

Bracha, Gabriel, "An asynchronous $\lfloor(\eta-1)/3\rfloor$-resilient consensus protocol" this paper was presented at the *ACM Symposium on Principles of Distributed Computing* 1984, pp. 154-162.

Keidar, Idit, et al., "Moshe: A Group Membership Service for WANs" to appear in *ACM Transactions on Computer Systems* (*TOCS*), Aug. 2002, pp. 1-47.

Khazan, Roger, I., "A One-Round Algorithm for Virtually Synchronous Group Communication in Wide Area Networks", PH.D. dissertation, Department of Electrical Engineering and Computer Science. MIT., May 22, 2002. Thesis Supervisors: Prof. Nancy A. Lynch and Dr. Idit Keidar. Retrieved from http://theroy.1cs.mit.edu/~roger/Research/Papers /khazan-phd.pdf.

Anceaume et al., "Converging Toward Decision Conditions" *6th International Conference on Principles of Distributed Systems*, France, pp. 53-63 (Dec. 11-13, 2002).

Mostefaoui et al., "IRISA Research Report No. 1355" (Oct. 2000).

Brasileiro et al., "IRISA Research Report No. 1321" (Apr. 2000).

Schneider, F.; Implementing Fault-tolerant Services Using the State Machine Approach: A Tutorial; *Computing Surveys*, 22(3):299-319, Sep. 1990.

Deswarte, Y. et al; Intrusion Tolerance in Distributed Computing Systems; *Proceedings of the 1991 IEEE Symposium on Research in Security and Privacy*; pp. 110-121, May 1991.

Canetti, R. et al.; Fast asynchronous Byzantine agreement with optimal resilience; *Prcc. 25th Annual ACM Symposium on Theory of Computing* (*STOC*), pp. 42-51, 1993.

Reiter, M; How to Securely Replicate Services; *ACM Transactions on Programming Languages and Systems*, vol. 16, No. 3, pp. 986-1009, May 1994.

Reiter, M. K.; Secure Agreement Protocols: Reliable and Atomic Group Multicast in Rampart; *Proceedings of the 2nd ACM Conference on Computer and Communications Security*, pp. 68-80, Fairfax, Virginia, Nov. 1994.

Gong, L. et al.; Byzantine Agreement With Authentication: Observations and Applications in Tolerating Hybrd and Link Faults; *Dependable Computing for Critical Applications—5*, pp. 79-90, IFIP WG 10.4, preliminary proceedings, 1995.

Reiter, M. K.; The Rampart toolkit for building high-integrity services; *Theory and Practice in Distributed Systems, International Workshop, Selected Papers, Lecture Notes in Computer Science*, vol. 938, K. P. Birman, F. Mattern, and A. Schiper, Eds., Springer-Verlag, Berlin, 99-110, 1995.

Reiter, M. K.; Distributing Trust With the Rampart Toolkit; *Communications of the ACM*; 39, 4 pp. 71-74, Apr. 1996.

Malkhi, D. et al.; A High-Thoughput Secure Reliable Multicast Protocol; *Proceedings of the 9th Computer Security Foundations Workshop*, Kenmore, Ireland, pp. 9-17, Jun. 1996.

Malkhi, D. et al.; A High-Throughput Secure Reliable Multicast Protocol; *Journal of Computer Security*. Also in *Proceedings of the 9th IEEE Computer Security Foundations Workshop*, pp. 9-17, Jun. 1996.

Malkhi, D. et al.; Byzantine Quorum Systems; *Proceedings of the 29th ACM Symposium on Theory of Computing*, May 1997.

Malkhi, D. et al.; The Load and Availability of Byzantine Quorum Systems; *Proceedings 16th ACM Symposium on Principles of Distributed Computing* (*PODC*), pp. 249-257, Aug. 1997.

Kihlstrom, K. P. et al.; Solving Consensus in a Byzantine Environment Using an Unreliable Fault Detector; *Proceedings of the International Conference on Principles of Distributed Systems* (*OPODIS'97*), Hermes, Chantilly, France, 61-76, 1997.

Kihlstrom, K. P. et al.; The SecureRing Protocols for Securing Group Communication; *Proceedings of the 31st Hawaii International Conference on System Sciences*, vol. 3, pp. 317-326, Jan. 1998.

Malkhi, D. et al.; Secure and Scalable Replication in Phalanx; *Proceedings of the 17th IEEE Symposium on Reliable Distributed Systems*; p. 51-58, West Lafayette, Indiana, USA, Oct. 1998.

Malkhi, D. et al.; Byzantine Quorum Systems; *Distributed Computing*; vol. 11, No. 4, p. 203-213, 1998.

Goldberg, A. et al.; Towards on Archival Intermemory; *International Forum on Reserach and Technology Advances in Digital Libraries*; IEEE, pp. 147-156, 1998.

Hartman, J.H. et al.; The Swarm Scalable Storage System; *19th ICDCS*; pp. 74-81, 1999.

Guerraoui, Rachid et al.; *Reducing the Cost for Non-Blocking in Atomic Commitment*; Département d'Informatique, Ecole Polytechnique Fedérale de Lausanne; May 1996; pp. 1-11.

Hayashibara, Noahiro et al.; *Performance Comparison Between the Paxos and Chandra-Toueg Consensus Algorithms*; Département d'Informatique, Ecole Polytechnique Fedérale de Lausanne; Technical Report IC-2002-61; Aug. 2002; pp. 1-11.

Awerbuch, Baruch et al.; *Maintaining Database Consistency in Peer to Peer Networks*; Department of Computer Science, John Hopkins University; Technical Report CNDS-2002-1; Feb. 6, 2002; pp. 1-14.

Birrell, Andrew D. et al.; *The Echo Distributed File System*; Digital Equipment Corp. Systems Research Center; Technical Report 111; Sep. 10, 1993; pp. 1-22.

Liskov, Barbara et al.; *Replication in the Harp File System*; Proceedings of the 13th Symposium on Operating System Principles; Oct. 1991; 13 pp.

Hisgen, Andy et al.; *New-Value Logging in the Echo Replicated File System*; Digital Equipment Corp. Systems Research Center, Research Report 104; Jun. 1993; pp. 1-39.

Long, Darrell D.E. et al.; *Voting with Regenerable Volatile Witnesses*; University of California Computer and Information Sciences; Technical Report; Apr. 1990; pp. 1-20.

Swart, Garret et al.; *Availability in the Echo File System*; Digital Equipment Corp. Systems Research Center, Research Report 112; Sep. 1993; pp. 1-43.

Adya, A., et al.; FARSITE: Federated, Available, and Reliable Storage for an Incompletely Trusted Environment.; *In Proc. 5th OSDI*, Boston, MA, pp. 1-14, Dec. 2002.

Castro, M., *Practical Byzantine Fault Tolerance*; Ph.D. Thesis Technical Report MIT-LCS-TR-817, MIT, Jan. 2001.

Chockler, G. V., et al., Group Communication Specifications: A Comprehensive Study; *ACM Computing Surveys*, pp. 33(4):427-469, Dec. 2001.

Deprisco, R., et al., Revisiting the Paxos Algorithm; *In Proc. 11th Int'l Workshop on Distributed Algorithms*, pp. 111-125, Sep. 1997.

Lamport, L., Using Time Instead of Timeout for Fault Tolerance in Distributed Systems; *ACM Transactions on Programming Languages and Systems* (*TOPLAS*), pp. 6(2):264-280, Apr. 1984.

Lamport, L., et al. Cheap Paxos; *In Proc. International Conference on Dependable Systems and Networks* (*DSN*), Florence, Italy, 2004.

Lynch, N., et al., RAMBO: A Reconfigurable Atomic Memory Service for Dynamic Networks; *In Proc. 16th International Symposium on Distributed Computing*, Toulouse, France, pp. 173-190, Oct. 2002.

Narasimhan, P., et al., *Replica Consistency of CORBA Objects in Partitionable Distributed Systems*, 1997.

Oki, B.M., *Viewstamped Replication for Highly Available Distributed Systems*; Ph.D. Thesis Technical Report MIT/LCS/TR-423, MIT, Aug. 1988.

Oki, B.M., et al., Viewstamped Replication: A New Primary Copy Method to Support Highly-Available Distributed Systems; *In Proc. 7th Symposium on Principles of Distributed Computing*, Aug. 1988, pp. 8-17.

Rodrigues, R., et al., BASE: Using Abstractions to Improve Fault Tolerance; *In Proc. 18th ACM Symposium on Operating System Principles*, Bantt, Canada, pp. 15-28, Oct. 2001.

Schneider, F.B., Synchronization in Distributed Programs; ACM Transactions on Programming Languages and Systems (TOPLAS; pp. 4(2):125-148.), Apr. 1982.

Yu, H., et al., Consistent and Automatic Replica Regeneration; *In Proc. 1st NSDI*, San Francisco, pp. 323-236, 2004.

Pedone, F., et al., Handling Message Semantics with Generic Broadcast Protocols, *Distributed Computing 15*, pp. 97-107, 2002.

Cukier, M., et al., AQuA: An Adaptive Architecture that Provides Dependable Distributed Objects, *In Proc. 17th Symposium on Reliable Distributed Systems*, pp. 245-253, West Lafayette, IN, Oct. 1998.

Cukier, M., et al., AQuA: An Adaptive Architecture that Provides Dependable Distributed Objects, *IEEE Transactions on Computers*, vol. 52, No. 1, pp. 31-50, Jan. 2003.

Charron-Bost, Bernadette, et al., Uniform Consensus is Harder than Consensus (extended abstract), *Technical Report DSC/2000/028*, Switzerland, May 2000.

DePrisco, Robert, et al., Revisiting the PAXOS Algorithm, *Theoretical Computer Science*, 243:35-91, 2000.

Fischer, Michael J., et al., Impossibility of Distributed Consensus with One Faulty Process, *Journal of the ACM*, 32(2):374-382, Apr. 1985.

Lamport, Leslie, Lower Bounds for Asynchronous Consensus, in *Future Distributed Computing, vol. 2584 of Lecture Notes in Computer Science*, pp. 22-23, Spring 2003.

Mazurkiewicz, A., *Semantics of Concurrent Systems; A Modular Fixed-Point Trace Approach*; Institute of Computer Science, Poland, pp. 353-375.

Keidar, Idit, et al.; On the Cost of Fault-Tolerant Consensus When There Are No Faults—A Tutorial; SIGACT News 32(2), Distributed Computing column, pp. 45-63; Jun. 2001.

Dwork, Cynthia, et al.; Consensus in the Presence Of Partial Synchrony; *Journal of ACM*, 35(2):288-323, Apr. 1988.

Lampson, Butler W.; How to Build a Highly Available System Using Consensus; http://www.research.microsoft.com.

Lamport, Leslie; The Implementation of Reliable Distributed Multiprocess Systems; *Computer Networks*, 2:95-114, 1978.

Lamport, Leslie, et al.; The Byzantine Generals Problem; ACM Transactions on Programming Languages and Systems, vol. 4, No. 3, Jul. 1982, pp. 382-401.

\* cited by examiner

CHEAP PAXOS

RELATED APPLICATION

This application is related to co-pending U.S. application entitled "Cheap Paxos", Ser. No. 10/872,339, which was filed on the same date as the present application.

FIELD OF THE INVENTION

This invention relates generally to distributed computing and, more particularly, relates to fault tolerant distributed computing using both main and auxiliary devices.

BACKGROUND

As personal computing devices become more powerful, containing increased storage space and processing capabilities, the average user consumes an increasingly smaller percentage of those resources in performing everyday tasks. Thus, many of today's personal computing devices are often not used to their full potential because their computing abilities greatly exceed the demands most users place upon them. An increasingly popular method of deriving use and value from the unused resources of powerful modern personal computing devices is a distributed computing system, in which the computing devices act in coordination with one another to provide more reliable access to data and computational resources.

In addition to providing a useful mechanism for using excess computing capacity, distributed systems can also be composed of dedicated inexpensive computing devices in order to achieve the performance and storage capabilities of a larger, more-expensive computing device. A further advantage of distributed systems is the ability to continue to operate in the face of physical difficulties that would cripple a single, larger computing device. Such difficulties could include: sustained power outages, inclement weather, flooding, terrorist activity, and the like.

To compensate for the increased risk that individual member computing devices may become disconnected from the network, turned off, suffer a system malfunction, or otherwise become unusable, redundancy can be used to allow the distributed computing system to remain operational. Thus, the information stored on any one personal computing device can be redundantly stored on at least one additional personal computing device, allowing the information to remain accessible, even if one of the personal computing devices fails.

A distributed computing system can practice complete redundancy, in which every device within the system performs identical tasks and stores identical information. Such a system can allow users to continue to perform useful operations even if all but one of the devices should fail. Alternatively, such a system can be used to allow multiple copies of the same information to be distributed throughout a geographic region. For example, a multi-national corporation can establish a world-wide distributed computing system.

However, distributed computing systems can be difficult to maintain due to the complexity of properly synchronizing the individual devices that comprise the system. Because time-keeping across individual processes can be difficult at best, a state machine approach is often used to coordinate activity among the individual devices. A state machine can be described by a set of states, a set of commands, a set of responses, and client commands that link each response/state pair to each command/state pair. A state machine can execute a command by changing its state and producing a response. Thus, a state machine can be completely described by its current state and the action it is about to perform, removing the need to use precise time-keeping.

The current state of a state machine is, therefore, dependent upon its previous state, the commands performed since then, and the order in which those commands were performed. To maintain synchronization between two or more state machines, a common initial state can be established, and each state machine can, beginning with the initial state, execute the identical commands in the identical order. Therefore, to synchronize one state machine to another, a determination of the commands performed by the other state machine needs to be made. The problem of synchronization, therefore, becomes a problem of determining the order of the commands performed, or, more specifically, determining the particular command performed for a given step.

One mechanism for determining which command is to be performed for a given step is known as the Paxos algorithm. In the Paxos algorithm, any of the individual devices can act as a leader and seek to propose a given client command for execution by every device in the system. Every such proposal can be sent with a proposal number to more easily track the proposals. Such proposal numbers need not bear any relation to the particular step for which the devices are attempting to agree upon a command to perform. Initially, the leader can suggest a proposal number for a proposal the leader intends to submit. Each of the remaining devices can then respond to the leader's suggestion of a proposal number with an indication of the last proposal they voted for, or an indication that they have not voted for any proposals. If, through the various responses, the leader does not learn of any other proposals that were voted for by the devices, the leader can propose that a given client command be executed by the devices, using the proposal number suggested in the earlier message. Each device can, at that stage, determine whether to vote for the action or reject it. A device should only reject an action if it has responded to another leader's suggestion of a higher proposal number. If a sufficient number of devices, known as a quorum, vote for the proposal, the proposed action is said to have been agreed upon, and each device performs the action and can transmit the results. In such a manner, each of the devices can perform actions in the same order, maintaining the same state among all of the devices.

Generally, the Paxos algorithm can be thought of in two phases, with an initial phase that allows a leader to learn of prior proposals that were voted on by the devices, as described above, and a second phase in which the leader can propose client commands for execution. Once the leader has learned of prior proposals, it need not continually repeat the first phase. Instead, the leader can continually repeat the second phase, proposing a series of client commands that can be executed by the distributed computing system in multiple steps. In such a manner, while each client command performed by the distributed computing system for each step can be thought of as one instance of the Paxos algorithm, the leader need not wait for the devices to vote on a proposed client command for a given step before proposing another client command for the next step.

The distributed computing system, as a whole, can be modeled as a state machine. Thus, a distributed computing system implementing complete redundancy can have each of the devices replicate the state of the overall system. Such a system requires that each device maintain the same state. If some devices believe that one client command was executed, while a second group of devices believes that a different client command was executed, the overall system no longer operates as a single state machine. To avoid such a situation, a majority of the devices can be generally required to select a proposed client command for execution by the system. Because any two groups of devices, each having a majority, must share at least one device, mechanisms, such as the Paxos algorithm, can be implemented that rely on the at least one common device to prevent two groups, each containing a majority of devices, from selecting different proposed client commands.

However, the Paxos algorithm requires a substantial number of computing devices to tolerate failures and continue to operate properly. Specifically, to implement a system that can tolerate a certain number of failures, the Paxos algorithm uses more than twice that number of computing devices to implement the system. While computing devices continually provide greater processing and storage capabilities at ever decreasing cost, there remains an unwillingness to purchase more computing devices than twice the maximum number of failures for which the system will be designed. Often, such a large number of computing devices appears inefficient to those who must ultimately approve the expenditure.

BRIEF SUMMARY OF THE INVENTION

Therefore, in one embodiment of the present invention, a system can implement a modified Paxos algorithm using a collection of main computing devices that has only one computing device more than the maximum number of failures for which the system will be designed, together with a collection of auxiliary computing device that can be used in the event of a failure of one or more of the main computing devices.

In another embodiment, a modified Paxos algorithm is presented in which a quorum of main computing devices can be used until one of the main computing devices experiences a failure, whereupon a leader can use another quorum, comprising at least one main computing device and a sufficient number of auxiliary computing devices, in order to select commands and to select a new set of quorums comprised of either all of the currently functioning main computing devices or any majority of all of the computing devices, so long as that majority contains at least one main computing device In a further embodiment, a modified Paxos algorithm is presented in which one state machine, implemented by a quorum of main computing devices, can be used until one of the main computing devices experiences a failure, whereupon another state machine, comprising a sufficient number of computing devices, either main or auxiliary, can be used to select a new quorum for the first state machine comprising the currently functioning main computing devices.

In a still further embodiment, the burden placed on the auxiliary computing devices can be further decreased by limiting the processing performed by the auxiliary computing devices, and limiting the amount of information stored by the auxiliary computing devices, including storing hash values of proposed commands, rather than the complete command.

Although the description herein focuses primarily on the operation of computing devices in a distributed computing system, it will be appreciated that the description is equally applicable to processes running on a single computing device, such as on separate processors or in separate memory spaces. Thus, additional embodiments include the operation of the modified Paxos algorithm in multiple processor environments, whether the multiple processors are physically located in one or more computing devices, and in multiple virtual machine environment, whether the multiple virtual machines are being executed by one or more computing devices. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
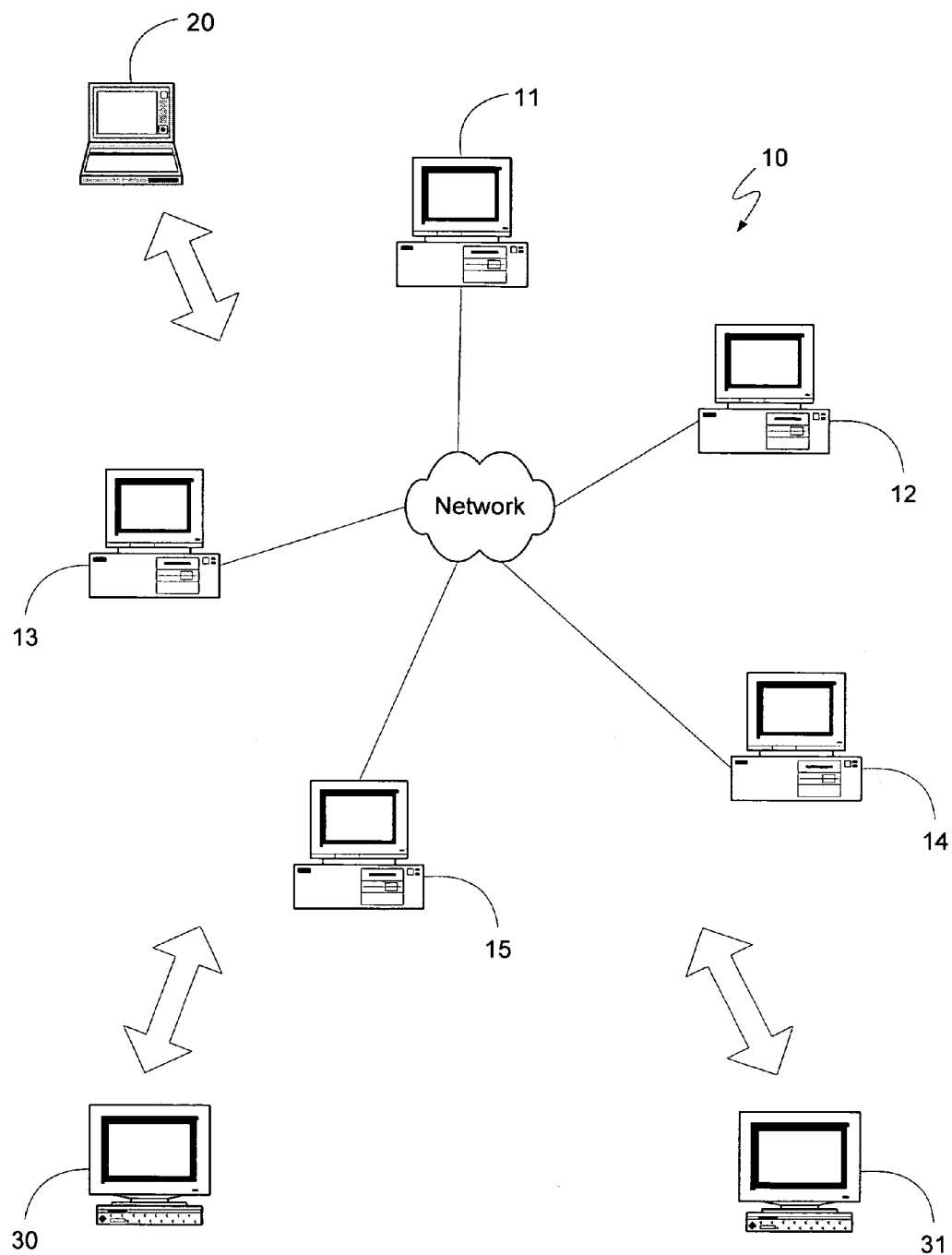
FIG. 1 is a block diagram generally illustrating an exemplary distributed computing system with which an embodiment of the present invention can be implemented.

A distributed computing system can comprise a number of individual personal computing devices, server computing devices, or other devices that have sufficient processor and storage abilities to participate in the system. The distributed computing system can aggregate the abilities of its constituent computing devices to either provide for greatly increased processing capabilities and storage space, or to implement redundancy, allowing multiple devices to provide access to the same information. Thus, one common usage for a distributed computing system is the aggregation of the unused processing capabilities and storage space of many different personal computing devices attached to a common network. Such a distributed computing system can maintain information regarding the system, such as which devices are currently part of the system and on which device a given set of information is stored. This information can be necessary for the devices to aggregate their capabilities and storage space and, as a result, each device may contain a copy. Synchronization of the information among the devices of the system can be facilitated through a state machine approach as described below.

Alternatively, an increasingly common usage for distributed computing systems is that of a network server that can act as a central storage repository for various forms of information. Such a distributed system seeks to replicate the central store on all of its constituent devices so that every client seeking to communicate with the central storage can find a convenient and efficient device with which to communicate. Furthermore, because of the distributed nature of the system, local events such as power outages, floods, political unrest, and the like may only affect a few computing devices, allowing the overall system to continue to operate properly and provide access to information and other services to clients.

Such a distributed computing system can be thought of as a state machine, with the future state of the machine defined by the current state and the action to be taken. Each constituent device of the distributed computing system can then independently execute the state machine of the overall system. The state-machine approach can be implemented asynchronously; so that precise synchrony across the constituent devices need not be maintained and synchronization between the devices can be achieved by setting an initial state for all of the devices and subsequently executing the same functions in the same order. A common method for maintaining synchronization is to allow the constituent devices of the distributed computing system to all agree upon the next function before executing that function, and to maintain a list of the functions that were executed. In such a manner, every device can have the same state and if a device fails it need only determine the last function it executed, identify, from the list, any functions that have been agreed upon since that last function, and execute those functions.

A distributed computing system acting as a server can be especially useful for serving a large amount of information to a diverse set of clients, such as a central database for a multi-national corporation, or a popular World Wide Web site. In such situations, a large number of clients can request information from the distributed computing system acting as a server. By implementing the server functionality across multiple devices, more clients can be serviced in parallel, thereby increasing the throughput of the overall system, and the server as a whole is far less prone to failure due to the increased redundancy.

One mechanism by which the constituent computing devices can agree upon the next function to execute is known as the Paxos algorithm. In the Paxos algorithm, as will be described further below, any device can act as a leader and transmit a suggestion for a proposal number to other devices within the distributed computing system. The other devices can respond with either an indication of the proposal having the largest proposal number for which that device has already voted or an indication that the device has not voted for any previous proposals. Once the leader receives the responses from the other devices, it can determine which function to propose and request a vote for a proposed function. Each device will vote for the proposal unless it has, at some time after the initial transmission of the proposal and prior to the requested vote, responded to a suggestion for a higher proposal number. If a quorum of devices votes for the proposal, then the proposal is accepted, and the leader can transmit a message to all of the devices requesting that they execute the agreed upon function.

The Paxos algorithm, however, like any other consensus algorithm, requires a large number of computing devices to tolerate failures. Specifically, to tolerate F number of failures, the algorithm requires a distributed computing system comprising at least 2F+1 number of computing devices. Of these devices, only a simple majority is needed to select commands and continue proper operation of the system. The remaining devices can remain unused until one of the devices selecting commands and operating the system fails.

Therefore, a distributed computing system having only F+1 number of main computing devices can tolerate F failures if an additional F auxiliary computing devices are available should the failures occur. As will be shown in detail below, the main computing devices can select commands and operate the system until one of the main computing devices fails. Subsequently, the leader can use at least one main computing device and some or all of the auxiliary computing devices to complete the operations of the system of main computing devices prior to the failure, and to select a new system including the currently operating main computing devices to continue to propose and select commands. Alternatively, another state machine, comprising a sufficient number of computing devices, either main or auxiliary, can select a new system of the currently operating main computing devices to complete the operations that were pending when the failure occurred and to continue to propose and select commands.

Distributed Computing Environment

Turning to the drawings, wherein like reference numerals refer to like elements, the invention is illustrated as being implemented by a distributed computing system, such as the exemplary distributed computing system 10 shown in FIG. 1. For ease of presentation only, the present invention will be described with reference to distributed computing systems such as system 10, which comprises computing devices 11 through 15, interconnected as shown in FIG. 1. As will be understood by those skilled in the art, the present invention is applicable to all distributed computing environments and is not intended to be limited in any way by the exemplary distributed computing system of FIG. 1, which has been simplified for presentation purposes.

FIG. 1 also illustrates a single client computing device 20, though the present invention is intended to operate in environments having any number of client computing devices. Client computing device 20 is illustrated as having a generic communicational connection to the distributed computing system 10. As will be known by those skilled in the art, such a communicational connection can use any communication medium and protocol, and can allow the client computing device 20 to communicate with one or more of the computing devices in the distributed computing system 10.

Additionally, FIG. 1 illustrates computing devices 30 and 31 that are not shown as part of the distributed computing system 10, but which also maintain a generic communicational connection to system 10. As above, the communicational connection can use any communication medium and protocol, and can allow the computing devices 30 and 31 to communicate with one or more of the computing devices in the distributed computing system 10. As will be described in further detail below, computing devices 30 and 31 can learn of the results of executions performed by the system 10 without being part of the system 10. Alternatively, computing devices 30 and 31 can learn of functions selected by the system 10 and can execute the function themselves, thereby independently maintaining the same state as the devices in the system 10.

Although not required, the invention will be described in the general context of computer-executable instructions, such as program modules, being executed by a computing device. Generally, program modules include routines, programs, objects, components, data structures, and the like that perform particular tasks or implement particular abstract data types. Moreover, those skilled in the art will appreciate that the invention may be practiced with many different computing devices, including hand-held devices, multi-processor systems, microprocessor based or programmable consumer electronics, network PCs, minicomputers, mainframe computers, and the like. As described above, the invention may also be practiced in distributed computing environments, such as distributed computing system 10, where tasks are performed by remote processing devices that are linked through a communications network. In a distributed computing environment, program modules may be located in both local and remote memory storage devices.

Figure 2:
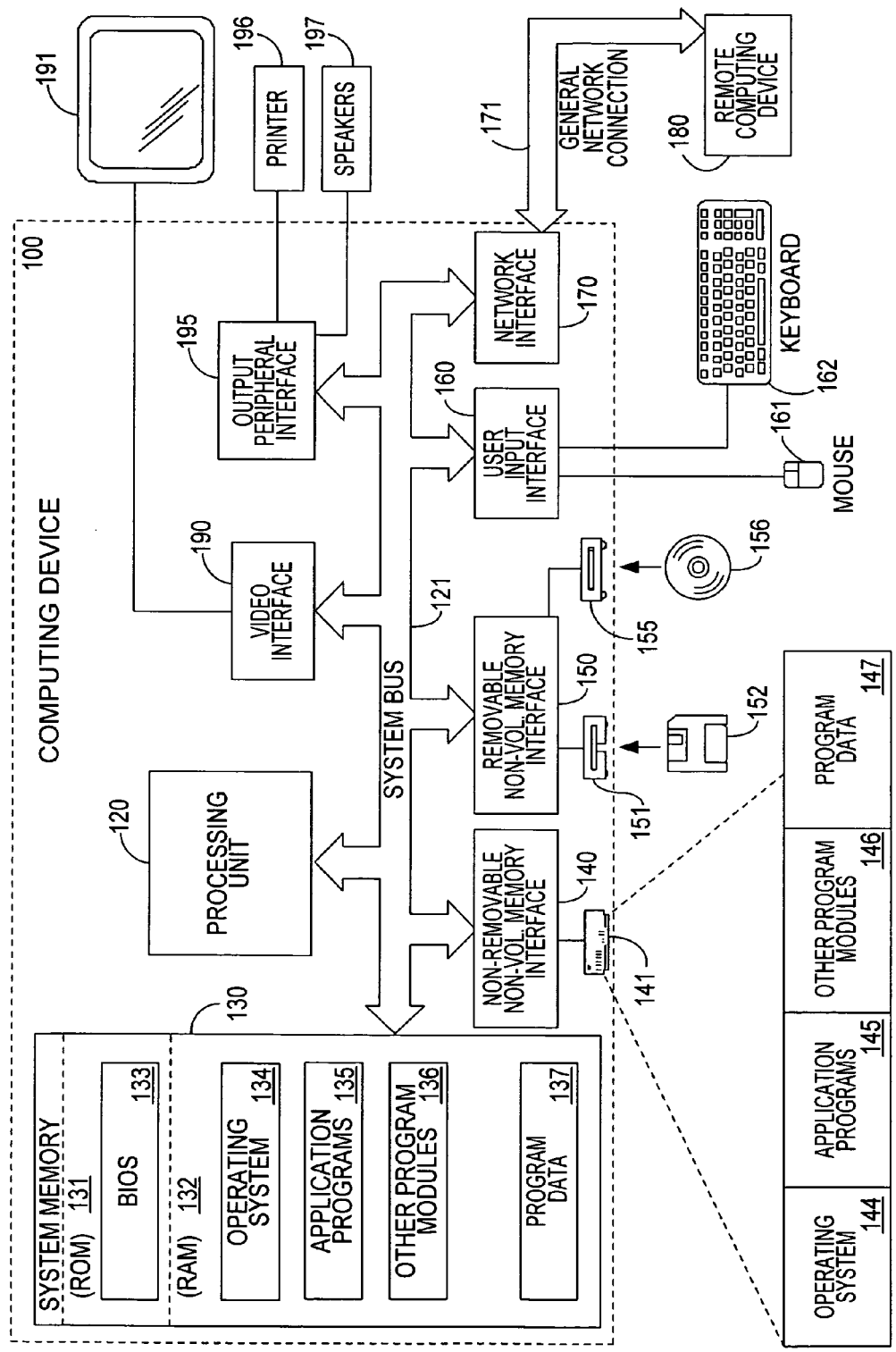
FIG. 2 is a block diagram generally illustrating an exemplary computing device with which an embodiment of the present invention can be implemented.

Turning to FIG. 2, an exemplary computing device 100 on which the invention may be implemented is shown. The computing device 100 is only one example of a suitable computing device and is not intended to suggest any limitation as to the scope of use or functionality of the invention. For example, the exemplary computing device 100 is not intended to exactly represent any of the computing devices 11-15, 20, or 30-31 illustrated in FIG. 1. The exemplary computing device 100 can implement one or more of these computing devices, such as through memory partitions, virtual machines, multiple processors, or similar programming techniques allowing one physical computing structure to perform the actions described below as attributed to multiple computing devices. Furthermore, the computing device 100 should not be interpreted as having any dependency or requirement relating to any one or combination of peripherals illustrated in FIG. 2.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus. Furthermore, the processing unit 120 can contain one or more physical processors.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computing device 100 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 can operate in a networked environment, such as that shown in FIG. 1, using logical connections to one or more remote computers. FIG. 2 illustrates a general network connection 171 to a remote computing device 180. The general network connection 171, and the network connections illustrated in FIG. 1, can be any of various different types of networks and network connections, including a Local Area Network (LAN), a Wide-Area Network (WAN), a wireless network, networks conforming to the Ethernet protocol, the Token-Ring protocol, or other logical, physical, or wireless networks including the Internet or the World Wide Web.

When used in a networking environment, the computing device 100 is connected to the general network connection 171 through a network interface or adapter 170, which can be a wired or wireless network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Overview

In accordance with the invention, a distributed computing system can implement a fault tolerant algorithm using a fewer number of primary devices and additional auxiliary devices. The Paxos algorithm, which will be described in greater detail below, can provide a mechanism of implementing a distributed computing system that can tolerate a certain number of faults provided that more than twice that number of computing devices are used. Mathematically, if the variable "F" represents the number of faults that can be tolerated, a distributed computing system of at least 2F+1 computing devices can implement the Paxos algorithm. Of these 2F+1 computing devices, any collection of at least a majority of them, in other words any collection of at least F+1 devices, can be a quorum and can select proposals in a fault-tolerant manner.

If no computing devices fail, a collection of F+1 main computing devices can implement the Paxos algorithm. However, if one or more of the main computing devices fail, one or more of the auxiliary computing devices can be used to enable the system to continue to use the Paxos algorithm and operate in a fault-tolerant manner. Because the auxiliary computing devices are rarely used, they can be inexpensive computing devices, such as older computing devices, pocket computing devices, computing devices primarily dedicated to other tasks, or even digital consumer electronic devices. Consequently, provided a fixed set of resources with which to purchase a fault-tolerant system, a greater amount of resources can be used to purchase the main computing devices, enabling the purchase of computing devices having increased processing power, storage capacity, and the like. Alternatively, a fault-tolerant system using both main and auxiliary computing devices can be purchased for a decreased cost while effectively providing very similar performance as a system using only main computing devices.

According to one embodiment contemplated by the present invention, a single state machine comprising main and auxiliary computing devices can be used to provide a fault-tolerant distributed computing system. Initially, a quorum comprising the main computing devices can be used. If one or more of the main computing devices fails, a quorum comprising some of the auxiliary computing devices and at least one of the working main computing devices can be used to complete the voting on any proposals that were pending when one of the main computing devices failed. Subsequently, a similar or identical quorum can select a set of quorums for all steps beyond some future step. One quorum of the selected set of quorums can comprise all of the working main computing devices, and such a quorum can be used to select functions after the future step. In a similar manner, if a main computing device is repaired, a new set of quorums can be proposed and selected by the currently operating quorum in order to include the repaired computing device.

According to another embodiment contemplated by the present invention, two state machines, with one comprising main and auxiliary computing devices and the other comprising main computing devices, can be used to implement a fault-tolerant distributed computing system. The first state machine can be used to select quorums to be used by the second state machine. The selected quorum, comprising some or all of the main computing devices, can then operate until a member of the quorum fails. Subsequently, the first state machine can be used to select a new quorum comprising all of the currently operating main computing devices for the second state machine. If a main computing device is repaired, the first state machine can add the repaired computing device to the quorum selected for the second state machine. Conceptually, the main and auxiliary computing devices of the first state machine implement a quorum selection state machine that selects the quorum to be used by the second state machine to select proposals submitted by the clients of the distributed computing system. The quorum selection state machine can be used whenever the quorum of the second state machine is to be changed, such as to remove a failed main processor, or to add a repaired main processor. Additionally, the quorums of the second state machine can propagate not only knowledge of previous votes by the constituent devices, but to also knowledge of known safe proposals.

State Machines

In a distributed environment, such as distributed system 10 illustrated in FIG. 1, coordination among devices can be a difficult task. One mechanism for avoiding difficulties inherent in relying on time as a coordinating factor is to model the distributed computing system in terms of a state machine where the performance of a function moves the state machine from one state to another. Thus, a state machine can be described with reference to a set of states, a set of commands, a set of responses, and functions that link each response/state pair to each command/state pair. A client of a state machine can issue a command which requests that the state machine execute a function. The function can then change the state of the state machine and produce a response.

The individual devices that comprise the distributed computing system can each execute the state machine of the system. The devices can, therefore, be coordinated by determining an initial state and then executing the same functions in the same order from then on. A device can be synchronized by simply determining the last function the device executed, locating that function in an ordered list of functions executed by other devices, and then directing the device to perform the functions from the ordered list that the device has not yet performed. Such a state machine approach was initially proposed in the article "Time, Clocks, and the Ordering of Events in a Distributed System," by Leslie Lamport published in The Communications of the ACM, Volume 21, Number 7, July 1978, the contents of which are hereby incorporated by reference in their entirety to further explain or describe any teaching or suggestion contained within the present specification that is consistent with their disclosures.

Paxos Algorithm

By using a state machine approach, the synchronization of the constituent devices 11 through 15 of the distributed computing system 10, shown in FIG. 1, can be achieved by agreeing on the functions to be performed and the order in which to perform them. One method for agreeing upon a function to be performed is known as the Paxos algorithm. The Paxos algorithm allows the system 10 to operate properly even in the face of failures, where devices can stop operating without advanced warning. The Paxos algorithm requires that at least a quorum of devices agree to a function before the system as a whole performs that function. With the Paxos algorithm, a quorum can be a simple majority, or it can include more devices than that, depending upon the particular requirements of the system. However defined, a quorum can be sufficiently large such that any two quorums have at least one device in common.

To maintain consistency, the system 10 can limit the performance of functions to a single function per step. Therefore, it can be desirable to select only a single function for a given step. Since any two quorums have at least one properly functioning device in common, the selection of no more than one step could be ensured by requiring that every device vote only for one proposal. However, if a number of devices simultaneously acted as leaders, such a requirement would cause a stalemate because it would be possible that none of the proposals was agreed to by a quorum, and yet none of the devices could vote for a proposal for a different function so that a quorum could eventually be reached.

The Paxos algorithm solves this problem through a multi-phase process by which devices are allowed to change their votes, but leaders are constrained in the functions they propose. Using the Paxos algorithm, a leader can propose any function the leader chooses, unless the leader learns of a previously proposed function. If the leader has learned of at least one previously proposed function, that at least one device in the quorum has already voted for, the leader can propose the most recent of the previously proposed functions the leader has learned of. Each device need only track the most recent proposal that device voted for. If the device receives a proposal for which it has promised to vote, and it has not promised to vote for another proposal in the meantime, the device can cast a vote for the proposal. A device can only promise to vote for a proposal if the proposal has a larger proposal number than any other proposal the device has previously promised to vote for. The use of proposal numbers allows the system to achieve correct operation without the need to resort to complicated and expensive synchronization of clocks between the constituent devices. The most recent proposal will generally have the largest proposal number. If it does not, it can be ignored, as explained further below. When promising to vote for a proposal, the device can also transmit to the leader soliciting the votes the highest proposal number, that is less than the current proposal number, for which the device has previously promised to vote. In such a manner the leader can always learn of previous proposals.

Figure 3A:
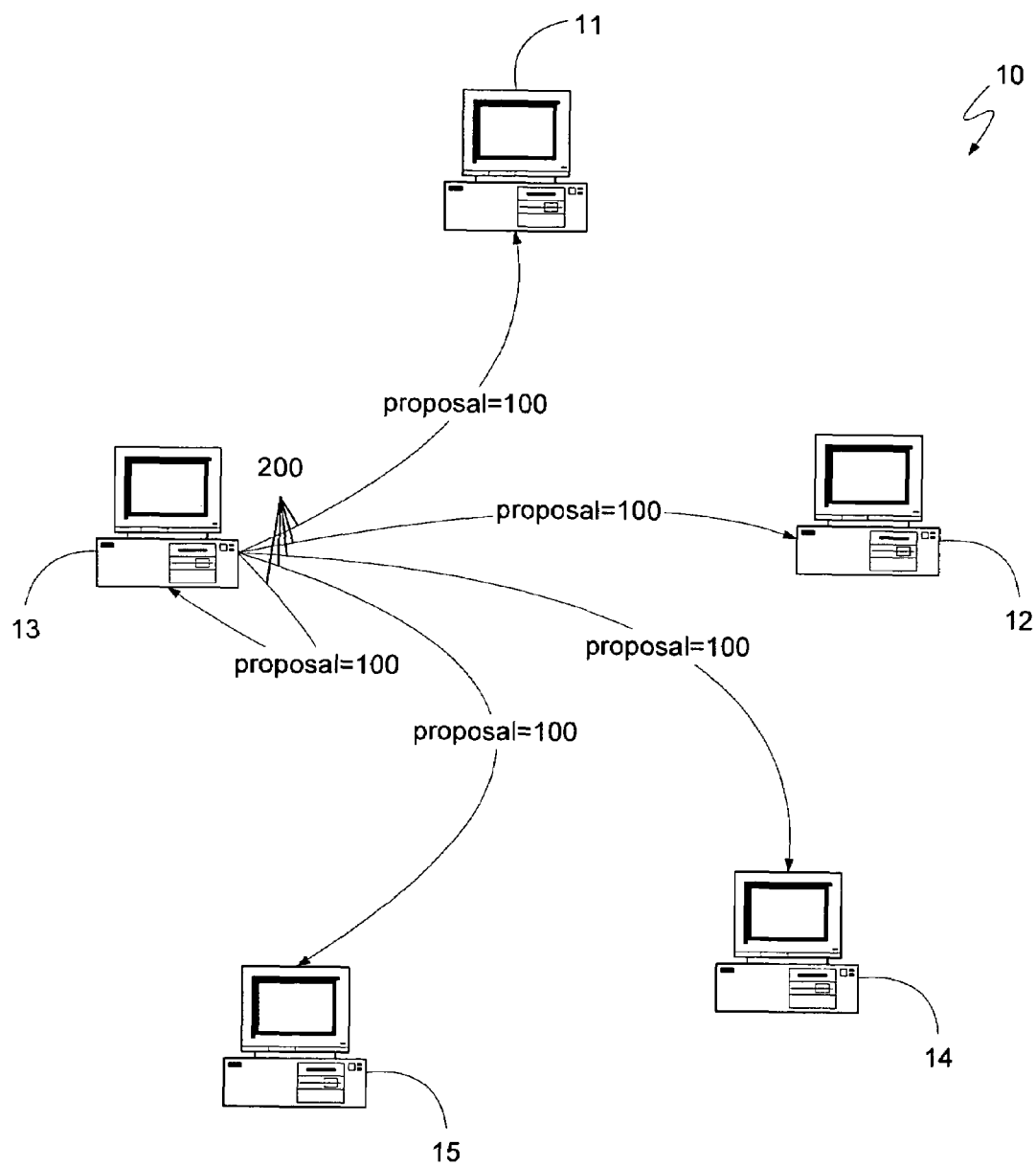
FIGS. 3a-e generally illustrate the operation of a consensus algorithm contemplated by an embodiment of the present invention.

Turning to FIG. 3a, the Paxos algorithm is explained in greater detail using the exemplary distributed computing system 10, comprising the five devices 11 through 15, shown. In such an environment, a quorum can be defined as any group of three or more devices because such a definition will ensure that every quorum has at least one device in common. As shown in FIG. 3a, device 13 can assume a leadership position and transmit message 200 to devices 11-12 and 14-15, suggesting a proposal number to be used for proposing a function to the devices 11-15. Because device 13 can act as both a device and a leader, it sends itself message 200, though such a transmission could be handled internally to the device and need not be physically transmitted. Device 13 can select an arbitrarily large proposal number in an effort to ensure that there are no previous proposals with larger proposal numbers. Furthermore, because device 13 itself may have voted on previous proposals, it can select a proposal number that is larger than any proposal device 13 is aware of.

Because proposals can be ordered based on their proposal numbers, it can be advantageous to prevent two or more devices from using the same proposal number for different proposals. Therefore, proposal numbers can be selected by devices using mechanisms based on unique device properties, such as a Media Access Control (MAC) address of the device sending the proposal. Alternatively, proposal numbers can be partitioned among the devices, requiring each device to select proposal numbers only from among its partition. One method for partitioning the proposal numbers would be to grant to the "with" device proposal numbers congruent to "i" modulo the number of devices in the system.

Because, as will be shown, the Paxos algorithm can operate even if a number of devices act as leaders, the mechanism by which a device assumes a leadership position is not important. Nevertheless, a mechanism that minimizes the chances that different devices can simultaneously believe they are the leader can increase the efficiency of the system. For example, mechanisms based on unique device properties, such as a MAC address, can reduce the chance of having more than one simultaneous leader. One such mechanism could simply select a properly functioning device with the smallest MAC address to be the next leader. In addition, a leader selection mechanism could prevent a device from attempting to become a leader if the device has already received a message from another device acting as a leader within a pre-determined amount of time, to prevent a constant changing of the leadership device. Such constant leadership change can introduce inefficiencies into the operation of the system.

Figure 3B:
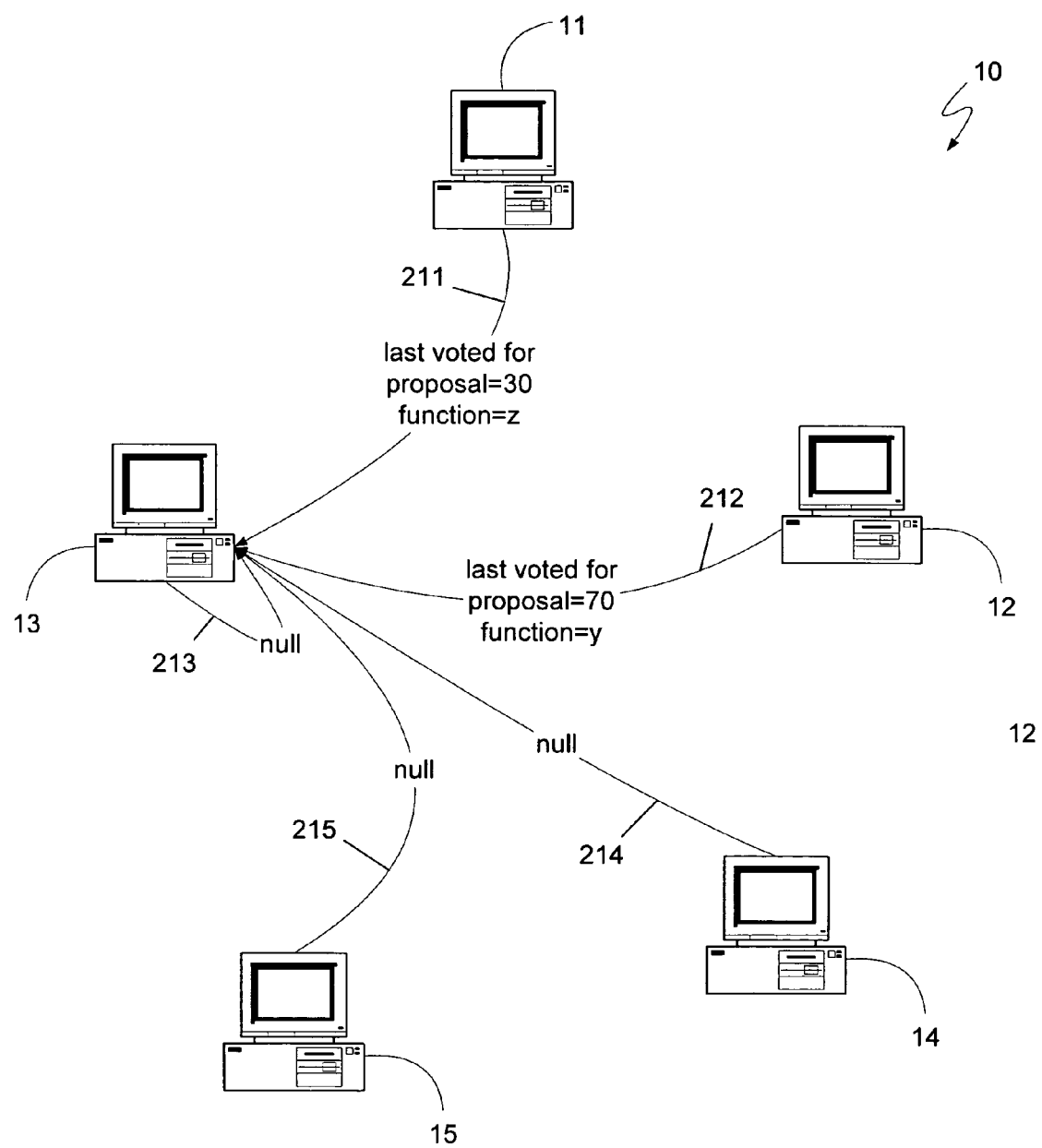

Turning to FIG. 3b, upon receipt of a message, such as message 200, suggesting a new proposal number, each of the devices 11-15 can respond with messages 211-215 indicating the largest proposal number, that is still less than the proposal number suggested by message 200, and the function proposed by it, for which that device has cast a vote. If the device has cast a vote for a proposal number that is greater than the proposal number used by the leader, the device can ignore the message from the leader, or, as will be explained below, the device can respond with the last vote information despite the larger proposal number. In the exemplary condition shown in FIG. 3b, device 12 has previously voted for proposal number 70, which had proposed that the system 10 execute a function identified by the variable "y". Thus, in response to message 200, device 12 can send message 212 indicating that it last voted for proposal number 70, which proposed the execution of the function "y". Similarly, device 11 previously voted for proposal number 30, which had proposed that the system 10 execute a function identified by the variable "z". Message 211 can, therefore, convey this last vote information of device 11 back to device 13. Devices 13-15 may not have received any proposals and have, therefore, not previously cast a vote for any proposal. They can, therefore, return a null response as indicated by messages 213-215. Again, as above, messages sent from device 13 to itself can be handled internally by device 13, but are illustrated for explanatory purposes.

Figure 3C:
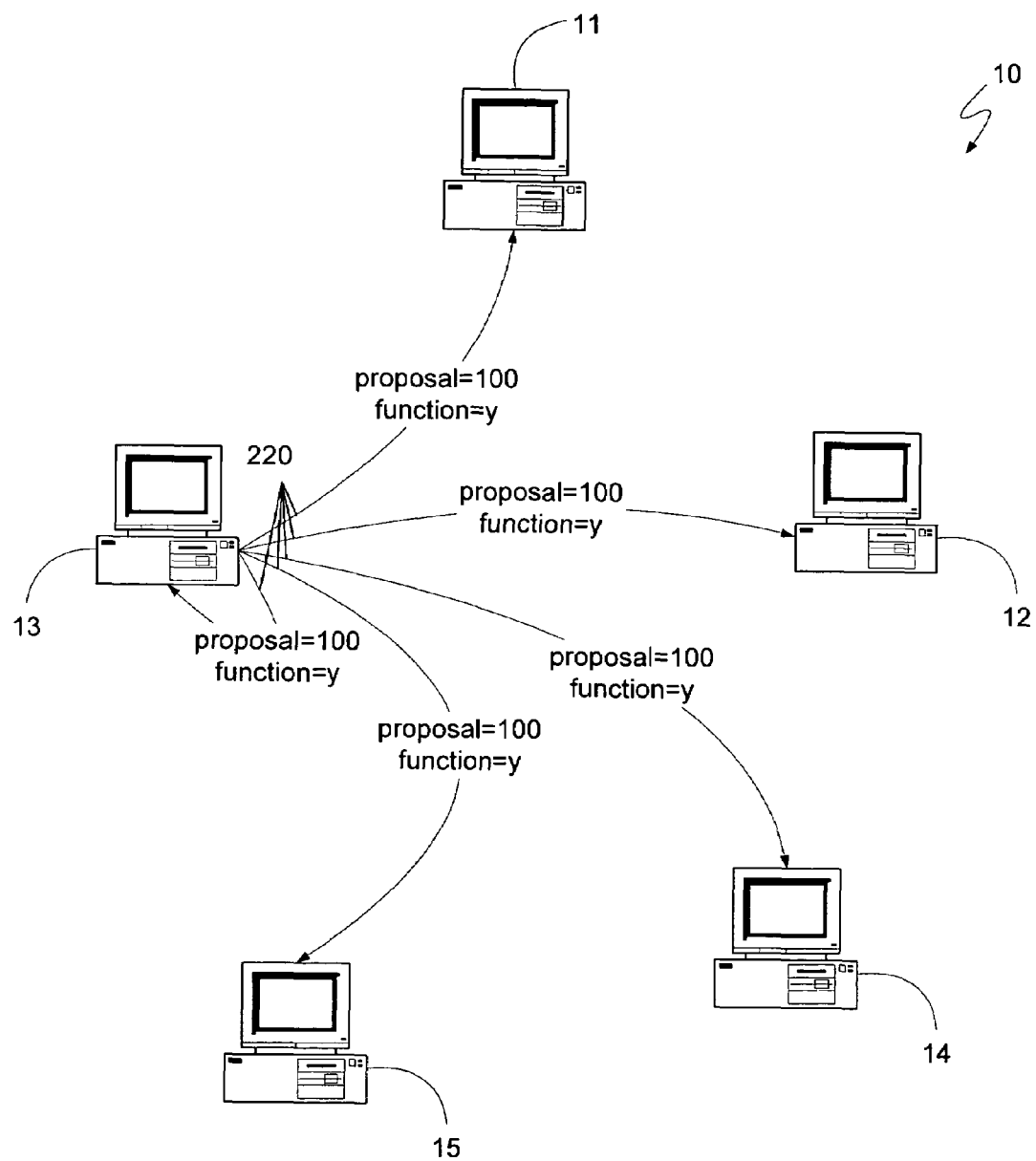

Turning to FIG. 3c, when the leader 13 receives messages 211-215, the leader can determine an appropriate function to propose such that the function proposed is equivalent to the function with the largest proposal number that was voted on by any member of the quorum. If none of the quorum members had voted on any previous proposal, then the leader is free to select whichever function the leader wishes to propose. Therefore, given the messages 211-215 illustrated in FIG. 3b, device 13 can select to solicit votes for the execution of function "y" as that function was voted for by device 12 as part of proposal number 70, which is the proposal with the largest proposal number of which the leader 13 has learned. However, because the system 10 illustrated in FIGS. 3a through 3e contains five devices, a quorum can be as few as three devices. Thus, it is sufficient for the leader 13 to select any three or more devices to act as a quorum. Consequently, a quorum selected by the leader 13 may not include the device 12. In such a case, the leader 13 need not propose the function "y" because device 12 is not a member of the selected quorum. Instead, the leader 13 can propose a function that was proposed with the largest proposal number that the devices in the leader selected quorum previously voted for. If none of the devices had previously voted for any proposals, the leader can propose any function it chooses.

Because the message 200, suggesting a proposal number, acts as a mechanism by which the leader 13 can determine an appropriate proposal number to select, and enables the leader to learn of all lower numbered proposals that were previously proposed, it can be necessary for the leader 13 to send multiple messages, such as message 200, increasingly suggesting larger proposal numbers if the earlier messages having have too low a proposal number. Rather than requiring the leader to send a multitude of messages, each device can respond with the largest numbered proposal for which it has voted irrespective of whether the proposal number suggested by the leader is larger or smaller than the previously voted for proposal. In such a manner, the leader 13 can more efficiently learn of previous votes and can more accurately select a proposal number with which to propose a function.

Returning to FIG. 3c, the leader 13 is shown selecting a quorum consisting of all of the devices of the system 10, and transmitting a message 220 seeking a vote on the execution of function "y" by the system 10. Upon receipt of message 220, each device can determine whether to vote for function "y". A device can vote for a function so long as the device has not responded to a suggestion of a new proposal having a larger proposal number than the proposal for which the vote is currently being requested. Thus, for the example illustrated in FIG. 3c, if any of the devices 11-15 had received and responded to another suggestion for a new proposal, having a proposal number greater than 100, prior to receiving message 220 from the leader 13, then that device may not vote for the function for which a vote was solicited by message 220.

Figure 3D:
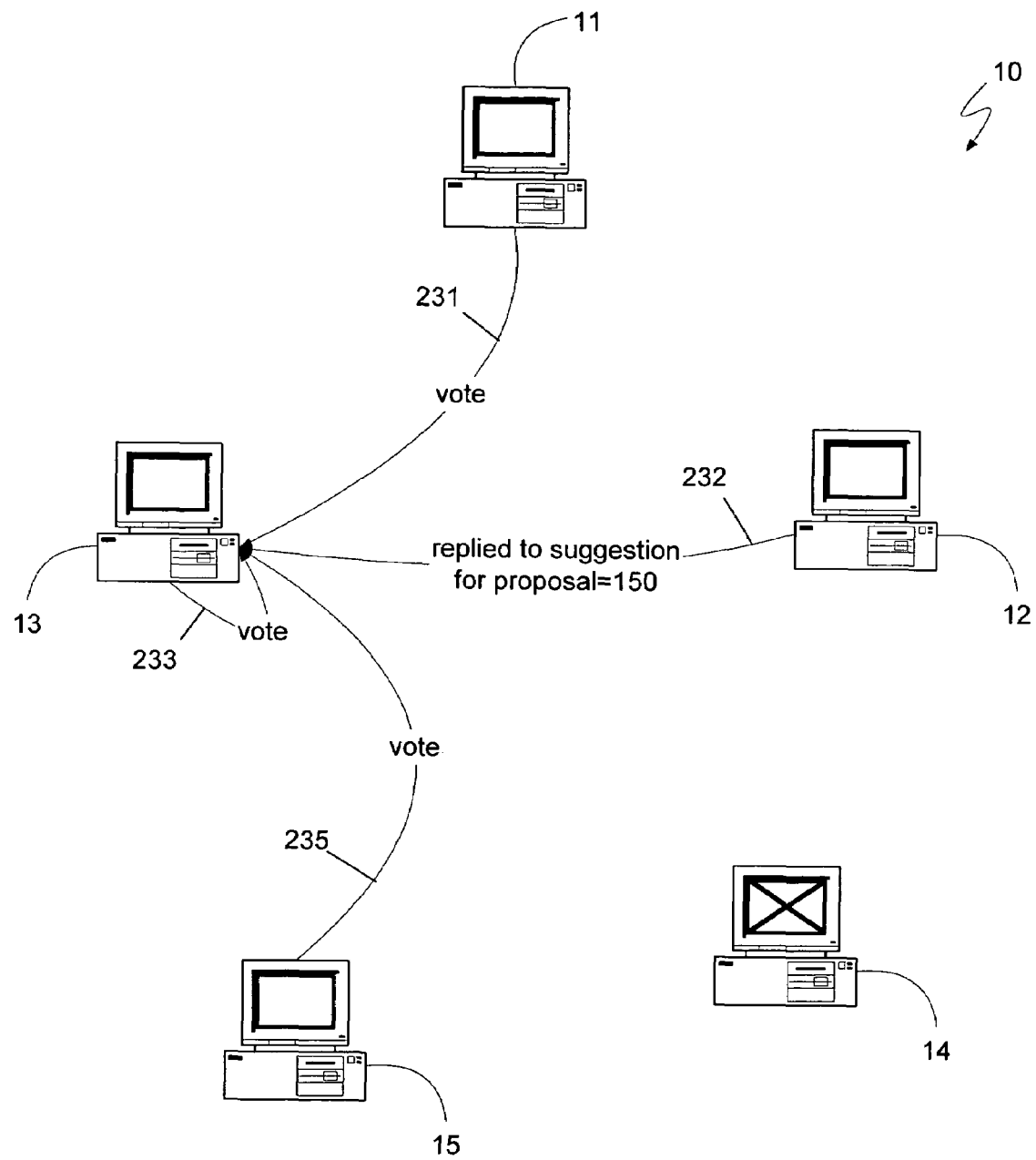

Turning to FIG. 3d, each of the devices 11-15 can independently determine that they have replied to no other suggestions for new proposals with proposal numbers greater than 100. Therefore, because the last suggestion for a new proposal to which they responded is not for a proposal with a larger number than the current proposal, devices 11 and 13-15 can vote for the proposal and indicate their votes in messages 231 and 233-235, respectively. As before, message 233 is shown for illustration purposes, and can be handled internally to device 13. Device 12, however, may have, sometime prior to the transmission of message 220, received and responded to a suggestion for a new proposal with a proposal number greater than 100. Therefore, upon receipt of message 220, device 12 can determine that it had already responded to a suggestion for a new proposal with a number greater than 100 and could not, therefore, vote for proposal 100. As a result, as shown in FIG. 3d, device 12 responds with message 232 informing the leader 13 that it has responded to suggestion for a proposal with a proposal number of 150. If leader 13 determines that it needs the vote of device 12, it can send another message, similar to message 220, except with a proposal number greater than 150. Alternatively, device 12 need not respond to message 220, and device 13 can, if it needs device 12's vote, attempt another vote with a proposal with an arbitrarily large proposal number. As can be seen, if device 12 does not indicate the larger proposal number to leader 13, the leader may have to guess and could waste resources guessing, through multiple messages, an appropriately large proposal number.

Figure 3E:
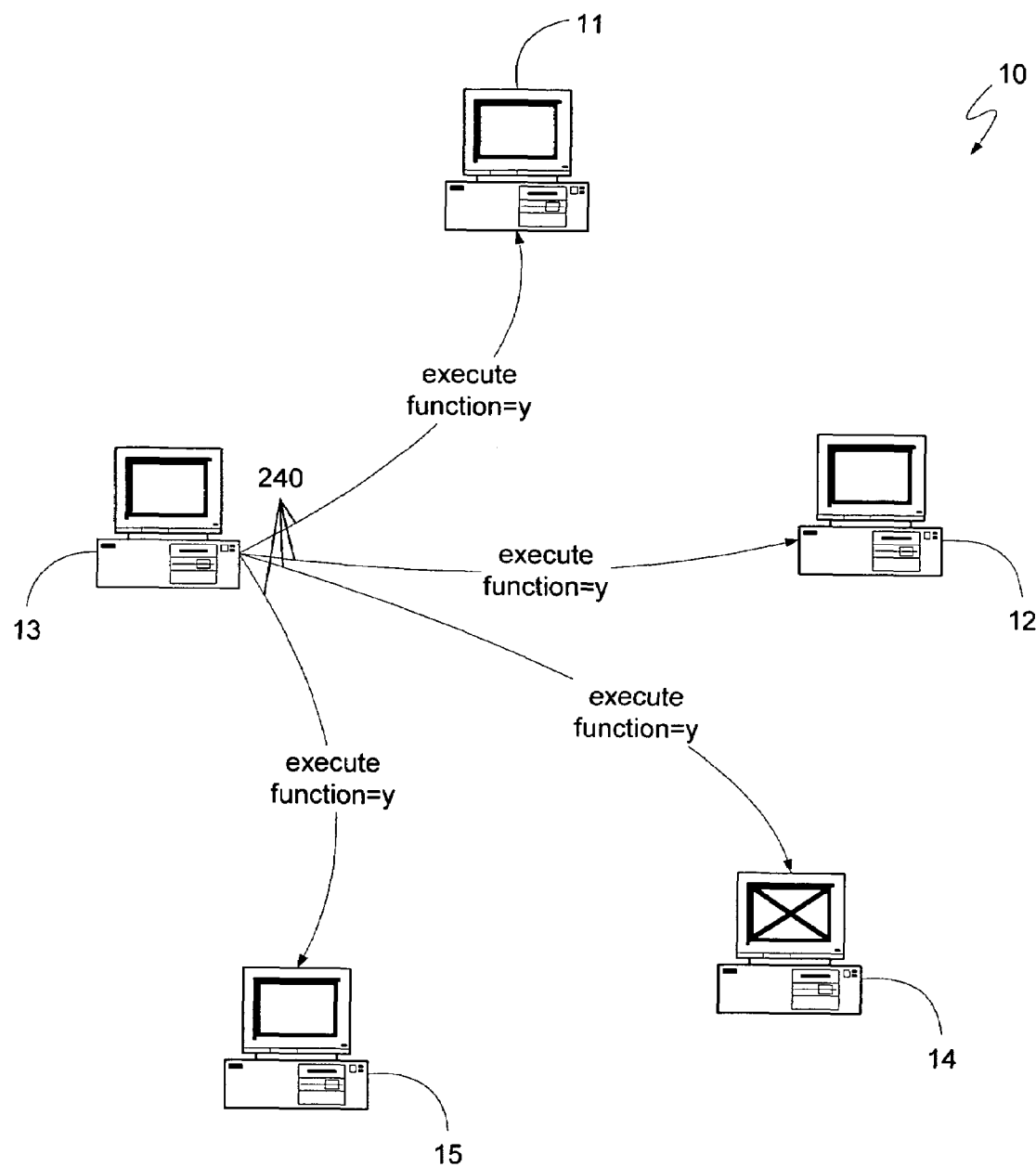

However, because devices 11 and 13-15 are more than sufficient to constitute a quorum, the leader 13 can determine that the proposal has been accepted, even without the vote of device 12, and can request, with message 240 as shown in FIG. 3e, that each of the devices 11-12 and 14-15 execute function "y". Device 13 can execute the function "y" upon determining that it was accepted, without waiting for the transmission of message 240. Consequently, device 13 need not, even internally, send message 240.

While devices 11 and 13-15 do constitute a quorum, it is not the same quorum to which leader 13 submitted the proposal to a vote, which included device 12. However, as described above, a leader need only receive votes from a quorum, and not necessary the same quorum to which the request was sent, to determine that the proposal has been accepted. The Paxos algorithm described above ensures that only a single function is selected and executed by the system 10 for any given step in its operation. For example, if another device that was previously non-operational, became operational and re-joined the system 10, it might try to propose a function different from "y" for the same step for which the system had selected and executed "y". If such a device sent a proposal with a proposal number less than 100, it could be ignored by devices 11 and 13-15, since they had already voted on proposal number 100 as shown in FIG. 3d. On the other hand, if the device sent a proposal with a proposal number greater than 100, such as proposal number 130, devices 11 and 13-15 would return a message indicating that they had voted for function "y" in proposal number 100. Device 12, because it may not have voted, as illustrated in FIG. 3d, might respond with message 212, indicating that it had voted for function "z" in proposal number 30.

The new device could then select the largest proposal among a quorum, which, by definition would include at least some of the devices 11-15, and submit the function proposed in that proposal for voting. Thus, for proposal 130, the new device would submit function "y" for a vote. Each device could then vote on proposal 130 following the algorithm set forth above. Either proposal 130 would be selected, which would not change the prior decision to execute the function "y" for the particular step, or proposal 130 would fail because too many devices had, in the meantime, promised to vote for another proposal. However, as can be seen, once a proposal is passed, all other proposals will propose the same function, and, by definition, all of the devices can only vote for that same function. In such a manner the Paxos algorithm ensures that every device the system 10 executes the same function for a given step.

The application of the Paxos algorithm, described above, can enable a distributed computing system to select a function to execute for a given step. By repeating the operations described above, a distributed computing system can agree upon a series of functions to be performed as a series of steps, and can thereby form a continuously operating system. In such a manner the distributed computing system can receive requests from one or more clients, can execute those requests, and can return the results to the clients.

Figure 4A:
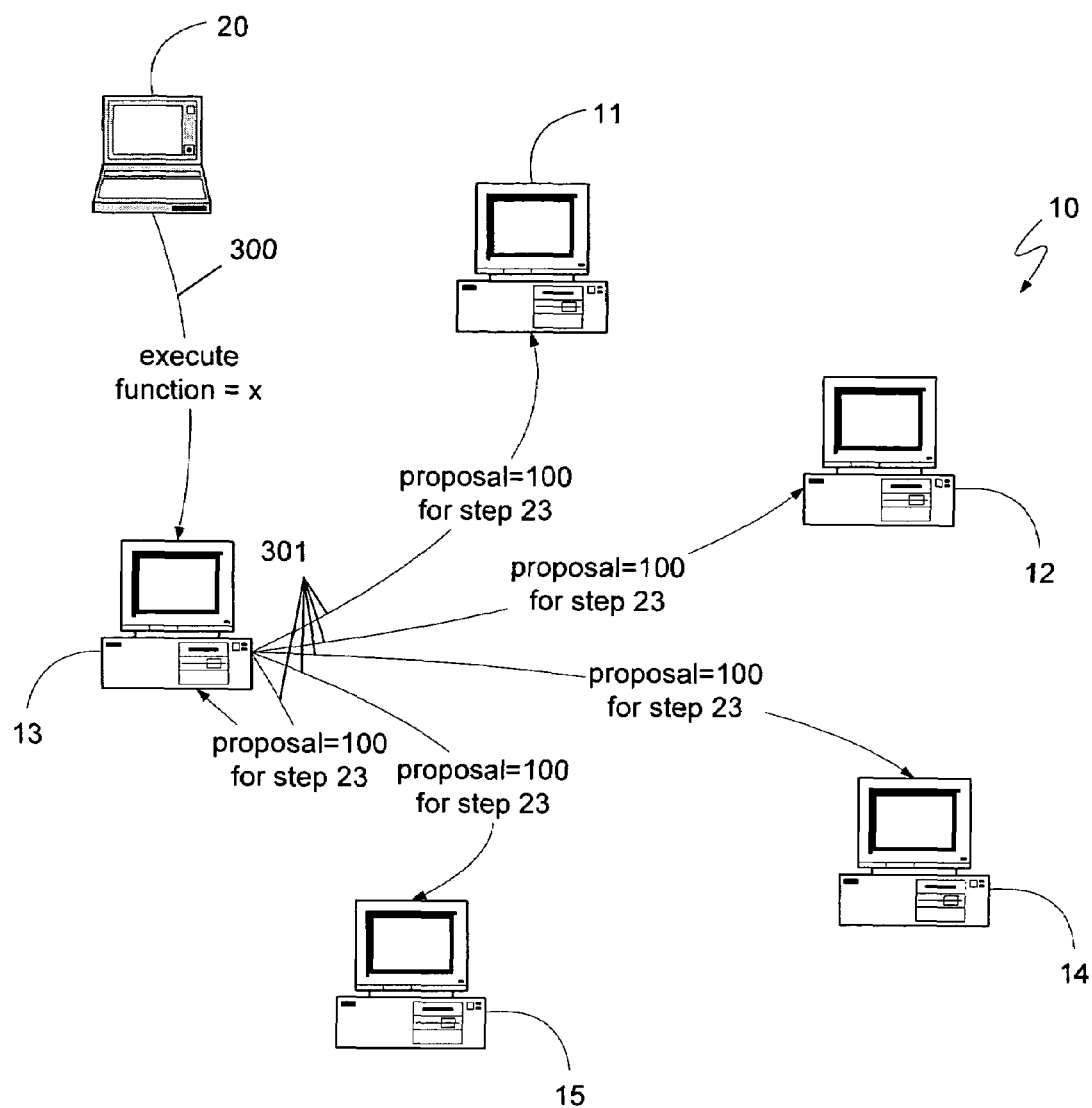
FIGS. 4a-g generally illustrate one aspect of the operation of a multi-phase consensus algorithm contemplated by an embodiment of the present invention.

Turning to FIG. 4a, the system 10 can have already been operational for a number of steps. For example, in the exemplary system 10 illustrated in FIG. 4a, the most recently selected step can be step 24, and step 25 can be the current step. However, the device that was previously acting as a leader may have failed, or simply not received any client requests. Client 20 can send a request to execute a function, represented by the variable "x" in FIG. 4a, to device 13 using message 300, as shown. Device 13 can, according to any number of mechanisms, such as those described above, determine that it should attempt to become a leader. As such, device 13 can send message 301 suggesting the use of proposal number 100 for the next proposal, and including the step for which the proposal is being made. In the exemplary distributed computing system 10 of FIG. 4a, device 13 is not aware that steps 23 and 24 have already been decided upon by the other devices 11-12 and 14-15. Thus, message 301 indicates that it is suggesting a proposal numbered 100 for step 23.

To expedite the operation of the algorithm in a system executing multiple steps, a message, such as message 301, can be understood to suggest a proposal numbered 100 for all steps greater than or equal to step 23. In such a manner, the leader 13 need not continually transmit messages, such as message 301, until it learns of every step that has already been decided. Instead, the leader 13 can learn of the already selected steps through only a single message round trip, as will be shown.

Figure 4B:
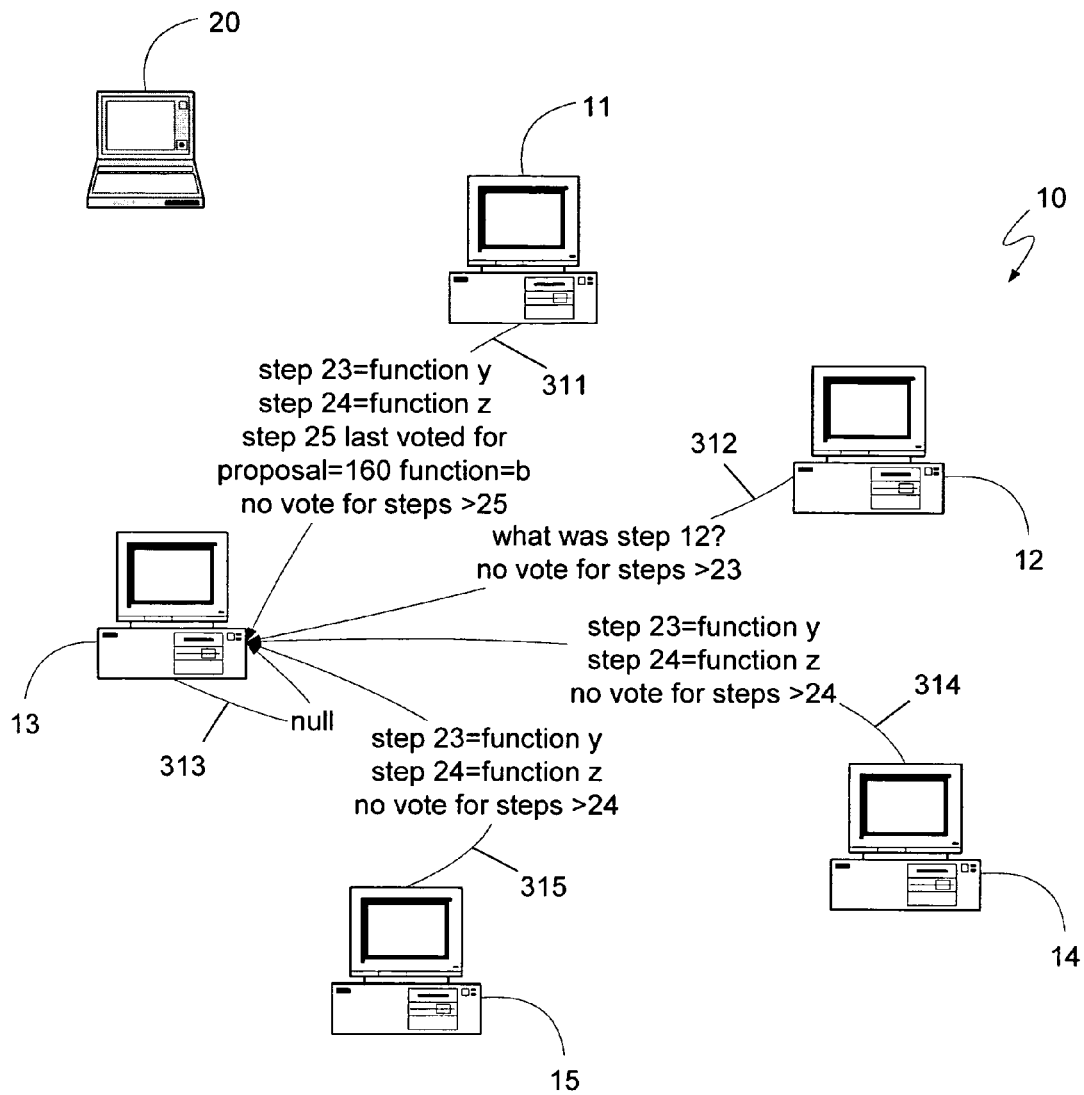

Turning to FIG. 4b, response messages 311-315 from the devices 11-15 of distributed computing system 10 are shown. Devices 11, 14, and 15, for example, have recorded that function "y" was selected for step 23 and function "z" was selected for step 24. Thus, upon receipt of message 301, devices 11, 14, and 15 can respond with messages 311, 314, and 315 indicating the functions they have stored as being selected for all steps greater than or equal to 23; in this case steps 23 and 24. In addition, devices 11, 14, and 15 can provide an indication of the proposals with the largest proposal numbers for which they have voted for steps greater than or equal to 25. Thus, in the example illustrated in FIG. 4b, message 311, can also indicate that device 11 did not vote for any proposals for steps greater than 25, and that it voted for proposal number 160, proposing function "b" for step 25. Messages 314 and 315, on the other hand, can indicate that devices 14 and 15 have not voted for any proposals for any step greater than step 24. To decrease the number of messages being transmitting within the system 10, devices need only respond with their highest proposal number votes if they do not know of a function that has been selected for the given step. Thus, because device 11 was aware that functions were selected for steps 23 and 24, but not step 25, it responded with the functions selected for steps 23 and 24 and the highest numbered proposal for which it voted for step 25.

As before, device 13 can act as both a leader and a voting device. As such, device 13 can send itself messages, such as message 301, and it can respond to itself with messages such as message 313. Such messages are shown in the figures for illustrative purposes only, as they would likely be transmitted internally to device 13. Furthermore, because device 13 can check what is the step with the largest step number for which it knows the function selected, and it can check what the largest proposal number is for the proposals for all steps above that which device 13 voted for, message 313 should rarely contain any information other than a null indicator.

The current state of a state machine may depend, not only on the functions that were selected, but on the order in which those functions are executed. Therefore, if a device does not know which function was selected for a given step, there may be situations in which that device should not execute any functions beyond that step or it will execute functions out of order and its state will be different from that of the distributed computing system. For example, some functions, such as functions that specify a new state unconditionally, are independent of the current state of the device. Such functions can be executed even if functions for steps having lower step numbers than the current step have not yet been executed. Similarly, functions for which the output can be computed without knowing all of the previous steps, such as writing to a database, can also be partially executed out of order to generate the output to be sent to the client. In general, however, a function should not be executed until all previous functions have been executed. Therefore, a device can always attempt to learn which functions were selected for a step that the device missed. When device 13 sends message 301, as shown in FIG. 4a, it is an implicit statement that device 13 believes that step 23 is the next step and that it has knowledge of the agreed upon functions through step 22. A device that is missing a function for a step below step 23, therefore, knows that device 13 has knowledge of all of the functions through step 22, and it can request that function from device 13.

Returning to FIG. 4b, device 12 does not know what function was selected for step 12. As a result, device 12 may have been unable to execute any functions since step 11, even though it may know the functions selected for steps 13-23. Thus, in message 312, device 12 can request the function for step 12 from the leader 13. In addition, device 12 can indicate that it has not voted on any proposals for steps numbered higher than step 23.

If a device has missed too many steps, it can be more efficient to simply inform the device of the current state rather than transmitting all of the functions for all of the steps it has missed. One mechanism for ensuring that a device does not miss too many steps is to enable each device, or a collection of devices, to periodically take a snapshot of the various parts of the state, or the whole state. The state of another device could, therefore, be updated by sending it the appropriate snapshot together with the functions that were selected since the latest snapshot. Additionally, by using checksums of individual parts of the state, the state of another device could be updated by just sending that other device the parts of the state that differ from its current copy.

As a result of receiving messages 311 through 313, the leader 13 can learn of the selected functions for steps 23 and 24, of which it did not previously know, attempt to determine the appropriate function to propose for step 25, and can attempt to update other devices that also have not already learned of the selected functions for all of the steps through step 25. Originally, the leader 13 suggested a proposal number of 100 in message 301, but device 11 responded with message 311 indicating that it had already voted for a proposal with a larger proposal number than 100 for step 25. Consequently, leader 13 can select a proposal number greater than the largest proposal number of which the leader is aware of and transmit another suggestion message such as message 320 shown in FIG. 4c. Alternatively, device 11 could have simply ignored the suggestion for proposal number 100 in message 301 because the proposal number was less than the proposal number of the proposal for which device 11 had already voted for. In such a case, the leader would have retried by increasing the proposal number in an attempt to account for devices that ignored the initial suggestion. As can be seen, if devices ignore suggestions for proposals with proposal numbers that are less than the proposal numbers of the proposals for which the devices had already voted, the leader may be forced to perform multiple retries, each time increasing the suggested proposal number. Such multiple messages can be inefficient. It may, therefore, be preferable for devices to respond to all suggestions for a new proposal number, even if the proposal number is less than the proposal numbers of the proposals for which the devices had already voted, because the leader can then determine, with greater precision, an appropriate proposal number to suggest, and can avoid multiple messages.

Figure 4C:
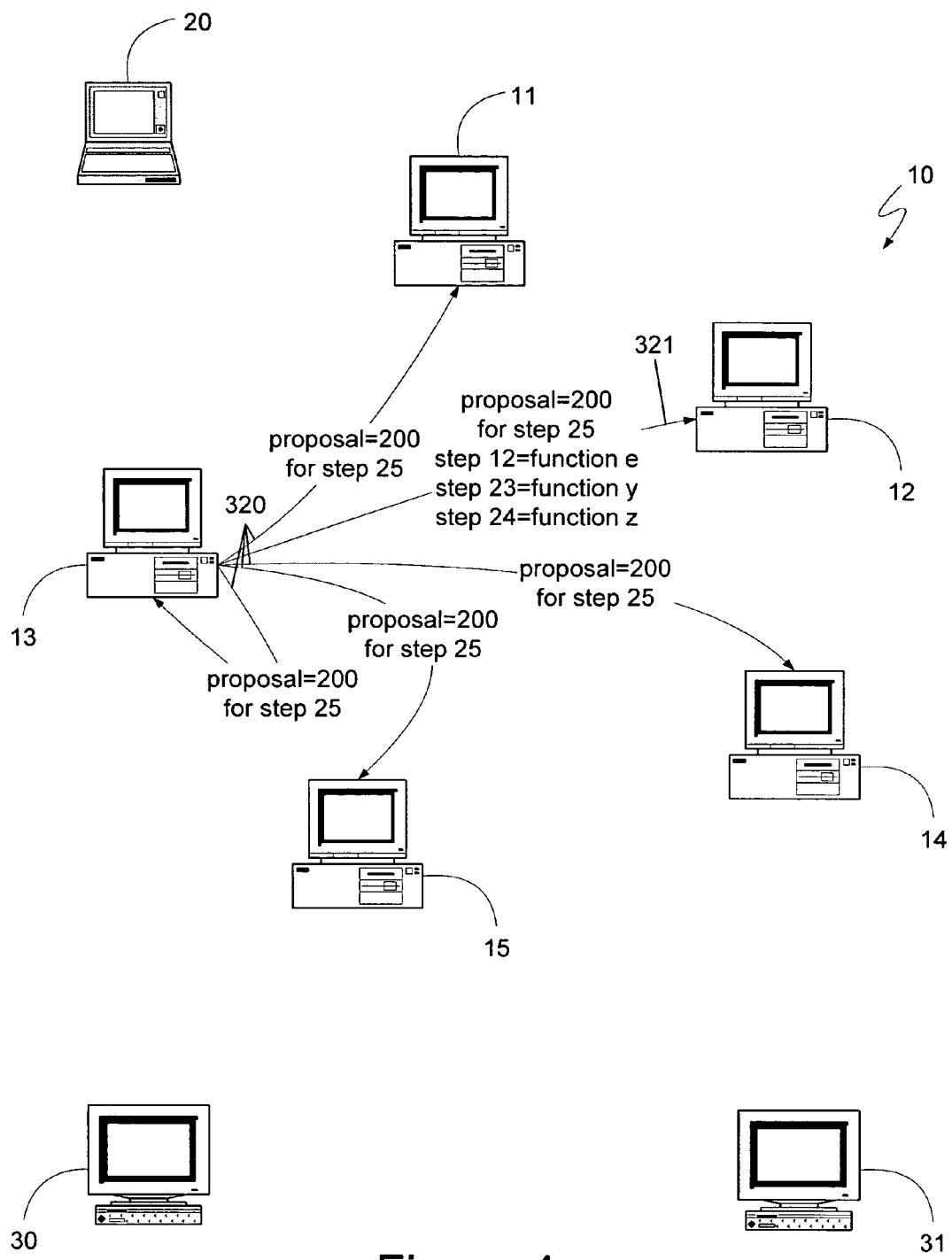

Turning to FIG. 4c, the leader 13 can suggest a larger proposal number, such as proposal number 200 as shown in message 320, in an attempt to suggest a proposal number that is larger than the number of any proposal which leader 13 has learned that a device has previously voted for. In addition, the leader 13 can also provide information regarding previously selected functions to any device that has not already aware of those selected up until step 25. Therefore, as shown, the leader 13 can also send a message 321, indicating to device 12 that a function represented by the variable "e" was selected for step 12, and that a function represented by the variable "z" was selected for step 24.

Figure 4D:
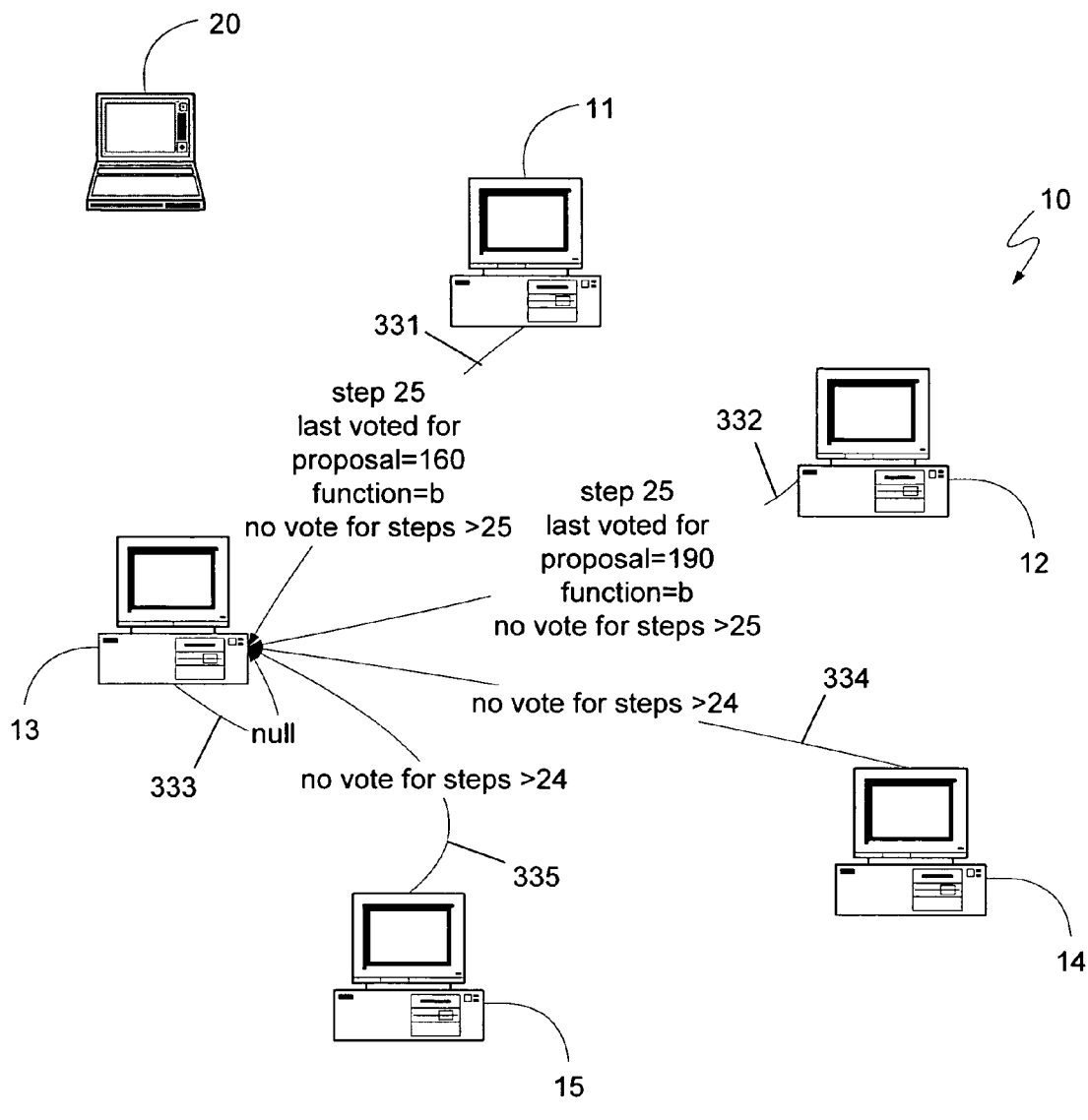
Figure 4D:

In FIG. 4d, then, the devices 11-15 can respond, in a manner similar to that shown above in FIG. 4b, with the exception that devices 11-15 need not inform device 13 of selected functions for steps 23 and 24, as device 13 has already learned of these steps and has sent proposal messages 320 and 321 referencing step 25. Furthermore, messages 331-335 can contain additional information, such as additional proposals for which the devices may have voted for. For example, device 12 may have, sometime between the transmission of message 312 and message 332, voted for a proposal with a proposal number 190. Consequently, message 312 can indicate that device 12 may not have previously cast a vote for any proposal for step 25, but message 332 can indicate that device 12 has voted for proposal 190 for step 25, though it has still not voted for any proposal for steps greater than 25. However, because each of the proposal numbers are less than the suggested proposal number the leader 13 sent in message 320, the leader can proceed to propose a function with the proposal number 200 specified in message 320.

Figure 4E:
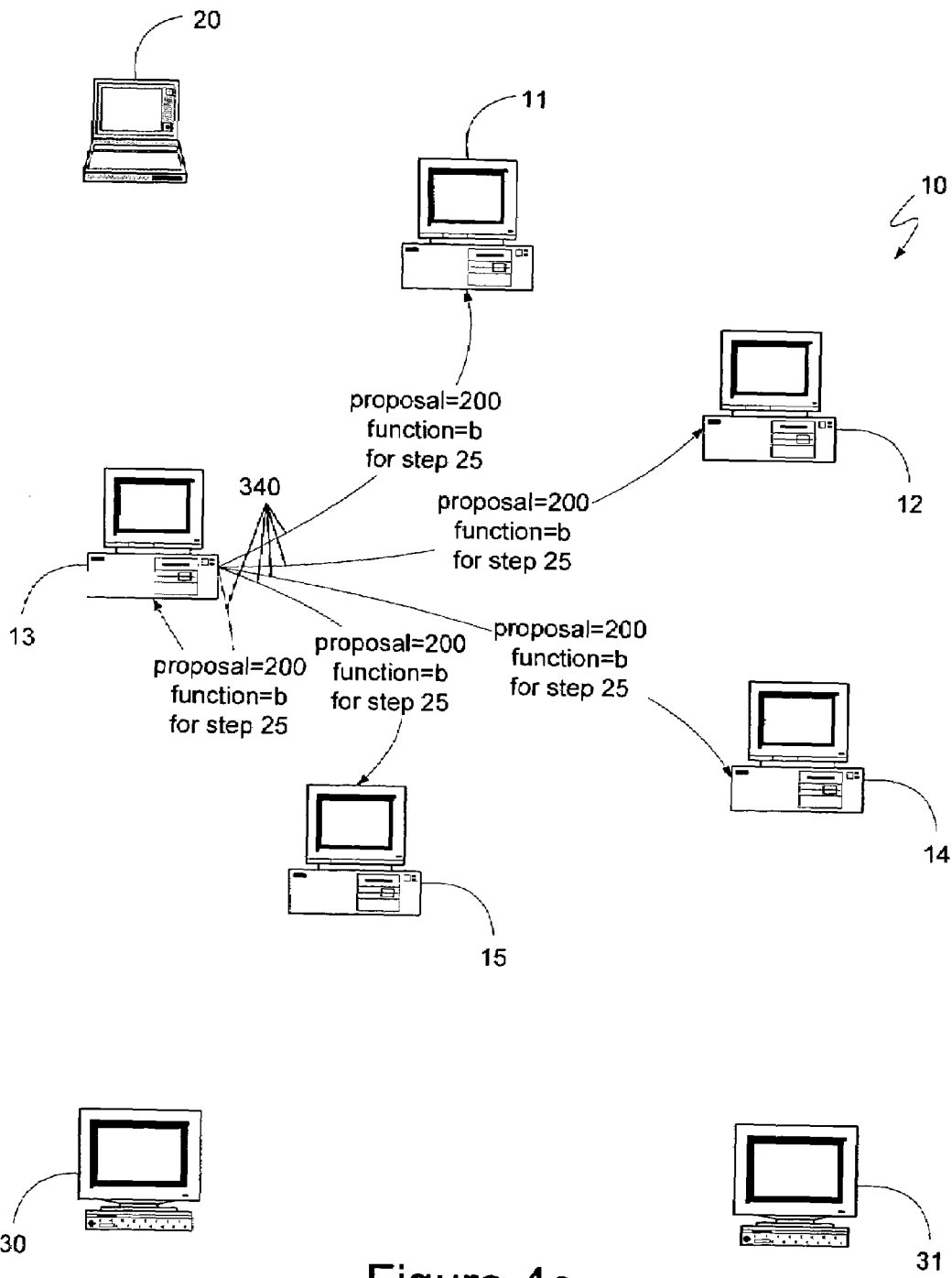

Turning to FIG. 4e, the leader 13 now has sufficient information with which to select a proposal to submit as proposal number 200, as illustrated by message 340, which requests that devices 11-15 vote on proposal 200, proposing that the system execute function "b" for step 25. As before, because devices 11 and 12, both members of the quorum, have previously voted for a proposal proposing the execution of function "b", and no other member of the quorum has voted for any larger numbered proposals, the leader 13 can propose function "b" for proposal number 200, despite the fact that the client 20 requested the execution of function "x" in message 300. In such a manner, the Paxos algorithm insures that previous functions that were proposed but not completed, such as because of a failure of one or more devices or their communications, can be executed in the proper order.

Figure 4F:
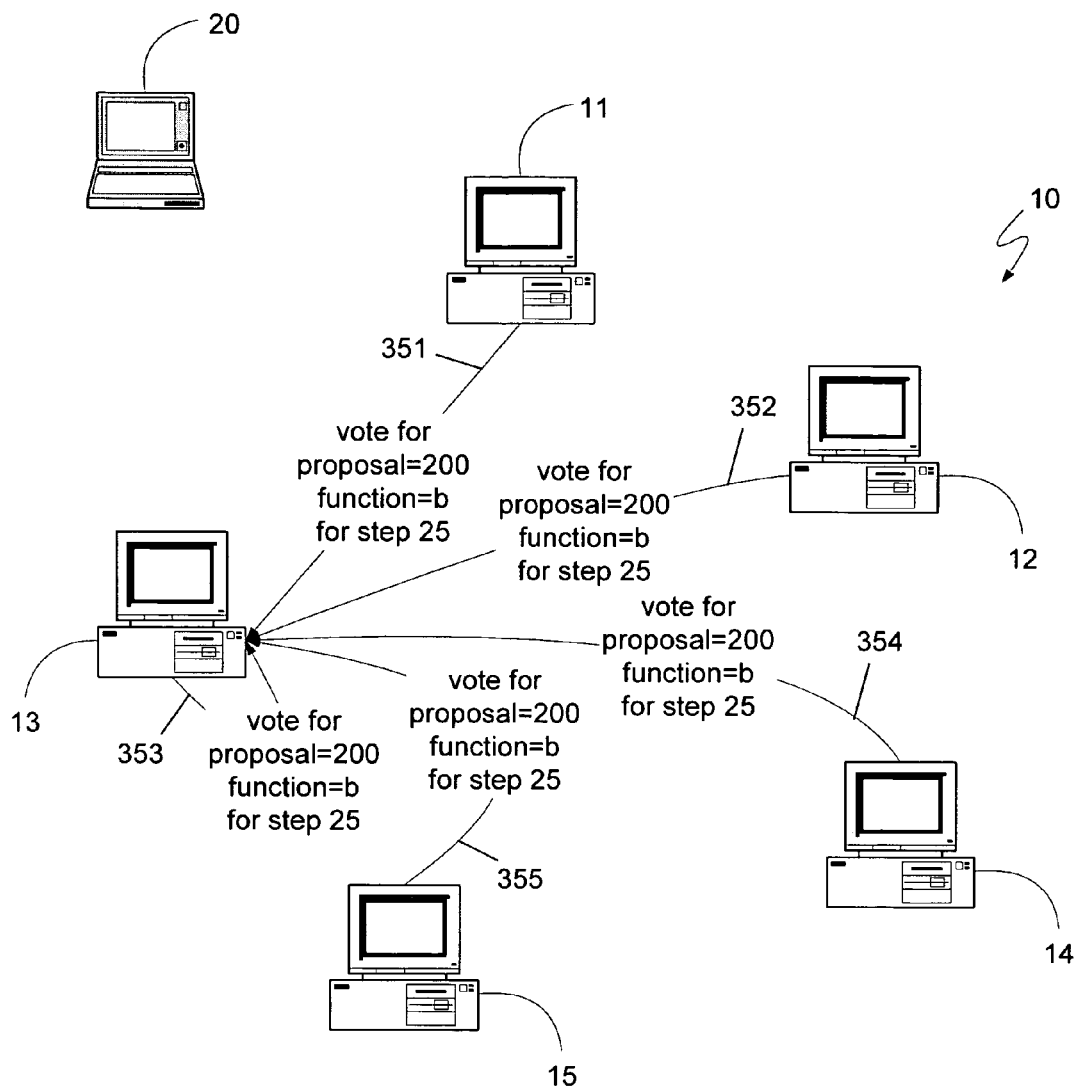
Figure 4F:
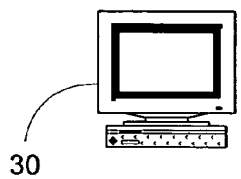
Figure 4F:
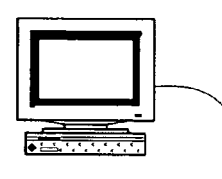

FIG. 4f illustrates devices 11-15 voting, for step 25, for proposal 200 proposing function "b" with messages 351-

Figure 4G:
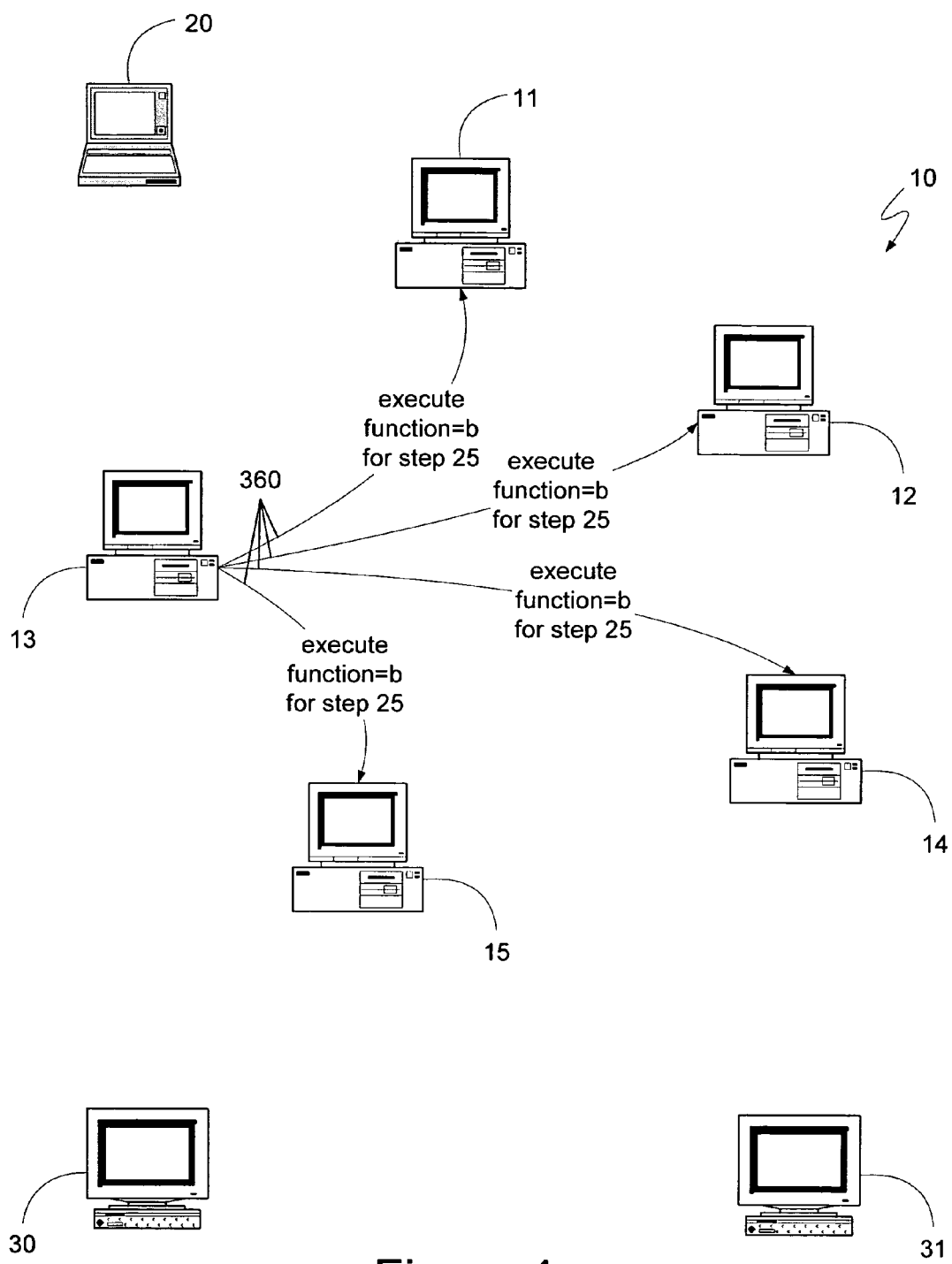

355, respectively. As before, a device can vote for a proposal so long as it has not promised to vote for a different proposal with a larger proposal number between the receipt of messages 320 and message 340. Once the leader 13 receives messages 351-355, it can transmit a message 360, as shown in FIG. 4g, informing the devices 11-12 and 14-15 that the function "b" was selected for step 25. The leader 13 can also store this information itself, since it now knows that the function was selected by a quorum.

However, the function requested by the client 20 in message 300 has not yet been selected by the system 10 at the point in time illustrated in FIG. 4g. To have the system 10 selected the client's request, the leader 13 can perform an abbreviated version of the complete Paxos algorithm illustrated by FIGS. 3a-e and 4a-g above.

Conceptually, the Paxos algorithm described above can be divided into two general phases. The first phase comprises the leader learning of previous proposals that were voted for by the devices in the quorum. The first phase can contain one iteration of a proposal number suggestion by the leader and responses by other members of the quorum, as illustrated by FIGS. 3a and 3b, or multiple iterations of proposal number suggestions and responses, as illustrated by FIGS. 4a-d. The second phase comprises the leader submitting a proposed function for a vote, receiving the votes, and, if the proposal was voted on by a sufficient number of devices, instructing the devices to execute the agreed to function. Examples of the second phase are illustrated by FIGS. 3c-e and 4e-g.

Once the leader learns of other proposals, and finds a proposal number that is safe for all of the current and future steps, it does not need to solicit further information unless it fails, or another device attempts to become a leader. Therefore, the first phase of the Paxos algorithm may be performed less frequently, while the second phase may be performed repeatedly, with ever increasing step numbers, allowing a distributed computing system to agree upon a series of functions and maintain an active running state.

Figure 5A:
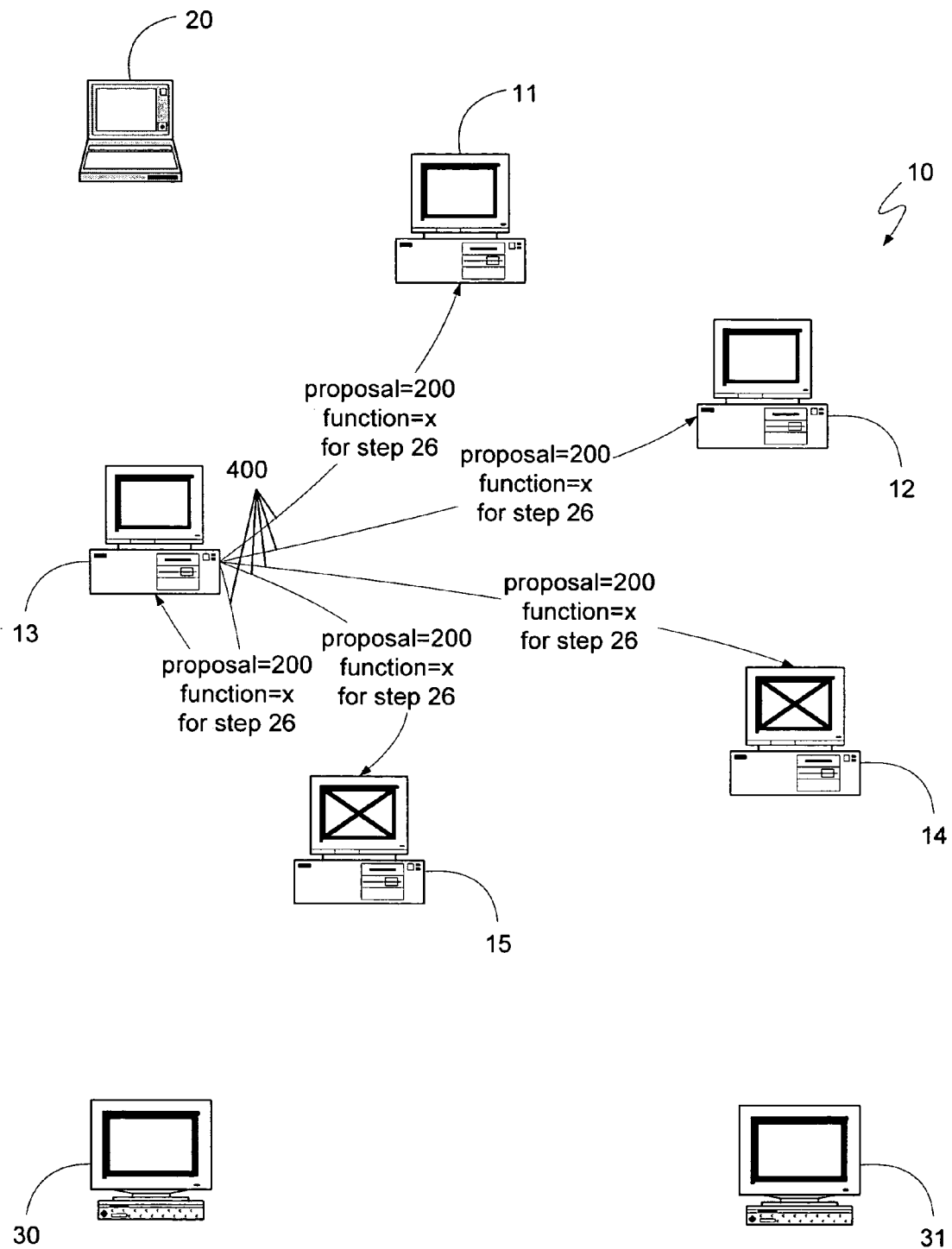
FIGS. 5a-c generally illustrate another aspect of the operation of multi-phase consensus algorithm contemplated by an embodiment of the present invention.
Figure 5B:
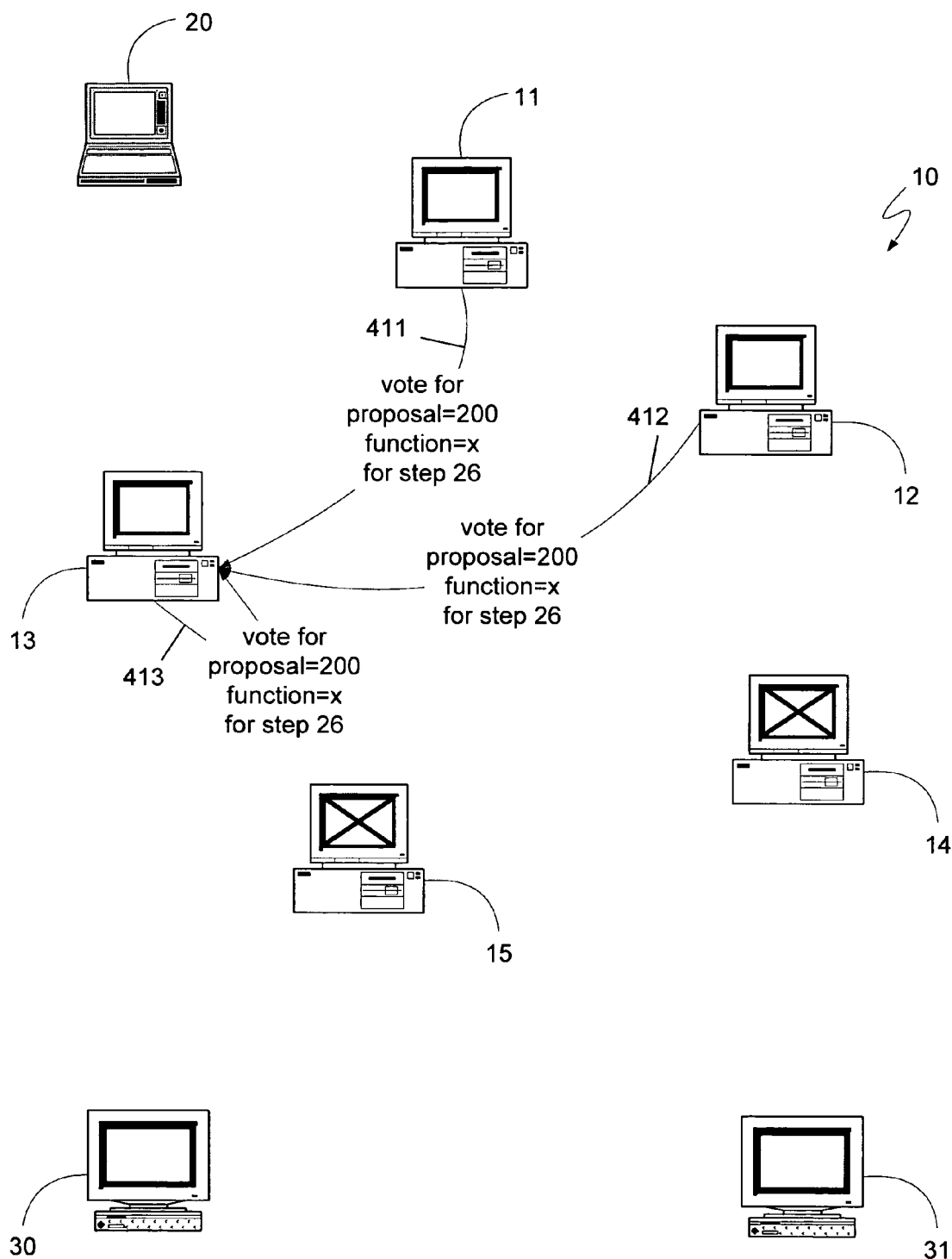

Turning to FIG. 5a, the exemplary distributed computing system 10 from FIGS. 4a-g is shown with the leader 13 proposing a function to be selected for a system step 26 that is subsequent to step 25 described in detail above. As a result of the first phase of the Paxos algorithm, as illustrated in FIGS. 4a-d, and described in detail above, the leader 13 already is aware that none of the devices 11-15 has voted for any proposals above step 25 and that proposal number 200 is, therefore, safe for all proposals for steps greater than step 25. Therefore, as shown in FIG. 5a, for step 26 the leader can initiate the second phase of the Paxos algorithm, without needing to perform the first phase again, and can send a message 400 soliciting votes for function "x", which was requested by the client in message 300. Each of the devices 11-15 can then respond with votes. However, to illustrate the fault-tolerant nature of the Paxos algorithm, FIG. 5b illustrates only devices 11-13 responding messages 411-413. Devices 14 and 15 may have experienced a fault and either did not receive message 400, or cannot respond to it.

Figure 5C:
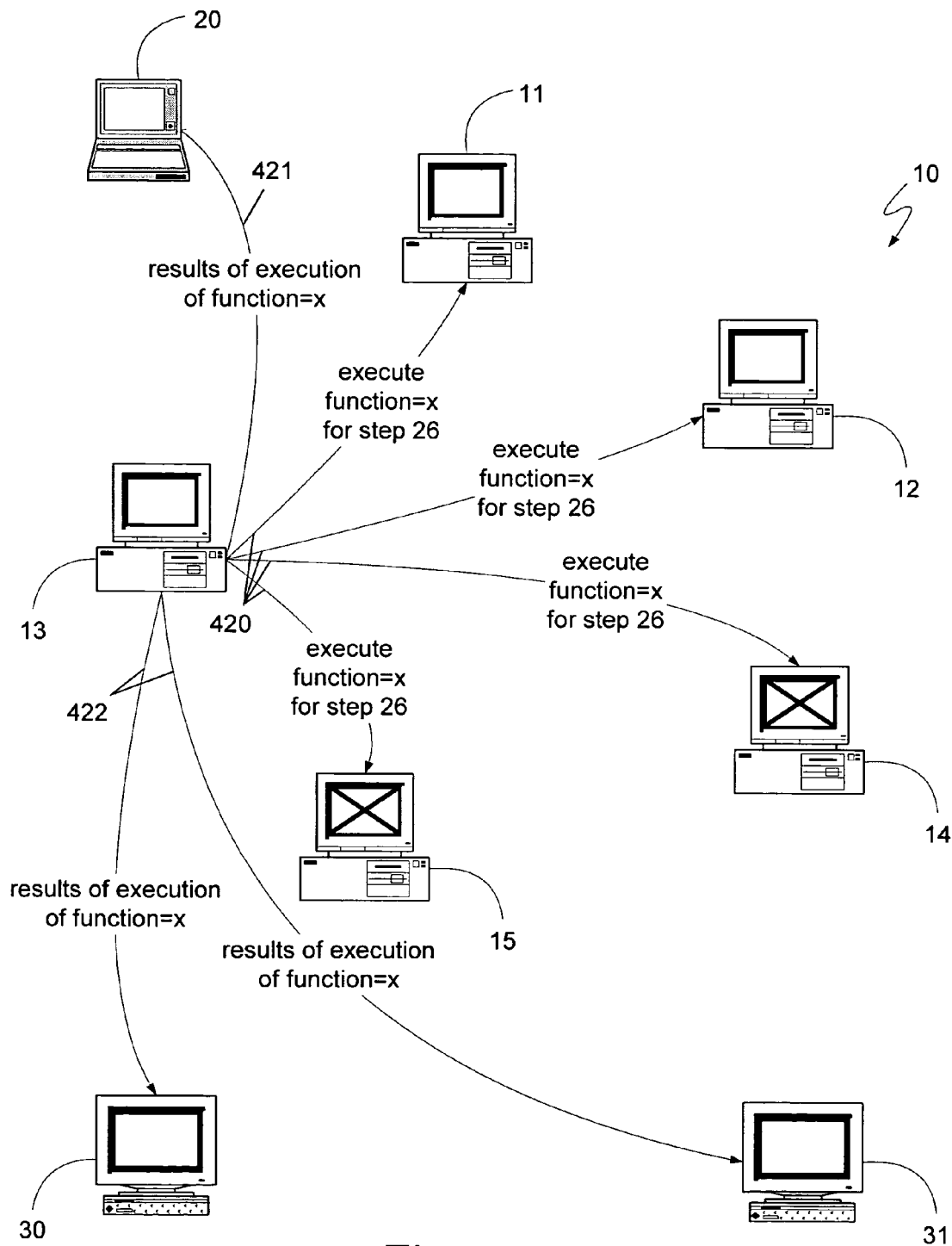

Nevertheless, the leader 13 can determine that the function "x" was selected because each of the devices in a quorum has voted for the execution of the function. As described above, a quorum can be any collection of at least a majority of the devices in the system implementing the Paxos algorithm, such as system 10. Consequently, while all of the devices 11-15 constitute one quorum of the system 10, devices 11-13, by themselves, constitute another quorum of the system 10. Because every device in the quorum comprising devices 11-13 has voted for function "x", the leader 13 can signal, with message 420, as shown in FIG. 5c, that function "x" was selected for step 26. In addition, because the leader 13 knows that the vote has succeeded, and as long as it is aware of the selected functions through step 25, it can execute function "x" for step 26 and can send the results of the execution of that function to the client as message 421, or to other interested computing devices, such as devices 30 and 31 as message 422. Messages 421 and 422 can be sent concurrently with message 420, or even before or after message 420.

As can be seen, once a leader has been established, and has learned the various highest numbered proposals voted on by the devices in the quorum for all upcoming step numbers, the leader can solicit proposals for a vote without cycling through the first phase of the Paxos algorithm. While the messages shown in FIG. 5a are described as taking place after the transmission of message 360 in FIG. 4g, the leader 13 need not wait for the devices to vote for one proposal before sending another proposal for a subsequent step. Therefore, upon sending message 340, as shown in FIG. 4e, the leader 13 can send message 400 shown in FIG. 5a, and can continue, in such a manner, proposing a series of functions, using proposal number 200, for steps greater than step 26. By operating in such an asynchronous fashion, the overall distributed computing system need not be slowed down by waiting to learn of votes for previous steps.

Should another device, such as a previously non-functioning device, attempt to become a leader, it would not cause the system to perform improperly, but would only succeed in causing the first phase of the algorithm to be repeated. For example, if another device attempted to become a leader, it might suggest a proposal number that some devices would respond to. Having responded to the proposal number offered by a second leader, the devices would then inform the first leader of the higher numbered proposal when the first leader solicited a vote, or the devices might ignore the request by the first leader to vote on its proposal. When the proposal failed, because an insufficient number of devices voted for it, the first leader would attempt to pass the proposal again by initially performing the first phase again and selecting what it believes is a sufficiently large proposal number which it can suggest to the devices. In such a manner, a second leader would only delay the system, but it would not cause improper operation on the part of the distributed computing system.

The devices implementing the Paxos algorithm, described above, can maintain variables storing information used in the algorithm. For example, for each step for which the devices do not know which function was chosen, the device can store the largest proposal number for which they responded to, the largest proposal number they voted for and the value of the corresponding proposal, and, if the device is a leader, it can additionally store the proposal number for the last proposal it issued. Additionally, devices can record which function was selected for all of the steps for which they have such information. Alternatively, a device could store a snapshot of its state at a given time, and the functions selected only since that time. For example, rather than storing each of the functions selected for steps 1-100, a device could store a snapshot of its state after the execution of step 75 and then only store the functions selected for steps 76-100, reducing the amount stored by a factor of four or more. Some or all of the above described information can be stored in either volatile storage 130 or non-volatile storage, such as hard disk 141, floppy disk 152, or optical disk 156, shown in FIG. 2.

Additional information regarding the Paxos algorithm can be found in the paper entitled "The Part-Time Parliament"

by Leslie Lamport, published in ACM Transactions on Computer Systems, volume 16, number 2 on pages 133-169, dated May 1998, which is hereby incorporated by reference in its entirety to further explain or describe any teaching or suggestion contained within the present specification that is consistent with its disclosures.

Modified Paxos Algorithm Using Auxiliary Devices in Case Of Failure

Figure 6A:
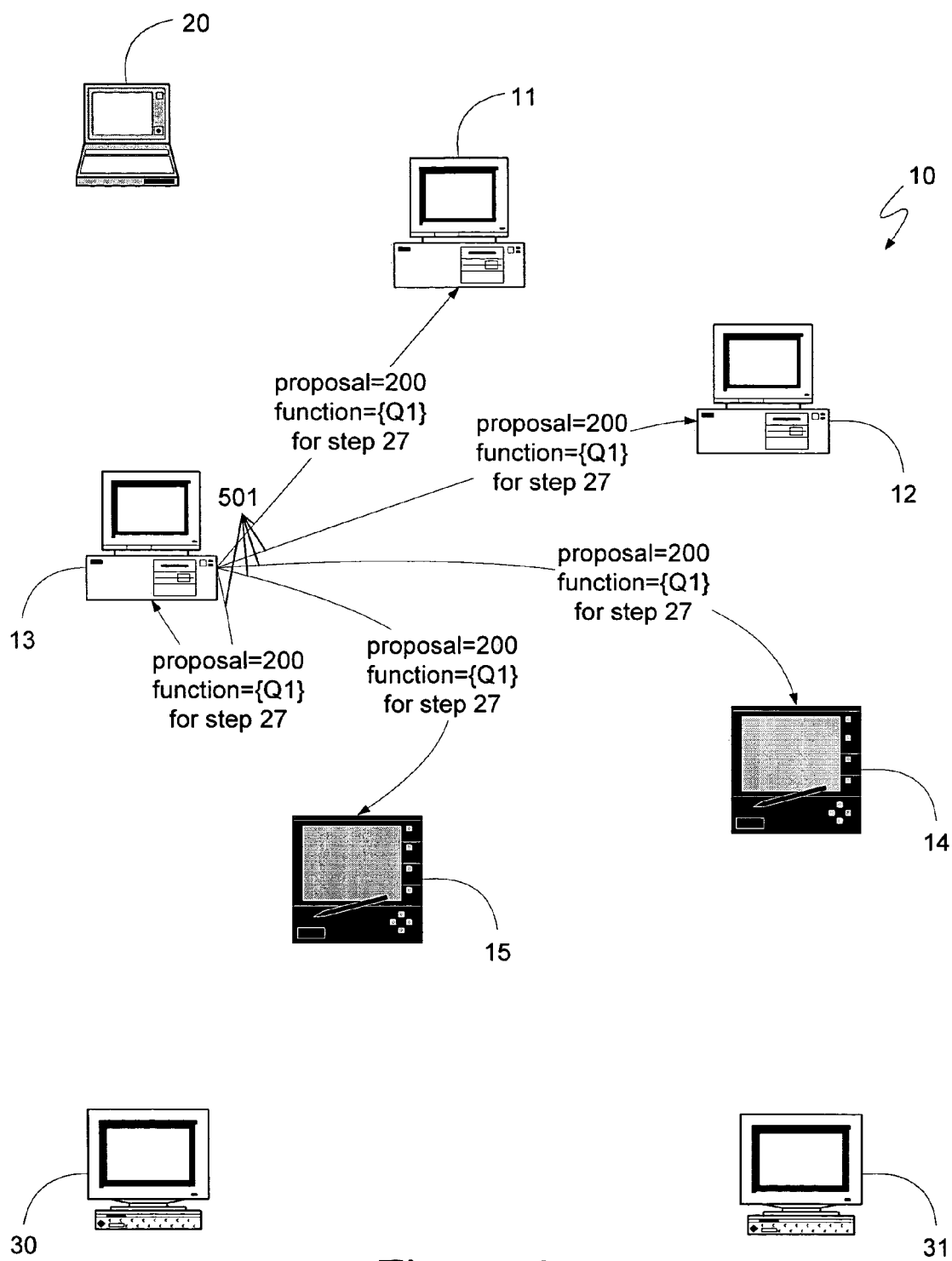
FIGS. 6a-c generally illustrate one aspect of the operation of a first multi-phase consensus algorithm using alternative devices contemplated by an embodiment of the present invention.

As can be seen from the above detailed description of the standard Paxos algorithm, as long as a majority of the devices of a distributed computing system operate properly, the remaining devices can receive little use. Turning to FIG. 6a, a distributed computing system 10 is shown, wherein computing devices 14 and 15 are now illustrated as handheld computing devices to signify their status as auxiliary devices. An auxiliary device, as contemplated by one embodiment of the present invention, is not necessarily an inexpensive computing device, such as a handheld computing device or even a consumer electronic gadget, but can be any computing device that either does not possess as much computing power as the other computing devices 11-13, or which cannot dedicate as much computing resources to the execution of a distributed computing algorithm as can the other devices 11-13. As will be shown below, the above described algorithms can be modified to accommodate such auxiliary devices, allowing the distributed computing system 10 to comprise a smaller number of dedicated, main computing devices than the above described distributed computing systems.

As described above, the Paxos algorithm can be conceptualized in two phases, a first phase in which the leader learns of proposable functions, and a second phase in which the leader proposes functions and the devices vote. Once the leader has completed the first phase, it can proceed to propose subsequent proposals using only the second phase. FIG. 6a illustrates an environment that can be considered a continuation of the environment illustrated in FIGS. 4 and 5, and described in detail above. Consequently, because the leader 13 has already performed the first phase, it can attempt to have a subsequent proposal selected by the distributed computing system 10 by commencing the second phase.

However, as shown in FIG. 6a, message 501 does not attempt to have the system 10 vote for a client request. Rather, message 501 proposes that the system 10 select a set of quorums that can be used to vote on future proposals. The proposed set of quorums can include one quorum that comprises all of the main computing devices 11-13 and other quorums of main and auxiliary computing devices such that any two quorums share at least one device in common. For example, the other quorums can each comprise a majority of the computing devices 11-15 that also includes at least one of the main computing devices 11-13. Alternatively, the other quorums can comprise a majority of the currently operating auxiliary computing devices 14-15 combined with at least one main computing device. In the illustrated example, message 501 proposes the selection of a set of quorums identified by "{Q1}", where the set "{Q1}" includes the quorums identified in Table 1.

TABLE 1

| The Set Of Quorums Identified By {Q1} | | |
|---|---|---|
| devices 11, 12, 13 | devices 11, 12, 15 | devices 12, 13, 14 |
| devices 11, 12, 13, 14 | devices 11, 12, 14, 15 | devices 12, 13, 15 |
| devices 11, 12, 13, 15 | devices 11, 13, 14 | devices 12, 13, 14, 15 |
| devices 11, 12, 13, 14, 15 | devices 11, 13, 15 | devices 11, 14, 15 |
| devices 11, 12, 14 | devices 11, 13, 14, 15 | devices 12, 14, 15 |
| | | devices 13, 14, 15 |

As an example, the figures will illustrate that the proposed set of quorums begins operation starting with step 28. However, one mechanism contemplated by an embodiment of the present invention calls for each proposed set of quorums to not begin operation until a predefined number of steps after the current step. For example, any proposed set of quorums could begin operation 10 steps beyond the current system step. Such a predefined increment can be stored by one or more of the main computing devices 11-13 in such a manner that, upon receiving an indication that a set of quorums was selected, the main computing devices can each independently determine that the selected set of quorums can begin operation at a particular future step.

By creating a buffer of a predefined number of steps between the current step and the step at which a selected set of quorums commences operation, the leader of a quorum can propose multiple functions in parallel, enabling the system to act in a more efficient manner. For example, once a leader proposes a function to be executed by the distributed computing system at a particular step, it need not wait to receive responses from the devices to whom the function was proposed. Instead, the leader can proceed to propose another function to be executed at a subsequent step. Thus, while the devices are processing and responding to one proposal for one system step, the leader can be processing and proposing another proposal for a subsequent system step. In such a manner, neither the leader nor the devices need to wait on one another. Therefore, embodiments of the present invention contemplate that multiple instances of the described algorithms can be run in parallel so as to achieve a greater efficiency and minimize the amount of time any device spends waiting on information from other devices.

However, if one system step can change the set of quorums for all steps starting with the next step, the leader may not know to which quorum to propose a function for the next step until it learns and executes the current step. Thus, unless a newly selected set of quorums takes effect some predefined number of steps in the future, the leader can be constrained to wait for the selection of a function for each step to complete before it can be certain of an appropriate quorum to which to propose a function for the next step. Therefore, one mechanism contemplated by an embodiment of the present invention calls for a predefined number of steps between the selection of a new set of quorums and the step at which the selected new set of quorums begins operation. In such a manner, the leader can propose a series of functions for a series of system steps even if it does not know the immediately preceding step, because the leader can know that even if the immediately preceding step selected a new set of quorums, the newly selected set of quorums will not take effect until a predefined number of step into the future.

However, for illustrative purposes, the present example, shown in the figures, selects a set of quorums that does begin operation at the next step. Returning to FIG. 6a, the leader 13 can propose a function that defines the set of quorums enumerated in Table 1 above. In the manner described above, the proposal of message 501 can include a proposal number of 200, and indicate that it is a proposal for system step 27.

Figure 6B:
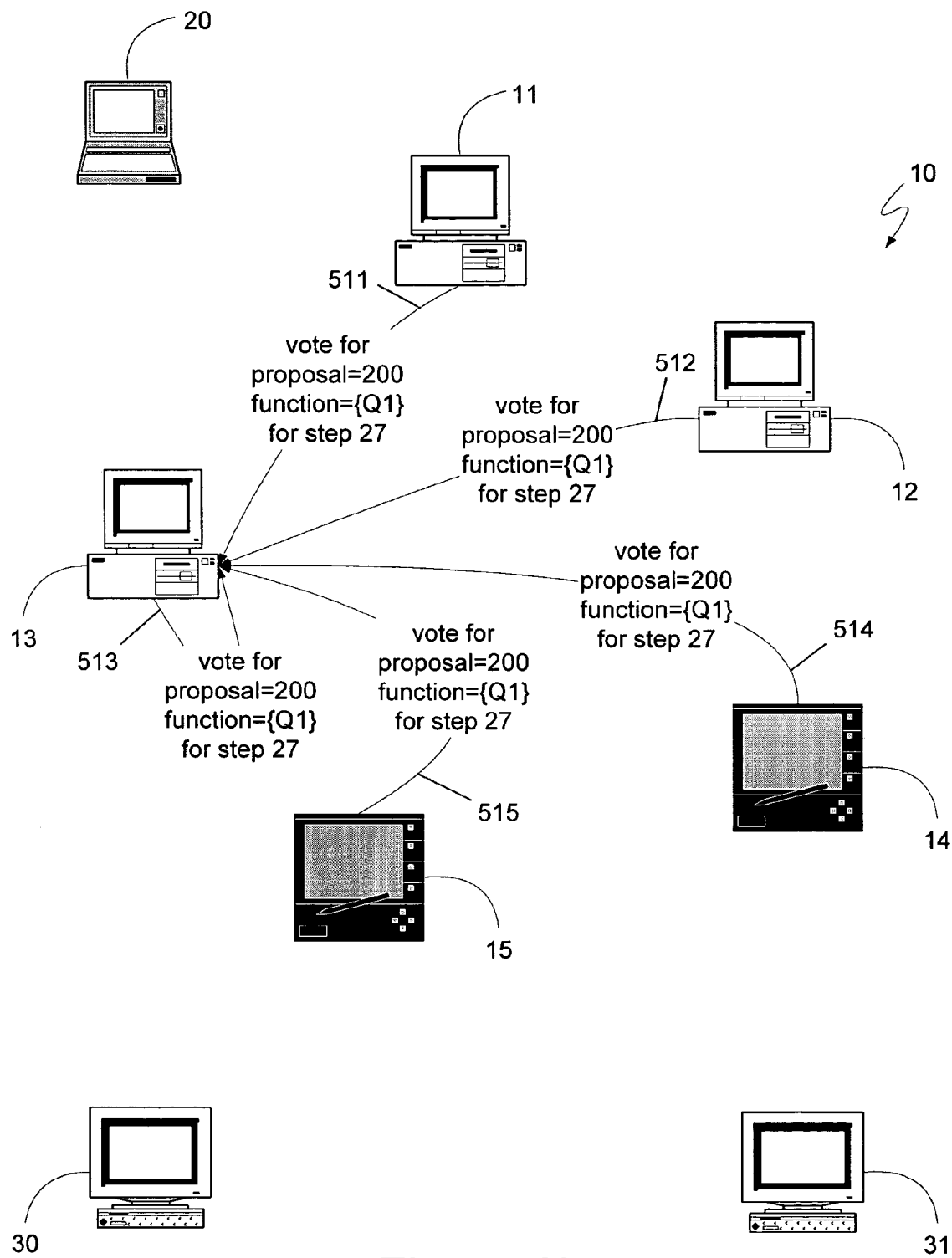

Turning to FIG. 6b, devices 11-15 are shown responding with a vote for the proposed function in messages 511-515. As explained above, for a system 10 comprising five devices, any three or more can be a quorum. Consequently, even if two of the devices had not responded, the system 10 could still have selected the proposed function.

Figure 6C:
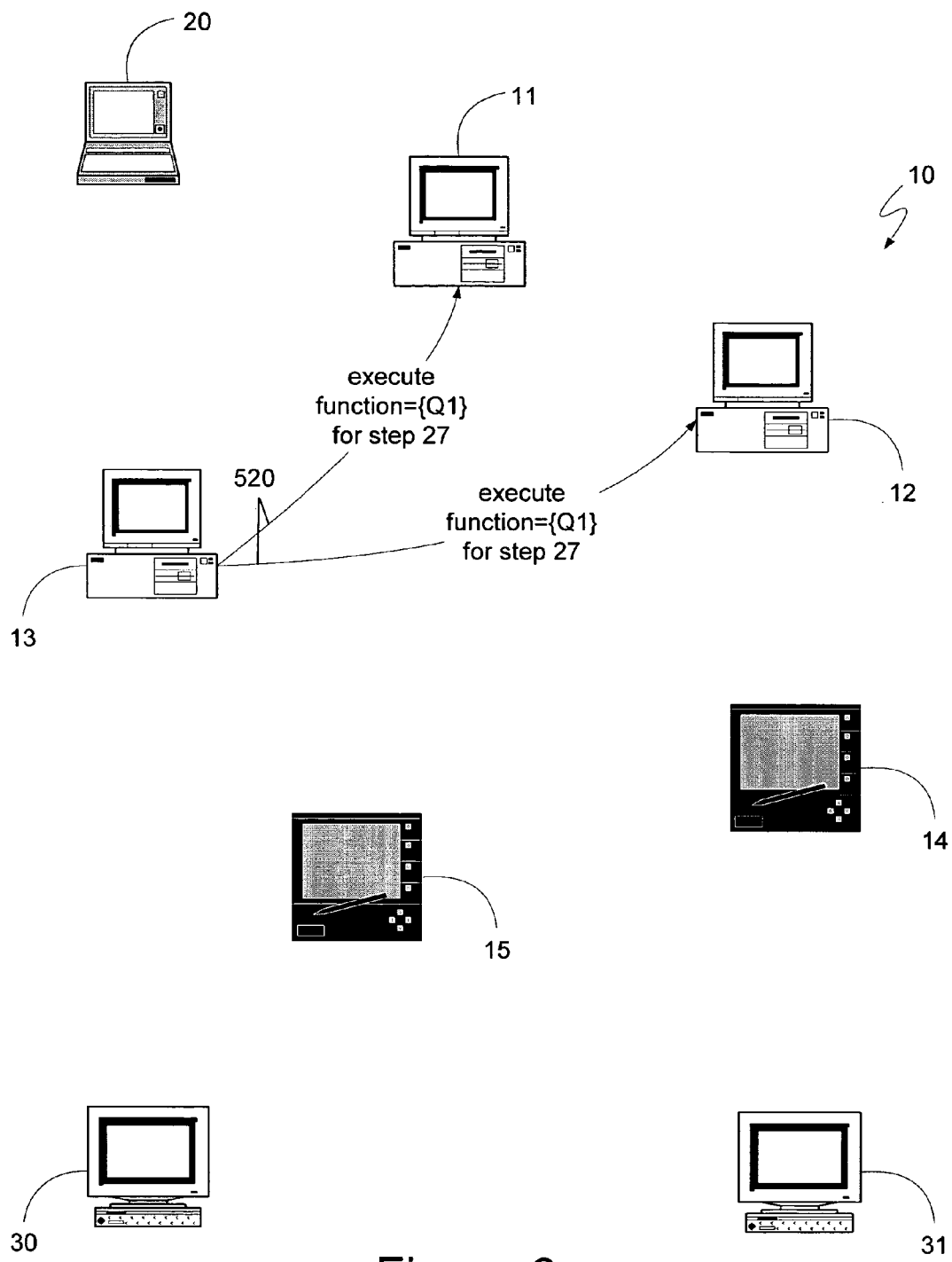

Turning to FIG. 6c, the leader 13 can determine that the function proposed by message 501 has been selected when the leader receives a response from a quorum of devices. Because messages 511-515 indicate that a quorum of devices has voted for the proposal, the leader 13 can know that the proposal has been selected and can, therefore send a message such as message 520 to indicate that the proposal was selected. While message 520 is shown as being transmitted only to the main computing devices 11 and 12, it can also be sent to the auxiliary devices 14 and 15 to inform them of the selection of the new set of quorums. However, because the leader 13 is already aware that the proposal has been selected, it need not transmit a message to itself, even internally.

The message 520 can also, for devices 11-13, be part of a process by which the leader 13 ensures that those devices are aware of all functions selected for all previous system steps. For example, because a device may not be able to execute a function for a given system step until the device has learned of, and executed, the functions selected for previous system steps, the execute command of message 520 can serve to initiate an internal check at devices 11 and 12. Specifically, since devices 11 and 12 may not be able to execute the selected function for step 27 until they have learned of, and executed, the selected functions for steps 1-26, the leader 13 can, by requesting that they execute the selected function for step 27, force each device to verify that they are aware of the functions selected for all previous system steps. Message 520 can also, in a similar manner, enable the leader 13 to ensure that its knowledge of previously selected functions, such as functions for which it was not the leader, or functions for which it was not in the quorum that selected the function, is complete to the present system step.

Alternatively, rather than sending an execute request 520, the leader 13 can simply poll the devices 11 and 12 to determine whether they have learned and executed the functions selected for all previous system steps. If one of the devices 11 and 12 has not learned the selection of a function for a particular system step, it can request the missing information from the leader 13 or from another device. Such communications need not be appended to a particular phase of the above described algorithms, but can be independently initiated by the leader 13 or one or more of the devices 11 and 12 upon completion of the selection of the new set of quorums.

Another advantage to ensuring, after a new set of quorums has been selected, that all of the main computing devices are aware of the functions selected for all previous system steps is to avoid the selection of a single function for more than one system step. For example, if the distributed computing system 10 maintained a banking database, and a client 20 requested a function that withdrew $100 from their account, the system 10 should only execute that withdrawal function one time. One mechanism for avoiding the selection of the same function for multiple steps contemplated by an embodiment of the present invention calls for a unique identifier to be assigned. In such a case, before executing a selected function, each device could verify that it has not previously executed a function having an identical identifier. Execution of the function can be defined to have no effect if that function has already been executed. Alternatively, the leader can, prior to proposing a function, verify that a function having an identical identifier has not previously been selected. In such a case, it can be advantageous to periodically verify that the leader and the devices are aware of previously selected functions.

Once the leader 13 and the devices 11 and 12 are aware of, and have executed, the functions selected for a sufficient number of prior system steps, the operation of the system 10 can resume and the leader can choose a quorum from the selected set of quorums. Specifically, the leader 13 can select a quorum comprising only the main computing devices 11-13. As will be illustrated below, a quorum comprising all of the main computing devices can be a preferred quorum, and the other quorums can be used when the preferred quorum of main computing devices fails. Thus, among the set of quorums illustrated by Table 1, the first listed quorum comprising main computing devices 11-13 can be the preferred quorum because it is comprised of only main computing devices.

Figure 7A:
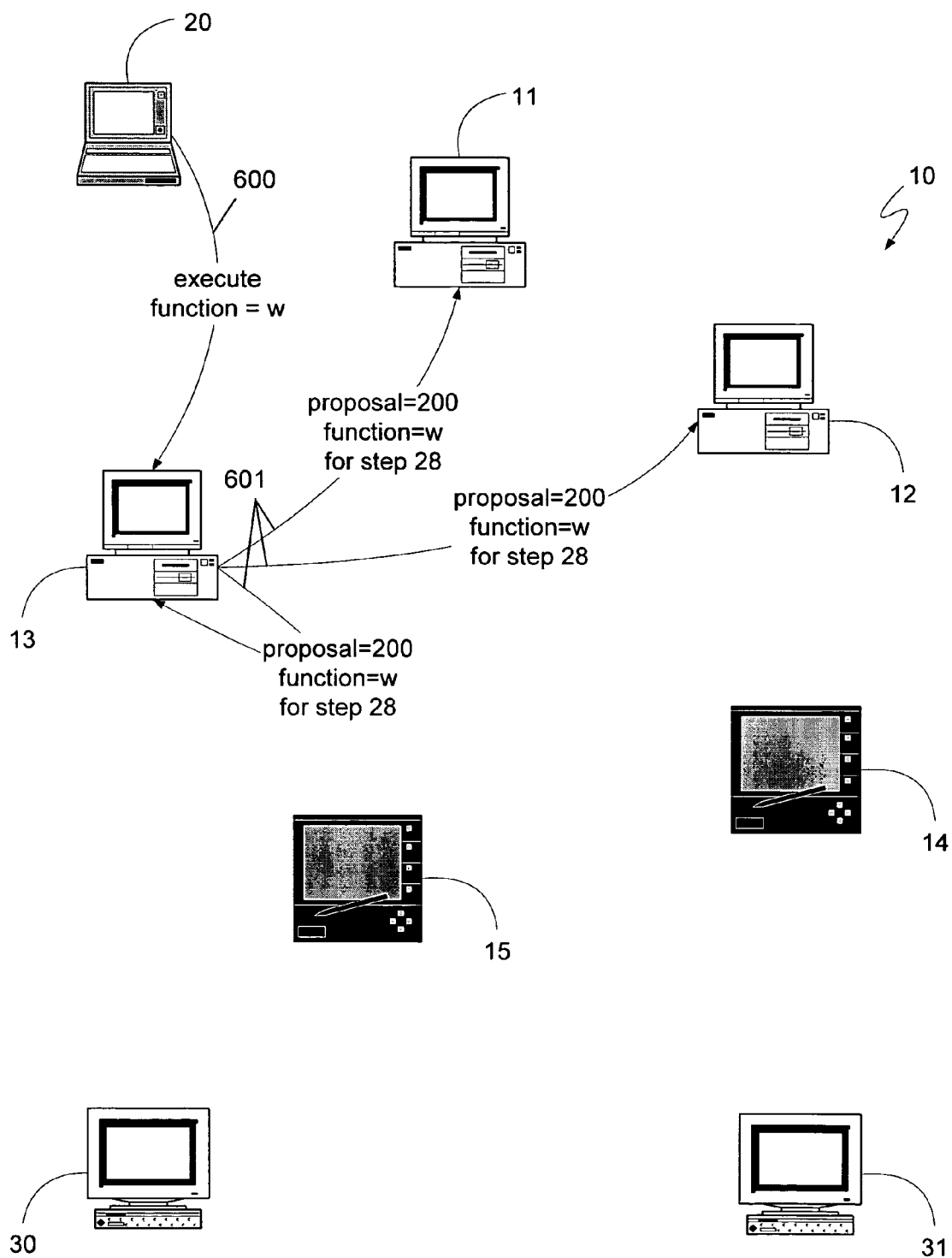
FIGS. 7a-c generally illustrate one aspect of the operation of a multi-phase consensus algorithm using alternative devices contemplated by an embodiment of the present invention.
Figure 7B:
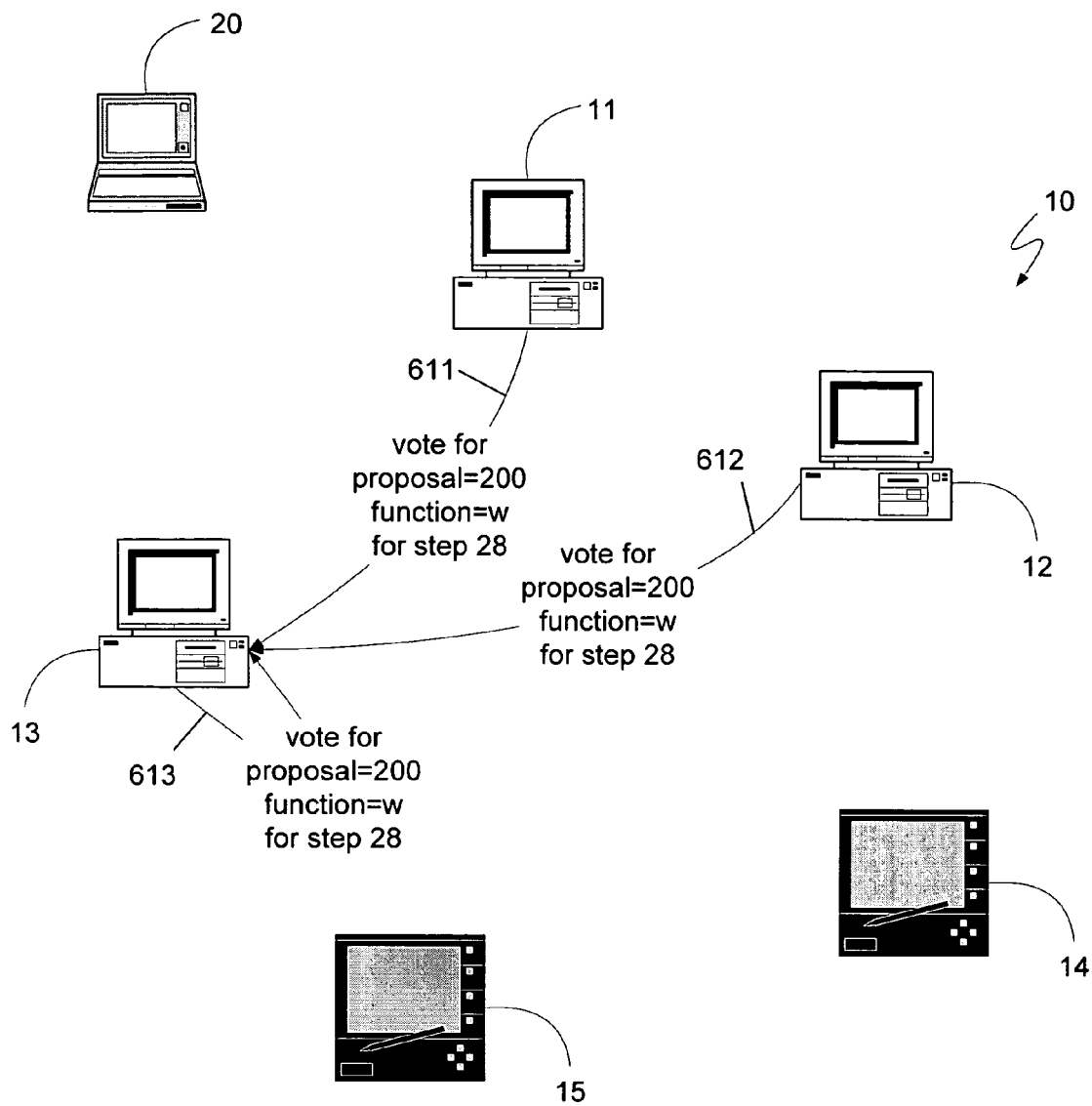
Figure 7B:
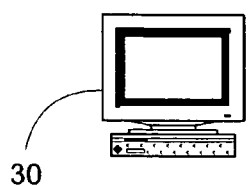
Figure 7B:
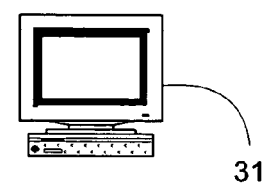
Figure 7C:
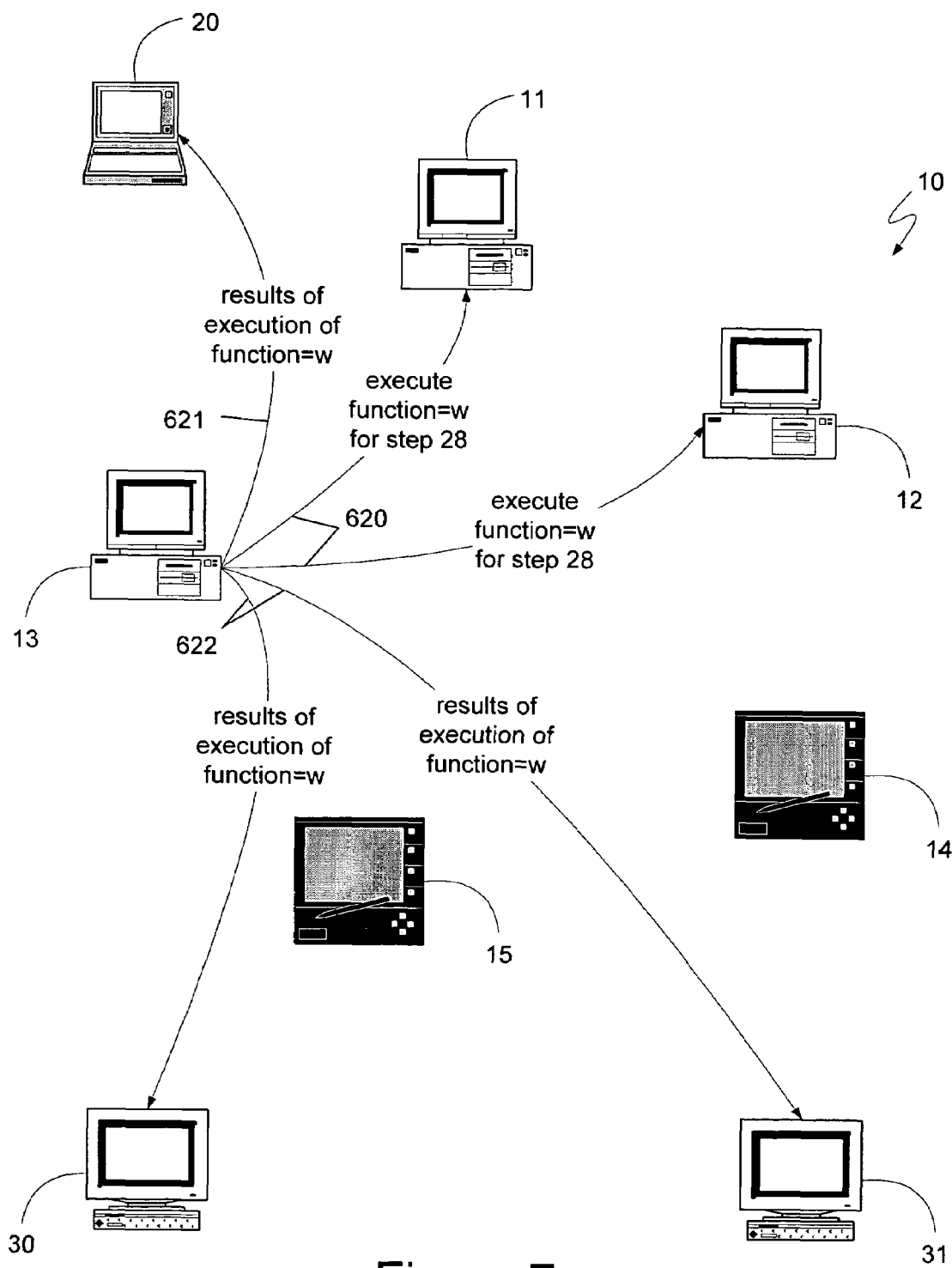

Turning to FIG. 7a, a client 20 of the distributed system 10 can send a request 600 that the system execute a function represented by the variable "w". While the request 600 is illustrated as being directly delivered to the leader 13, the client 20 could have sent the request to any of the devices of the distributed computing system 10. If one of the other devices, such as devices 11 or 12, had received the request 600, it could either have attempted to become the leader, such as by initiating the first phase of the Paxos algorithm, described in detail above, or it could have simply forwarded the request 600 to the leader 13. For exemplary purposes, FIGS. 7a-c illustrate the operation of the system 10 as if the leader 13 had, either directly or indirectly, received the request 600.

Because the leader 13 of the quorum comprising devices 11-13 is the same as the leader of the quorum comprising devices 11-15, whose operation was described in detail above with reference to FIGS. 6a-c, it does not need to perform the first phase of the Paxos algorithm. Rather, it can propose function "w" by sending a message, such as message 601, initiating the second phase of the Paxos algorithm. However, instead of sending this message to the previous quorum of devices, it can now send message 601 to the new quorum, comprising devices 11-13, which is a quorum in the set of quorums previously selected, as illustrated by Table 1.

Upon receipt of message 601, each of the devices 11 and 12 can determine whether to vote for the proposal to execute the function "w". As explained in detail above, a device can vote for a proposed function if it has not responded to a message with a higher proposal number than the proposal number being used to solicit its vote. Thus, if one of the devices 11 or 12 had, for example, responded to a message with a larger proposal number than 200, then it could not vote for the function proposed in message 601, as the proposal number of message 601 is 200. However, as illustrated in FIG. 7b, for this particular example, each of the devices 11-13 can determine that they can vote for the proposed function, and each of them can respond with an appropriate vote message 611-613, respectively.

Upon receiving messages 611-613, the leader 13 can determine that the function "w" was selected and, depending on the function and the leader's knowledge of previously selected functions, the leader can execute the function. In addition, as shown in FIG. 7c, the leader 13 can send message 620 to devices 11 and 12 indicating that the function "w" was selected and that devices 11 and 12 can execute that function for the current system step. The leader 13 can also send a message 621 back to the client 20, if appropriate, informing the client of the results of the execution of the function "w". Similarly, the leader 13 can send message 622 informing other devices, such as devices 30 and 31 of the results of the execution of the selected function as well. Alternatively, devices 30 and 31 can act as learner devices and independently maintain the state of the system 10 even though they do not participate in the selection of functions. In such a case, the leader 13 need not send the results of the execution of the selected function, but can merely transmit, via message 622, the fact that the function was selected. Message 622, therefore, would be similar to message 620 as opposed to message 621.

FIG. 7c illustrates device 13 acting as a distinguished learner by receiving the votes from the devices 11 and 12, learning that a function was selected, and then relaying this information on to both devices in the quorum and other devices. However, there is no requirement that the leader 13 act as the distinguished learner. For example, another device, such as device 11, could act as the distinguished learner. In such a case, the devices 11-13 could send messages 611-613 to device 11, and device 11 could send the messages illustrated in FIG. 7c. Alternatively, one message delay can be saved, at the cost of an increased amount of network traffic, by having each of the devices 11-13 send their votes to all of the other devices. In such a case, each of the devices 11-13 would have independently learned that function "w" was selected, and the leader 13 would not have needed to transmit a message, such as message 620. Additionally, any of the devices 11-13 could have transmitted messages 621 and 622 to the client 20 and the learner devices 30 and 31, respectively.

Because devices 11-13 constitute a quorum, each of those devices' votes can be required for a proposed function to be selected. Thus, if one of the devices 11-13 did not respond to message 601, the proposal may not have been selected. As indicated above, one reason that a device might not vote for a proposal is because the device received a message with a higher proposal number. In such a case, the leader 13 can attempt to address the higher proposal number issue in an effort to have the devices 11-13 select the leader's proposal, by performing the first phase of the Paxos algorithm in the manner described above.

However, often the leader 13 cannot determine why a particular device is not voting for a proposal. For example, while the device may not be voting for the proposal because of a response to a message with a higher proposal number, it is also possible that the device may not be voting for the proposal because it has failed or the communication medium between the leader and the device has failed. Because performing the first phase of the Paxos algorithm can only address one possible reason for a no-vote condition, a leader can instead attempt to remove the non-responding device from the group of devices upon which the set of quorums selected above, and enumerated in Table 1, is based.

However, removing a device that is functioning properly and may not have voted because it responded to a message with a higher proposal number, reduces the number of devices and thereby decreases the system's fault tolerance. Consequently, rather than simply attempting to define a new set of quorums to exclude a device from which it has not received a response, the leader and the other devices in the quorum, can share information regarding the proper operation of the devices of the quorum. For example, one mechanism contemplated by an embodiment of the present invention calls for an array to be maintained indicating, for each device, whether each of the other devices believes it is operational. A device could change an entry in the table by submitting a state machine command. The table could then be consulted by the leader, or another device, prior to proposing a set of quorums that excludes any device based on a belief by the proposer that the device has failed.

Figure 8A:
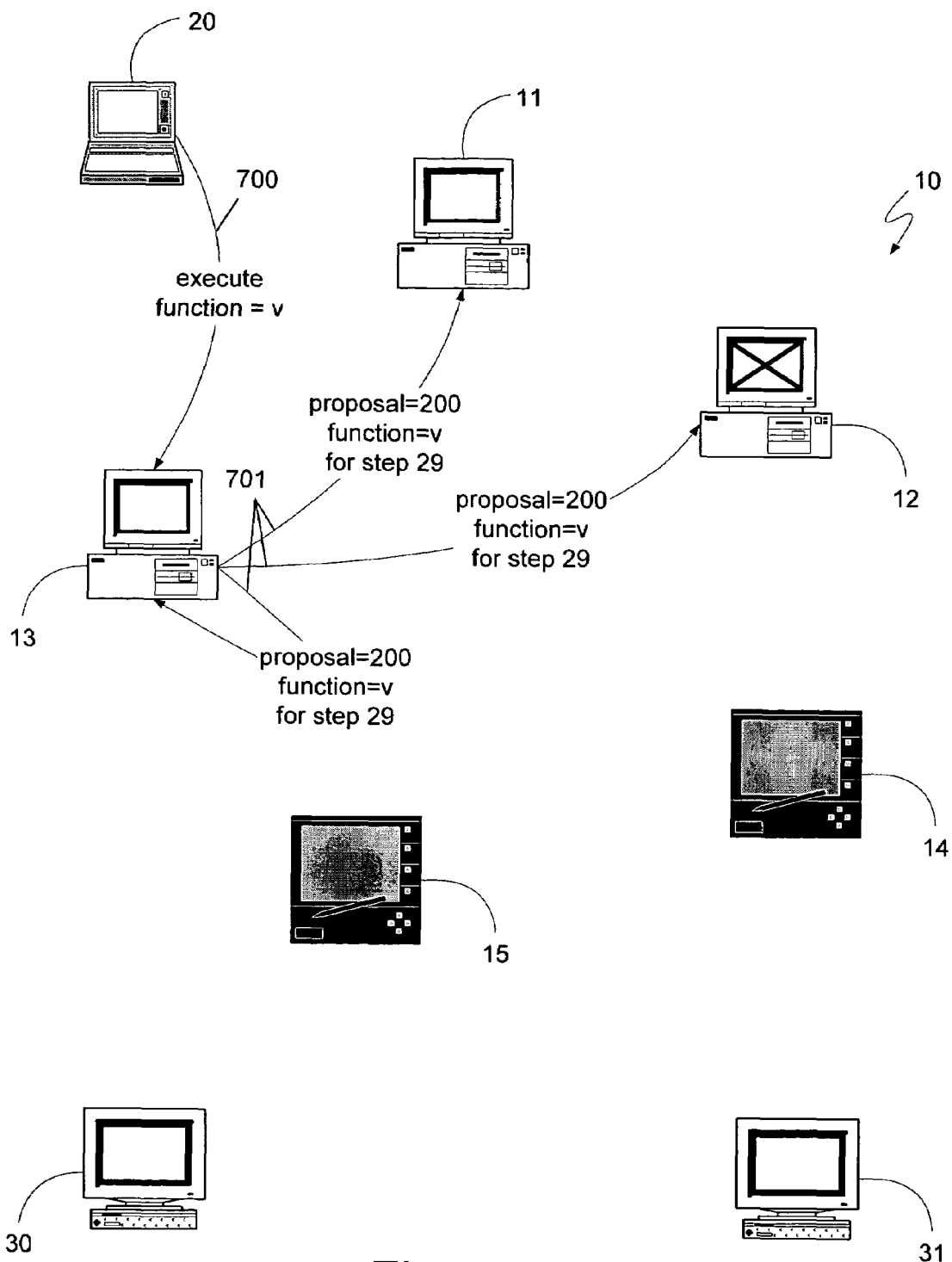
FIGS. 8a-e generally illustrate another aspect of the operation of a first multi-phase consensus algorithm using alternative devices contemplated by an embodiment of the present invention.

Turning to FIG. 8a, device 12 is illustrated as having experienced a failure. While the failure of device 12 can be detected using the above described system, the present invention contemplates any number of implementations of detecting or otherwise agreeing that a particular device has failed. Nevertheless, the exemplary failure of device 12, however detected, is used to illustrate an aspect of the modified Paxos algorithm according to one embodiment of the invention.

As in FIG. 7a, FIG. 8a illustrates the receipt by the leader 13 of a request 700 from a client 20. As above, the request 700 can be delivered to the leader 13 directly from the client 20, or indirectly. The request 700 indicates that the client 20 desires that the distributed computing system 10 execute the function represented by the variable "v". As a result, the leader 13 proposes, using the next step number of 29, and the previously used proposal number of 200, that the function "v" be voted for by the quorum comprising devices 11-13. Such a proposal is illustrated by message 701.

Figure 8B:
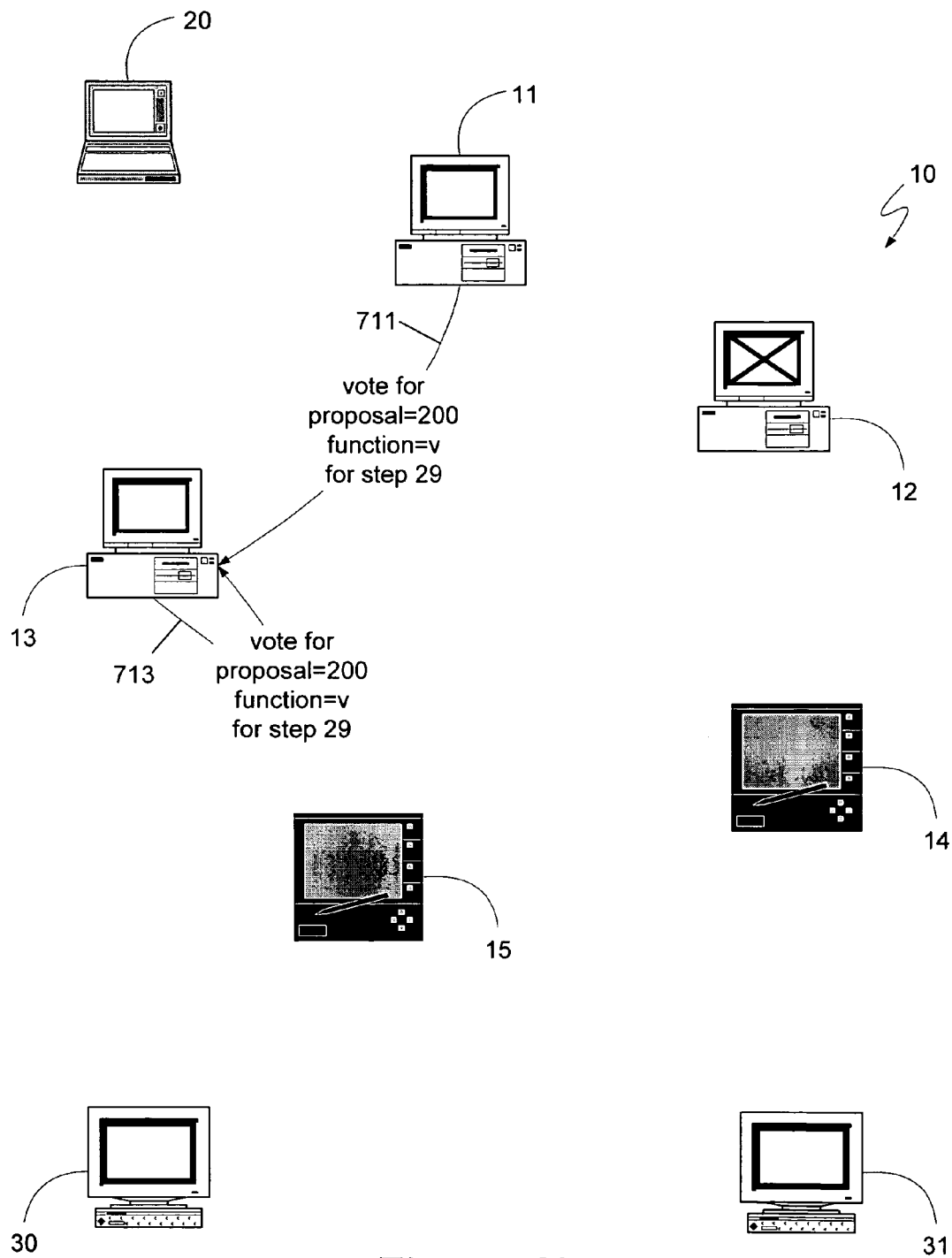

Unlike FIG. 7a, however, in FIG. 8a device 12 is illustrated as having suffered a failure. As explained above, such a failure could be of the device itself, such as a software or hardware failure, or it could be of the communication medium between device 12 and the leader device 13. Consequently, as illustrated in FIG. 8b, device 12 does not transmit a vote message to the leader 13. Instead, the leader 13 receives votes messages 711 and 713 from devices 11 and 13, respectively. Because less than a quorum of devices has voted for the function, the function has not been selected. In addition, the quorum comprising devices 11-13 has ceased functioning because device 12 is experiencing a failure that is preventing its communication with the leader 13. The leader 13 can, therefore, attempt to have the function "v" selected by an alternative quorum that is also part of the set of quorums previously selected, and enumerated in Table 1, above. In addition, the leader 13 can attempt to select a new set of quorums that comprises quorums that do not include device 12.

Figure 8C:
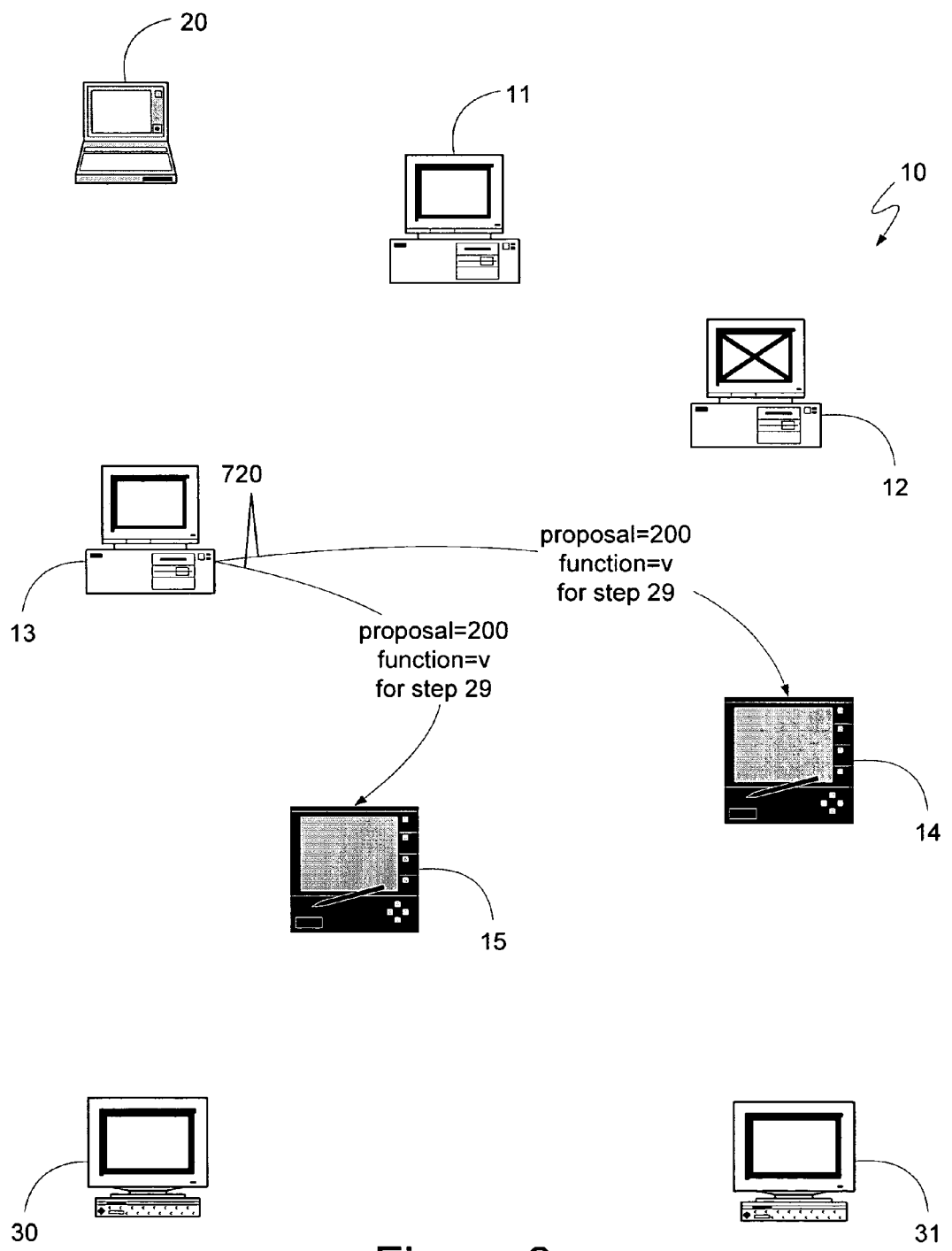

Turning to FIG. 8c, the leader attempts to have the function "v" selected by another quorum from the previously selected set of quorums. Specifically, for the illustrated example, the leader selects the quorum comprising devices 11 and 13-15. Because the leader device 13 remains active, it can simply reattempt the failed vote using the newly selected quorum by sending a message 720, which is analogous to the previously sent message 701. While the selected quorum comprises devices 11 and 13-15, the leader 13 need not send message 720 to devices 11 and itself, since it has already sent an analogous message 701 to those two devices, and has already received their votes, in the form of messages 711 and 713, as shown in FIG. 8b. Therefore, message 720 can be sent to the devices of the newly selected quorum that were not part of a previous quorum and did not already vote for the proposal.

Figure 8D:
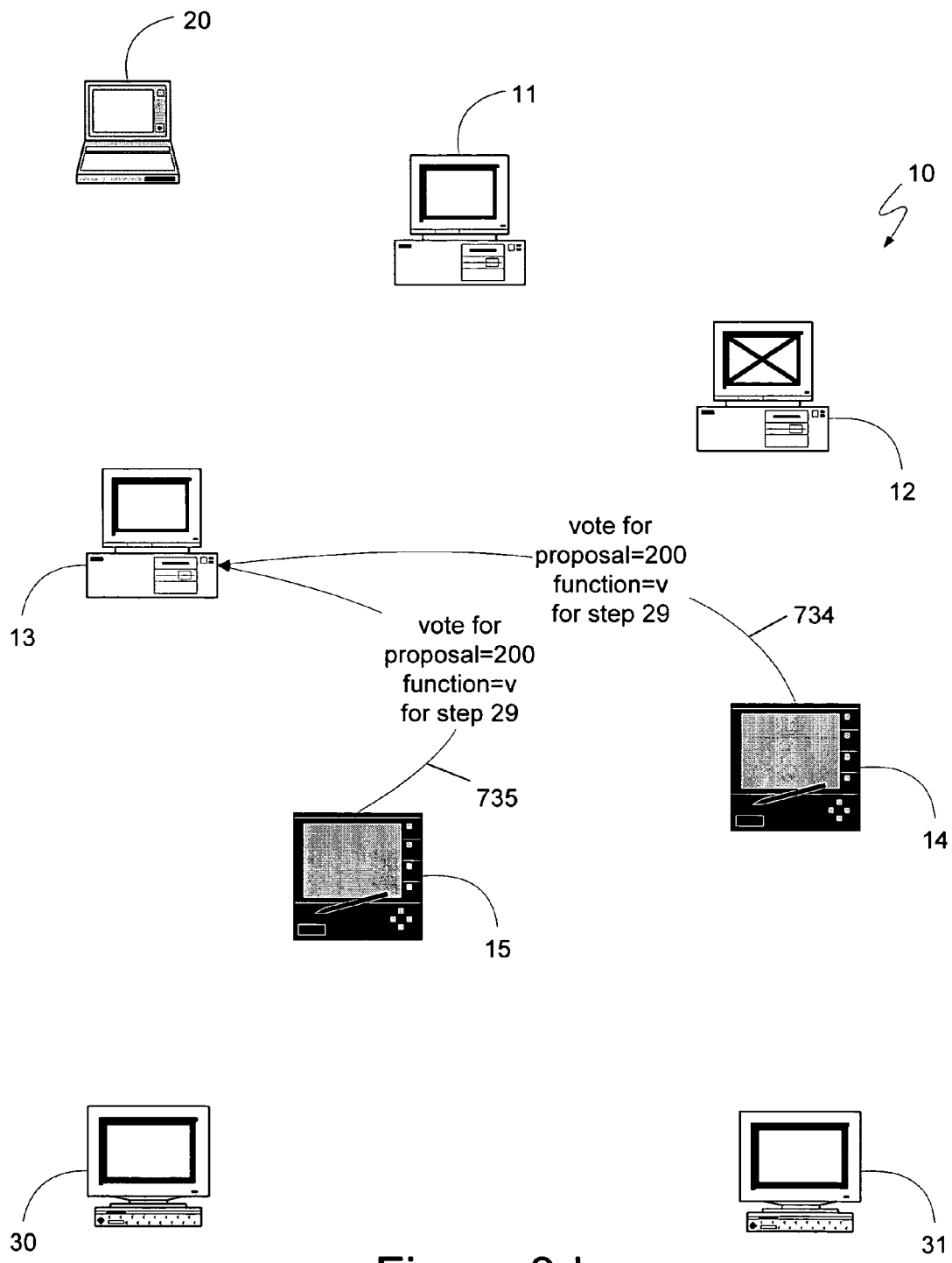

Turning to FIG. 8d, each of the devices 14-15 that received message 720 are shown voting for that proposal via messages 734-735. Because devices 11 and 13-15 comprise a quorum, upon receiving messages 734-735, and combining them with the previously received vote messages 711 and 713 illustrated in FIG. 8b, the leader 13 can determine that the proposal was accepted. In fact, even if one of the devices 11 and 13-15 had not responded, the remaining three devices also constitute a quorum that is one of the selected quorums, as evidenced by the listing of Table 1, and the leader could have relied on that quorum to determine that the proposal was selected.

Figure 8E:
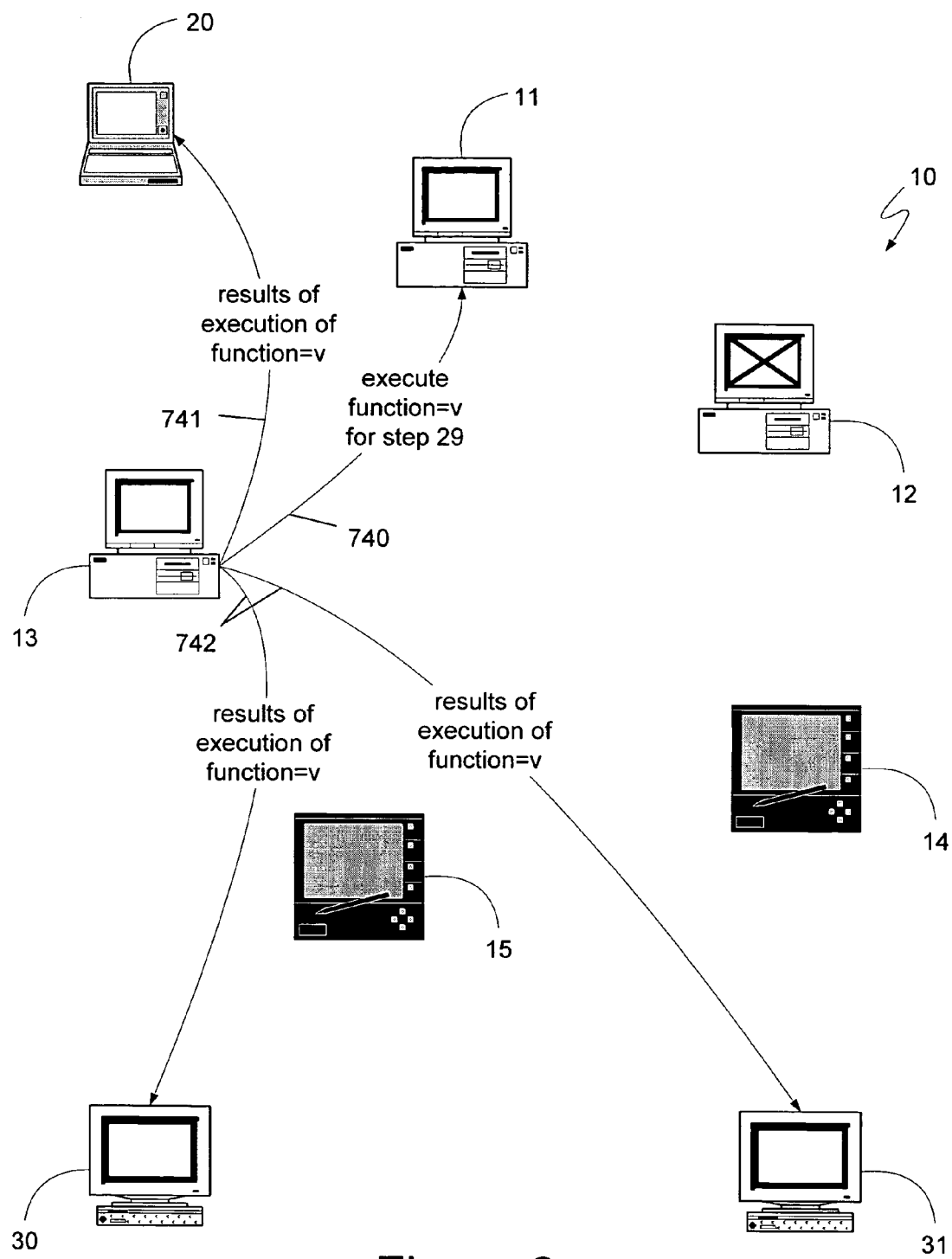

Because the proposal of executing the function "v" for step 29 was accepted by the distributed computing system 10, the leader 13 can, depending on the function and the leader's knowledge of previously selected functions, execute the function "v" for step 29 and can transmit the results of that execution, if appropriate, to the client 20 that had requested the function to be executed, such as by sending message 741 as illustrated in FIG. 8e. As also illustrated in FIG. 8e, the leader can send messages 742 informing computing devices 30 and 31 of the results of the execution of the function "v" or, as indicated above, if devices 30 and 31 are learner devices, the leader 13 can simply send an indication that function "v" was selected for step 29. In addition, the leader 13 can send a message, such as message 740, informing device 11 of the decision to execute function "v" for step 29. Because devices 14 and 15 are auxiliary computing devices that need not maintain a state of the system 11, they do not need to be instructed to execute the selected function. Rather, as has been shown, such auxiliary devices can aid in the selection of a quorum, and can vote for proposals when the selected quorum experiences a failure.

In the exemplary illustration described above, a computing device that was not acting as the leader, namely computing device 12, experienced a failure. If the leader computing device 13 had, instead, experienced a failure, the voting for the proposal transmitted in message 701 would similarly have failed. However, because the system 10 would have been left without a leader, a new leader device could have been chosen from among the main computing devices that were still operational. Subsequently, the new leader could attempt to resubmit the current proposal to a quorum of devices from the selected set of quorums in the manner illustrated in FIG. 8c.

However, because, in that case, a new leader device would have been selected, the first phase of the above described Paxos algorithm can be performed by the new leader device prior to submitting any proposals. As described in detail above, the execution of the first phase of the Paxos algorithm can provide the newly selected leader with sufficient information to learn of pending proposals which were not completed by the previous leader. The execution of the first phase of the Paxos algorithm can also provide the newly selected leader with sufficient information to learn of proposals that were already selected. In the case of proposals that were already selected, the other devices of the quorum can, rather than responding with last vote information, simply indicate that a particular proposal was selected. The new leader can then concentrate on the pending proposals that were not selected, including the proposals that were being voted upon when the previous leader failed, and can submit them to the alternative quorum comprising one or more of the auxiliary devices. After the pending proposals were submitted, the execution can proceed as described above in reference to FIGS. 8c-e.

Whether the leader or another main computing device fails, the net result is that the only quorum from the selected set of quorums that was comprised exclusively of main computing devices is no longer operational. Consequently, to continue operation using quorums from the selected set of quorums, the system may rely on at least one auxiliary computing device. Because such auxiliary computing devices may not provide an optimal environment for performing the above described functions, a new set of quorums, which can include a quorum comprised of the working main computing devices, can be selected by a quorum from the previously selected set of quorums.

Figure 9A:
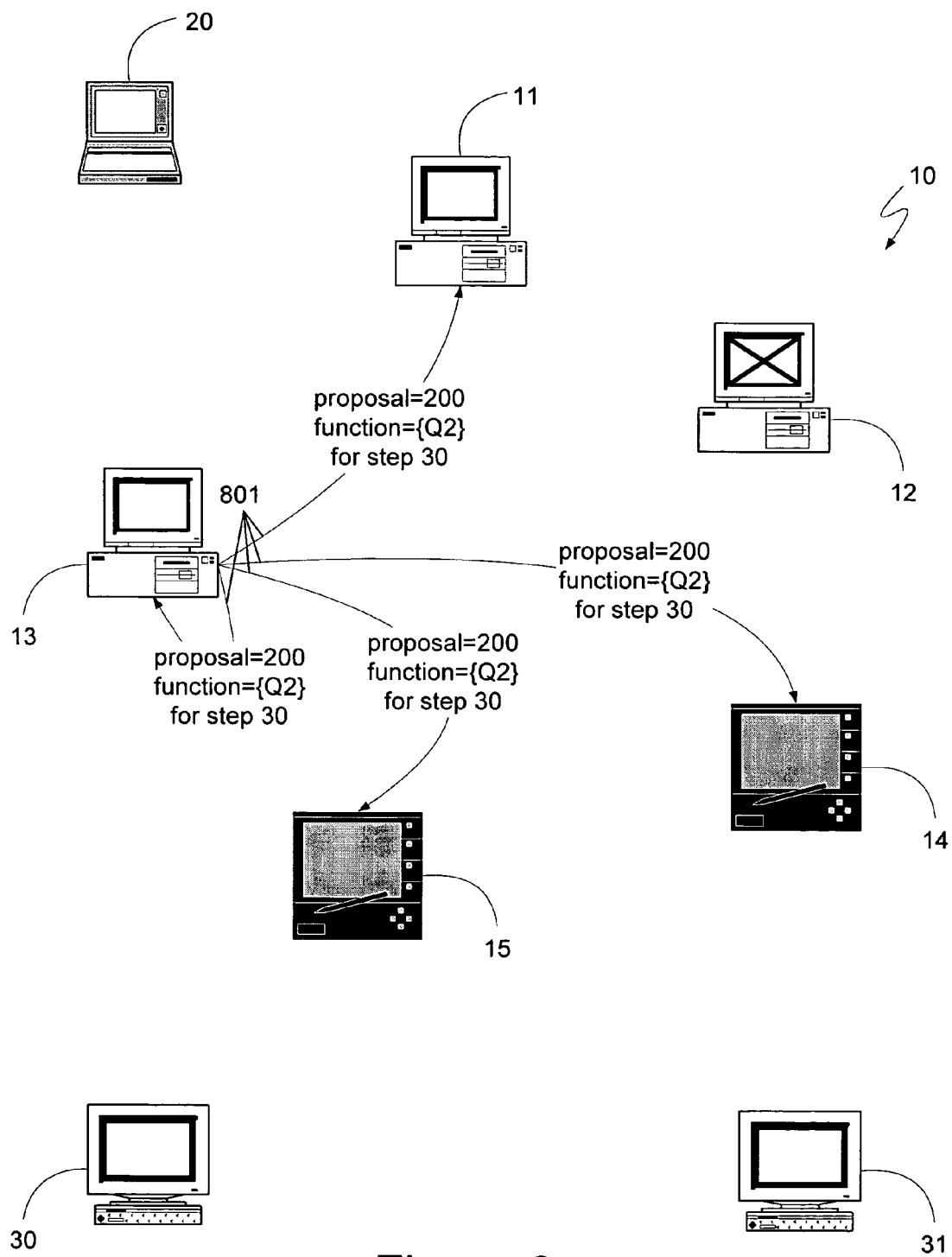
FIGS. 9a-c generally illustrate a further aspect of the operation of a first multi-phase consensus algorithm using alternative devices contemplated by an embodiment of the present invention.

Turning to FIG. 9a, the leader 13 proposes a new function that defines a new set of quorums. The new set of quorums is enumerated in Table 2, below, and as can be seen, does not include quorums that include the failed computing device 12. As can also be seen from Table 2, the set of quorums includes a quorum of only the working main computing devices, even though such a quorum is less than a majority of the devices in the distributed computing system 10. Because the set of quorums enumerated in Table 2 will be selected by a quorum that comprises at least a majority of the devices in the system 10, there is a reduced risk that the newly selected set of quorums may perform inconsistent actions. However, one embodiment of the present invention contemplates that one quorum should not select a set of quorums that includes a quorum that does not share at least one main computing device with the quorum voting for the set of quorums.

TABLE 2

| The Set Of Quorums Identified By {Q2} | | |
|---|---|---|
| devices 11, 13 | devices 11, 13, 15 | devices 11, 14, 15 |
| devices 11, 13, 14 | devices 11, 13, 14, 15 | devices 13, 14, 15 |

Figure 9B:
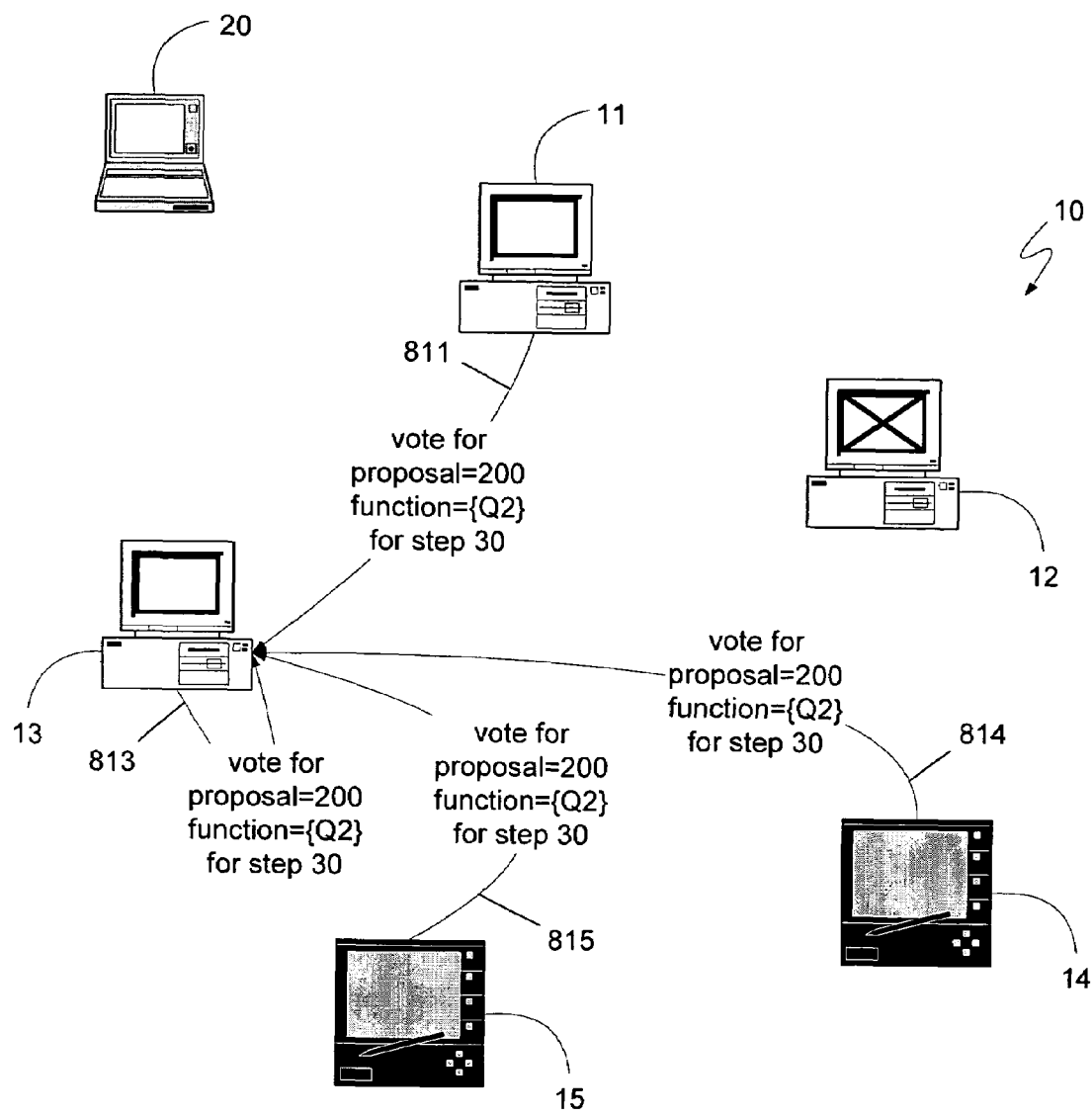
Figure 9B:
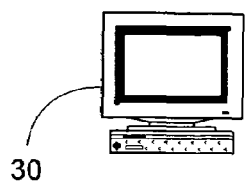
Figure 9B:
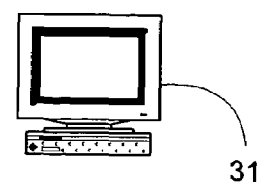
Figure 9C:
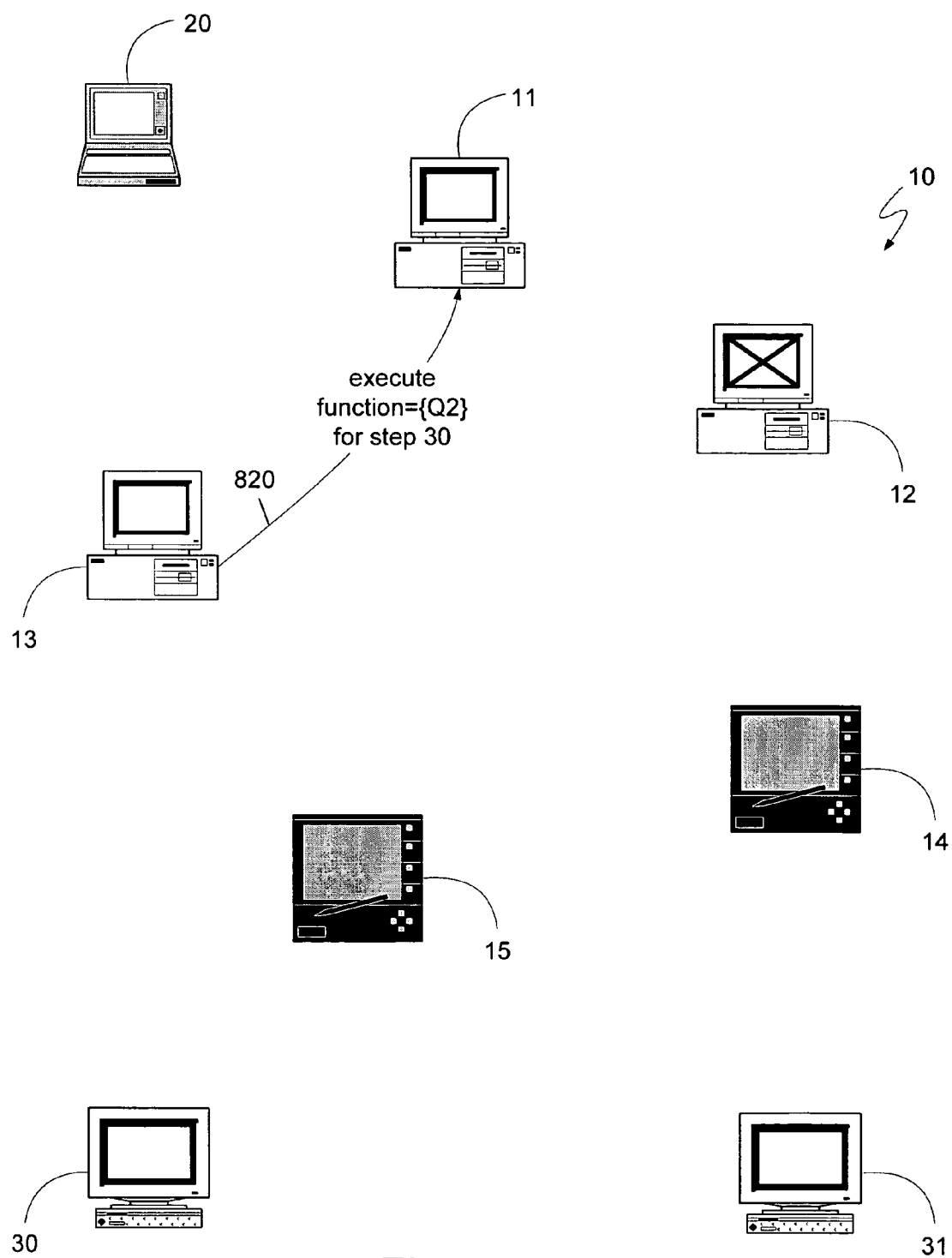

Turning to FIG. 9b, the devices 11 and 13-15 are shown voting for the proposal to select a new set of quorums "{Q2}" comprising the quorums enumerated in Table 2 above. Upon receipt of messages 811 and 813-815 illustrated in FIG. 9b, the leader 13 can determine that the proposed set of quorums was selected, and, as shown in FIG. 9c, it can inform various devices of this selection. As above, although message 820 is illustrated as only being sent to device 11, the auxiliary computing devices can also be informed of the selection of the set of quorums "{Q2}". Additionally, as explained above, message 820 can act as a mechanism by which the leader 13 can determine that devices 11 and 13 are aware of the selected functions for all prior system steps.

Before the leader 13 begins communicating with the one of the newly selected quorums, it can attempt to further reduce the computing burden on the auxiliary devices 14 and 15. As can be seen from the above detailed descriptions, the auxiliary devices 14 and 15 are involved in the selection of proposals when a quorum, from the selected set of quorums, that comprises the main computing devices experiences a failure. Consequently, the computational requirements for auxiliary devices 14 and 15 is reduced, as they are only used in rare occasions. Furthermore, because the auxiliary devices 14 and 15 do not need to maintain the system's state, they only need to retain a sufficient amount of information to properly respond to messages in the first and second phase of the Paxos algorithm. More specifically, the auxiliary devices can store the highest proposal number they last responded to and the proposal they last voted for and its corresponding proposal number for each system step in which they participated.

The amount of information stored by the auxiliary devices can be further reduced by the leader. For example, the leader 13 can, prior to beginning communication with the newly selected quorum, instruct the auxiliary devices 14 and 15 that steps 1 through 30 have already been decided upon and that no other steps have been decided upon. Because at least one main computing device is aware of the functions that were selected for steps 1 through 30, the auxiliary devices 14 and 15 simply need to store the fact that the functions for steps 1 through 30 were selected, without storing the selected functions. In addition, the auxiliary devices can discard any additional information they may have retained for steps 1 through 30, such as the last vote information for those steps in which they participated. In such a manner, the storage burden imposed on the auxiliary devices can be further reduced.

Because the auxiliary computing devices can be instructed to discard information, such as their last vote information, there exists the possibility that the auxiliary devices may receive messages for which a proper response requires information they no longer maintain. One simple mechanism contemplated by an embodiment of the present invention for dealing with such a condition is to simply have the auxiliary devices ignore the message.

The amount of resources of the auxiliary devices can be even further reduced, according to one mechanism contemplated by an embodiment of the present invention, by storing, as part of the last vote information, not the complete function that the auxiliary device last voted for, but only a hash or other unique identifier of the function. As will be known by those skilled in the art, a proposed function can contain several megabytes of data, while a hash of such a function is likely to be only a few kilobytes and a fingerprint function commonly uses only 64 or 128 bits, and can use even fewer, to identify the function. Furthermore, because any quorum comprises at least one main computing device, which would have retained the complete function with its last vote information, a leader learning of previous functions may receive some replies containing only a hash or fingerprint of the function, but if the function was chosen by a quorum, the leader will receive at least one copy of the complete function from the at least one main computing device in the quorum that selected the function. Consequently, the storage burdens imposed on auxiliary computing devices can be even further reduced without impacting the operation of the system.

Figure 10A:
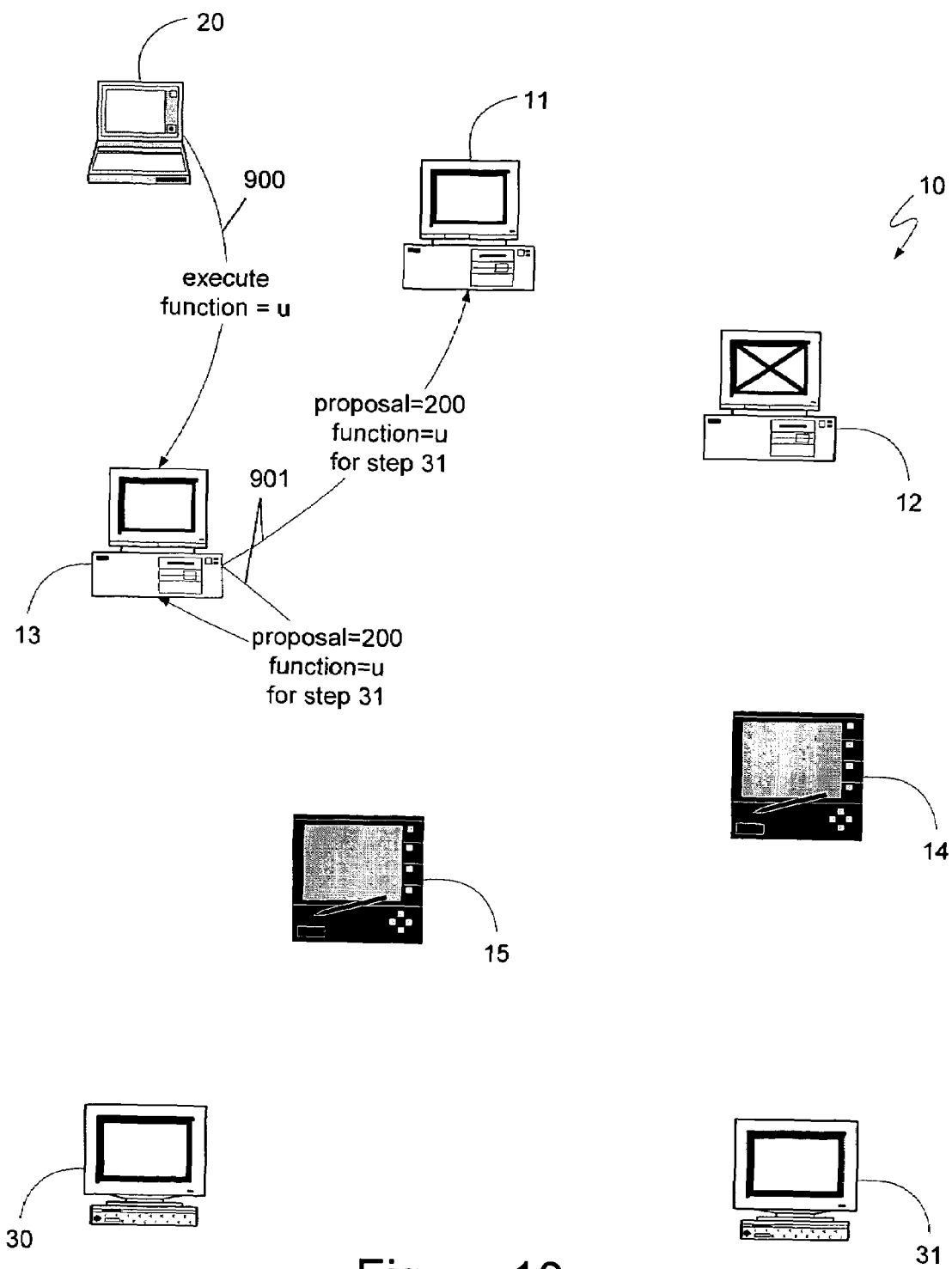
FIGS. 10a-c generally illustrate another aspect of the operation of a multi-phase consensus algorithm using alternative devices contemplated by an embodiment of the present invention.

Turning to FIG. 10*a*, leader device 13 is shown receiving a request 900 from a client computing device 20 requesting that the distributed computing system 10 execute a function identified by the variable "u". As described above, the request 900 can be received by the leader 13 either directly, or indirectly from another device in the distributed computing system 10. Upon receiving the client's request 900, the leader 13 can transmit a proposal of the execution of the function "u" for a subsequent system step to a quorum of devices that is in the selected set of quorums that are enumerated in Table 2. In the example illustrated in FIG. 10*a*, the leader 13 can select a preferred quorum comprising the main computing devices and no auxiliary devices. As shown in Table 2, a quorum comprising devices 11 and 13 is part of the selected set of quorums and can, therefore, be used. Consequently, the leader 13 can send message 901 to itself and device 11, as shown in FIG. 10*a*.

Figure 10B:
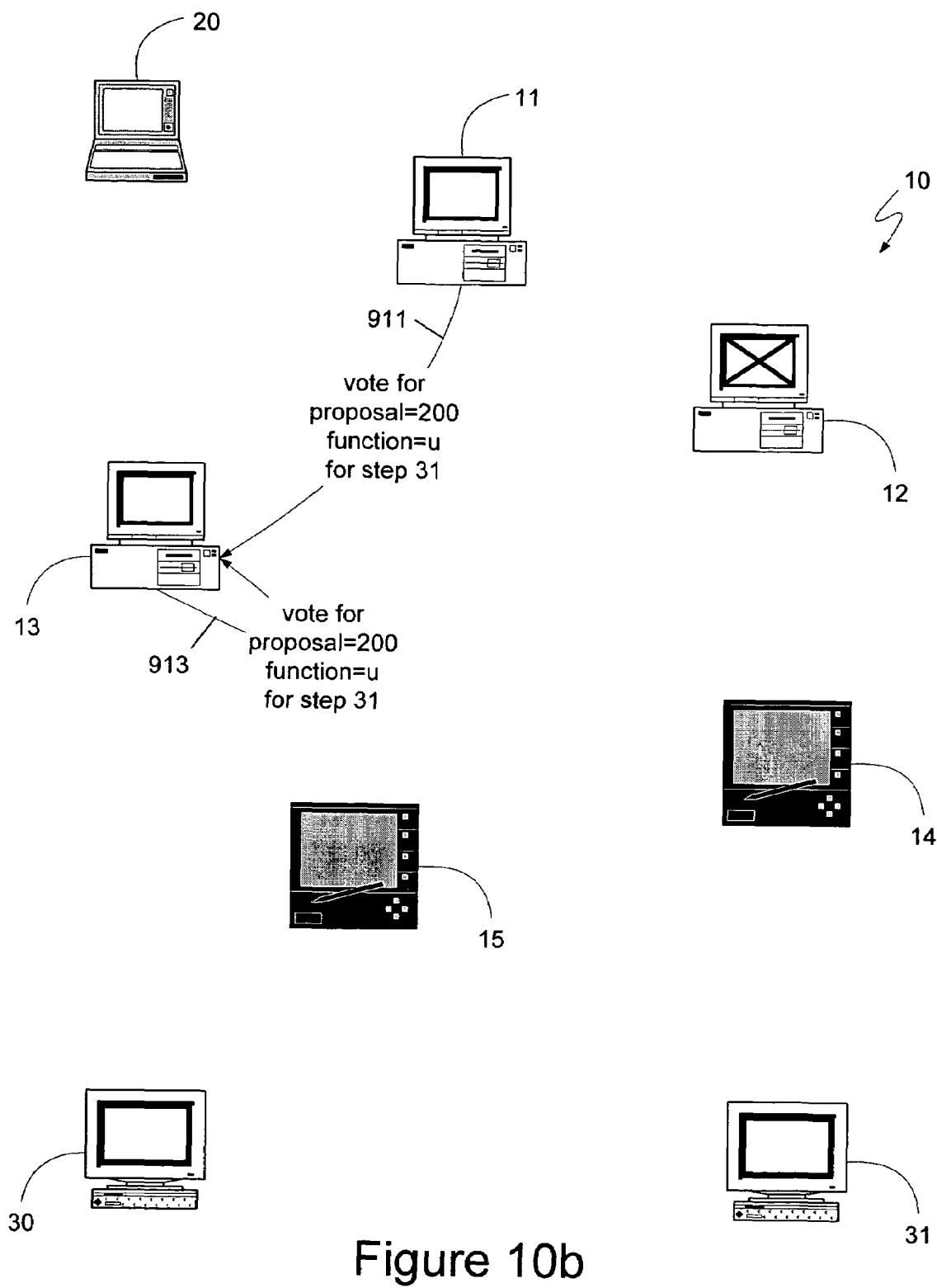
Figure 10C:
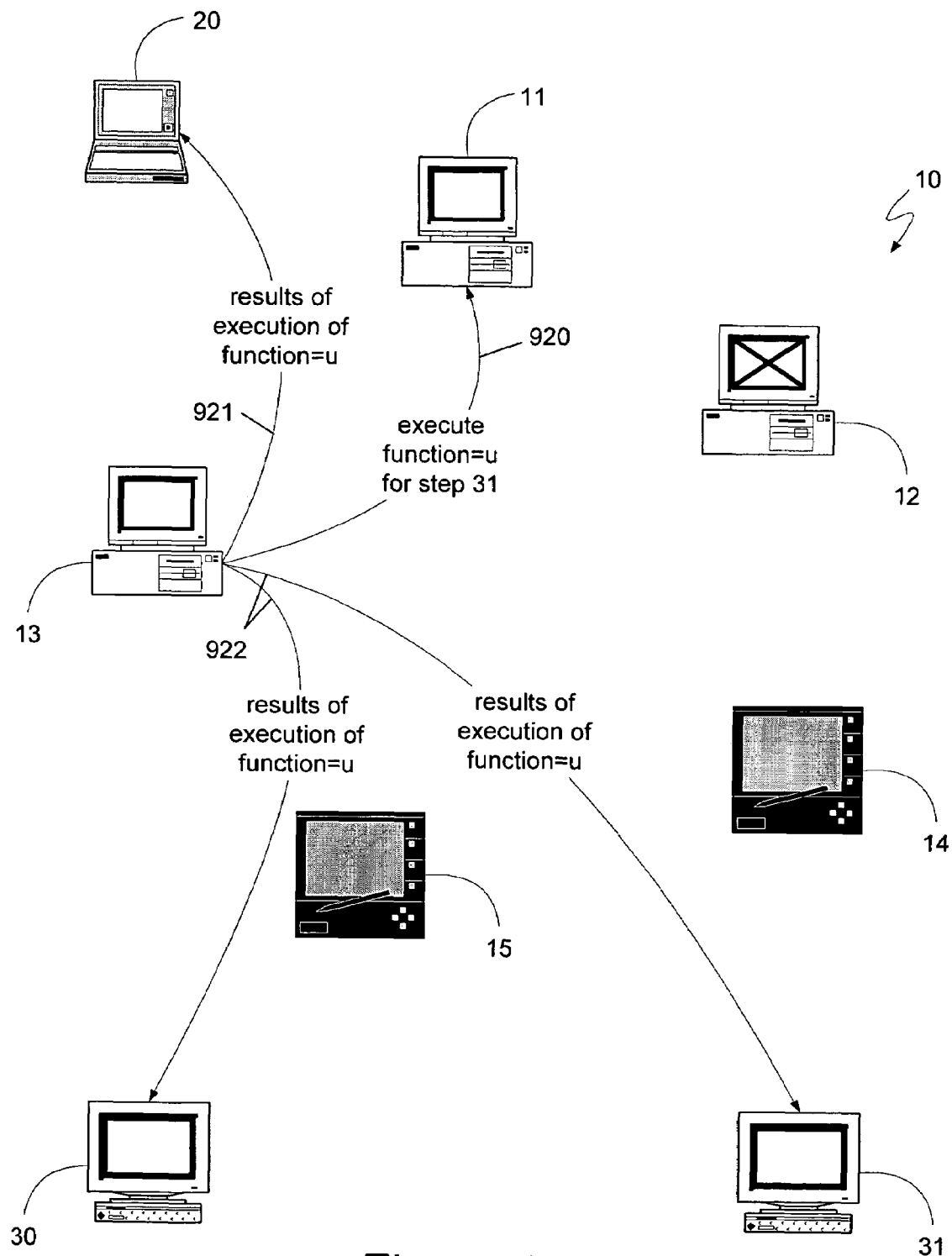

Both of the devices 11 and 13 can vote for the proposal, as illustrated by messages 911 and 913 in FIG. 10*b*. In such a case, the leader 13 can determine that the proposed function "u" was selected by the quorum and, depending on the function and the leader's knowledge of previously selected functions, the leader can execute the function "u" and transmit the results of the execution to the client 20 via message 921 as shown in FIG. 10*c*. In addition, the leader 13 can inform the other devices of the selected quorum, namely device 11 in the present example, of the selection of the function "u" via an execute message, such as message 920. Also, as before, the leader 13 can inform other devices, such as devices 30 and 31 of the results of the execution of function "u" via message 922 or, if the devices 30 and 31 are learner devices, the leader can merely inform them of the fact that the function "w" was selected by the quorum for step 31.

While the above examples describe in detail the procedure of removing a failed device by selecting a new set of quorums that does not contain quorums that include the failed device, an analogous procedure can be performed to add a new device or a repaired device. For example, instead of proposing the set of quorums enumerated in Table 2, the leader 13 could have added a new device 16 by proposing a set of quorums "{Q2'}" as enumerated in Table 3 below. The set of quorums "{Q2'}" could have been selected in an analogous manner to that illustrated in FIGS. 9*b*-9*c*, and could have operated in an analogous manner to that illustrated in FIGS. 10*a*-10*c*.

TABLE 3

| The Set Of Quorums Identified By {Q2'} | | |
|---|---|---|
| devices 11, 13, 16 | devices 11, 15, 16 | devices 13, 14, 16 |
| devices 11, 13, 14, 16 | devices 11, 14, 15, 16 | devices 13, 15, 16 |
| devices 11, 13, 15, 16 | devices 11, 13, 14 | devices 13, 14, 15, 16 |
| devices 11, 13, 14, 15, 16 | devices 11, 13, 15 | devices 11, 14, 15 |
| devices 11, 14, 16 | devices 11, 13, 14, 15 | devices 13, 14, 15 |
| | | devices 14, 15, 16 |

As can be seen, although the auxiliary devices are not often used, they can ensure that the state of each of the main computing devices remains consistent. For example, if the above described distributed computing system 10 comprised only the main computing devices 11-13, a failure of the communication medium between the devices would appear, to each device, as a failure of the other two devices. Thus, while no device has, in fact, failed, such as due to a hardware or software error, each device perceives that the other devices have failed. Without the auxiliary computing devices, if the system attempted to maintain the same level of fault tolerance as the above described system, namely the ability to tolerate as many as two faults, then each device, believing itself to be the last remaining device and believing that the system has experienced only two faults, would continue selecting proposed functions. However, because the three devices would now be acting independently of one another, their states may quickly diverge.

The addition of auxiliary devices enables the distributed computing system, in the manner described in detail above, to agree upon the devices that are selecting the functions and ensures that no two or more devices select functions independently of one another. For example, in the case of a failure of the communication medium between devices 11-13, each of the devices 11-13 would perceive this failure as a failure of the other two devices. However, because of the presence of the auxiliary devices 14-15, none of the devices 11-13 could select a function for a system step without receiving the votes of devices 14-15. Therefore, even though the devices 11-13 cannot communicate with one another, their communication with the auxiliary devices 14-15 enables each of the devices 11-13 to learn of any functions that may have been selected for a system step, and thereby prevents two or more different functions from being selected for the same system step. Alternatively, if one or more of the devices 11-13 could not communicate even with the auxiliary devices 14-15, then that device would not be able to receive a quorum of votes for any function, and would not independently select a function. In such a manner the system relies on the above described properties of the Paxos algorithm to ensure that only a single device, or group of devices, has the authority to continue selecting functions and that only a single function is selected for any given system step.

Modified Paxos Algorithm Using Auxiliary Devices in Quorum State Machine

Rather than using a single state machine to both select proposals and to select a set of quorums to be used in the future, another mechanism contemplated by an embodiment of the present invention calls for two distinct state machines implementing fault tolerant algorithms. One state machine can be a quorum selection state machine that can select the quorum to be used by another state machine. The other state machine can be a system state machine that uses the quorum selected by the quorum selection state machine in order to propose and select functions requested by clients of the distributed computing system. While the quorum selection state machine and the system state machine can be two distinct state machines, they can both be implemented by an overlapping set of computing devices. Auxiliary computing devices can be used as part of the quorum selection state machine to provide fault-tolerance, and the quorum selection state machine can then select a quorum comprising the operational main computing devices to be used by the system state machine.

Figure 11A:
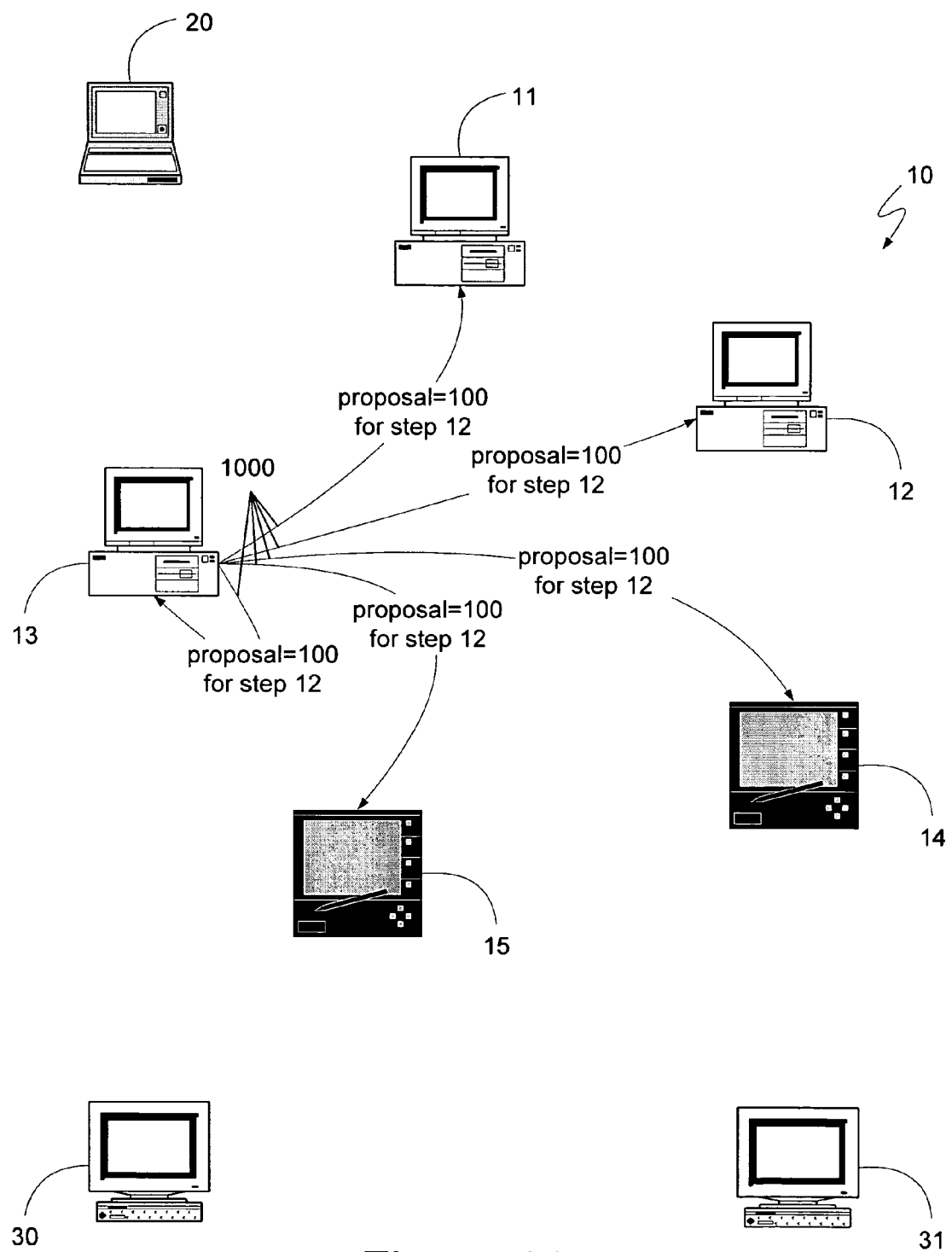
FIGS. 11a-e generally illustrate one aspect of the operation of a second multi-phase consensus algorithm using alternative devices contemplated by an embodiment of the present invention.
Figure 11B:
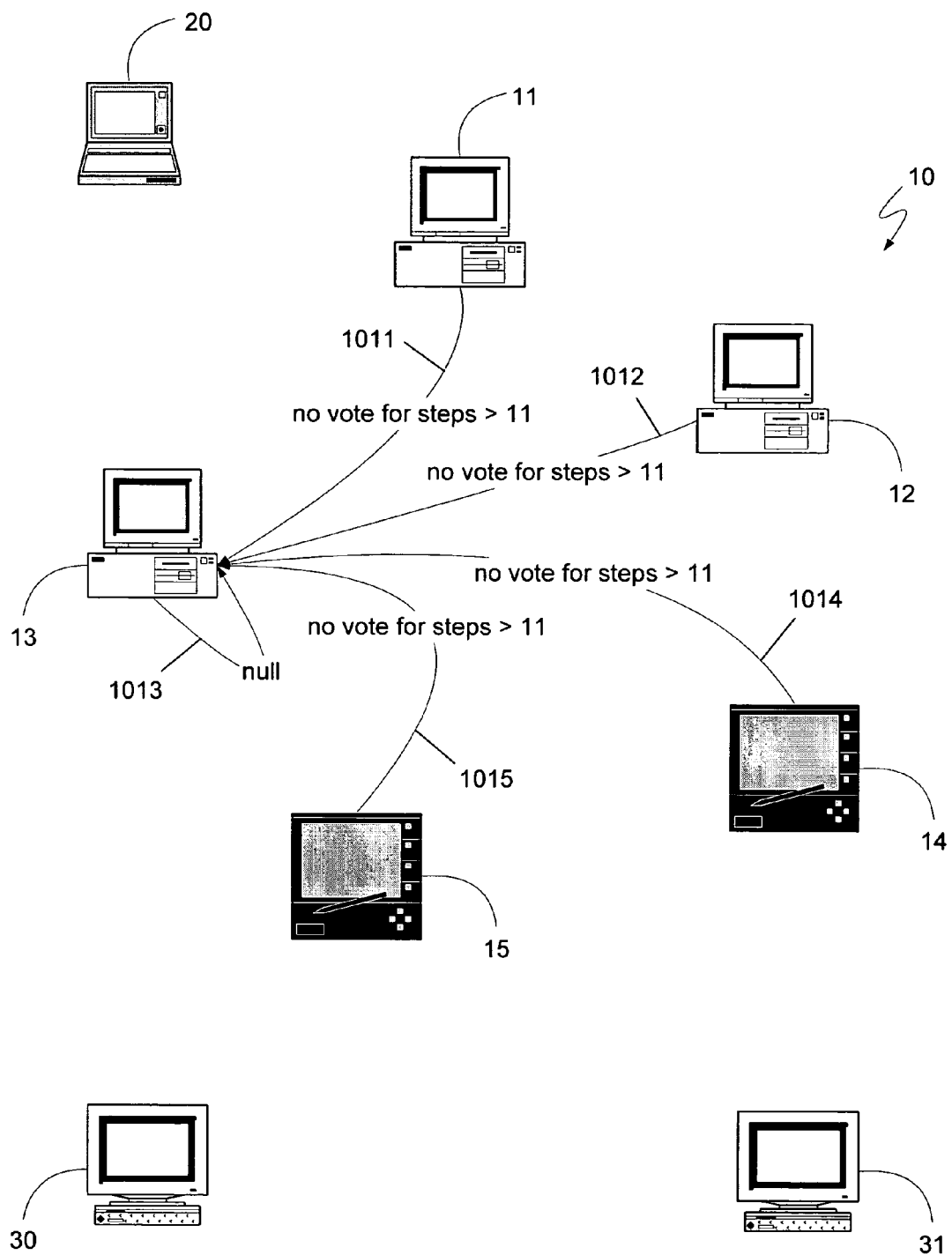

Turning to FIG. 11*a*, a quorum selection state machine is shown being implemented by the distributed computing system 10 comprising devices 11-15, where, as before, devices 11-13 are illustrated as main computing devices and devices 14-15 are illustrated as auxiliary computing devices. FIG. 11*a* illustrates a device 13 acting as a leader and sending a message 1000 with a proposal number of 100 for all system steps numbered 12 or higher, in the manner described in detail above. Each of the devices 11-15 can respond to message 1000 with information regarding the devices' last votes for proposals having proposal numbers less than 100. Turning to FIG. 11*b*, devices 11-15 are shown responding to message 1000 with last vote information in messages 1011-1015. If the response messages, such as messages 1011-1015, contain information that requires the leader to clean up pending functions, the leader can do so in the manner described in detail above with reference to FIG. 4. However, the present exemplary illustration shown in FIG. 11*b* indicates that none of the devices 11-15 have had any previous votes for functions to be executed for system step 12. Consequently, the leader 13 can propose any function to the devices 11-15.

Figure 11C:
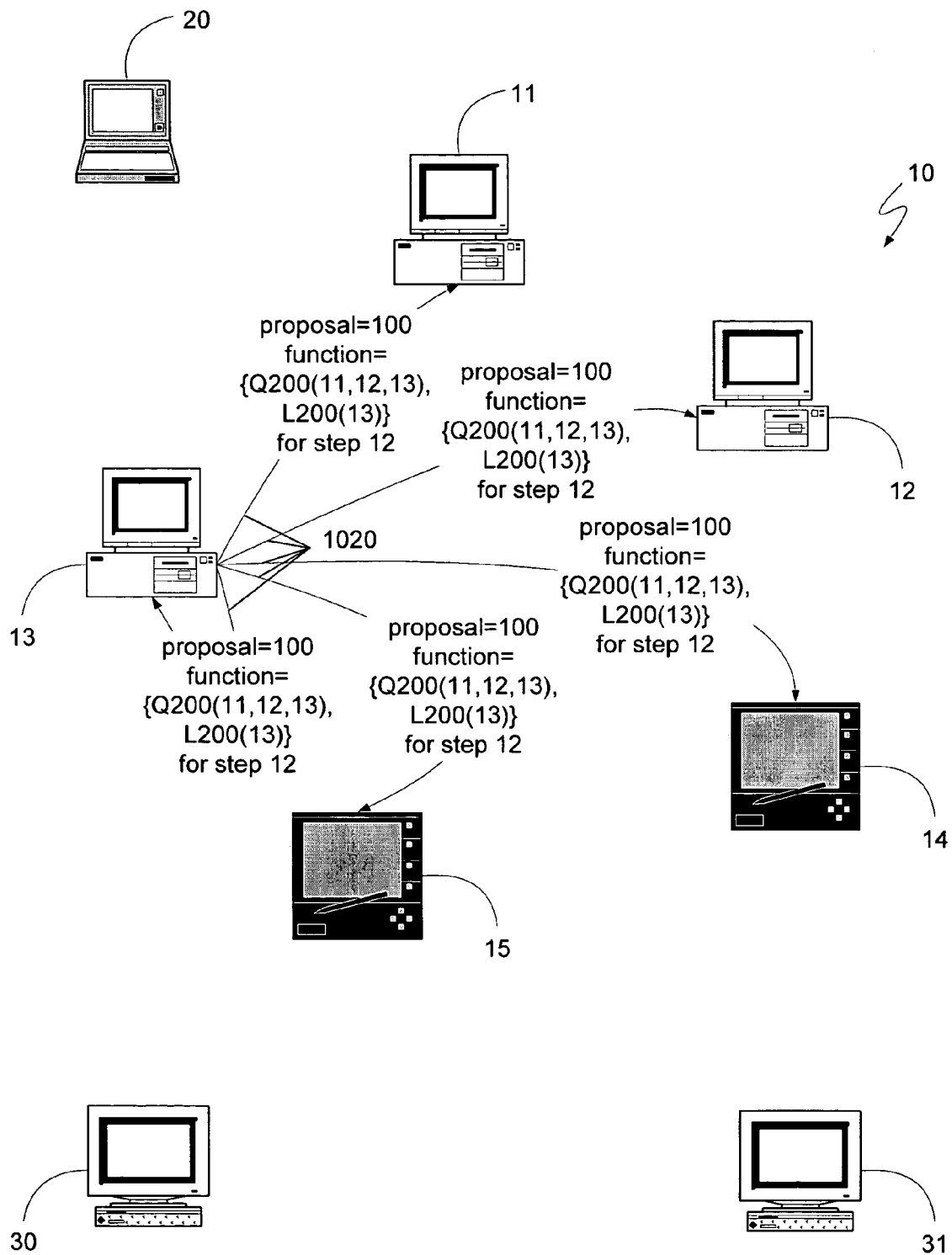

Turning to FIG. 11*c*, the leader 13 is shown proposing a function to define a quorum for the system state machine. Specifically, message 1020 indicates that a quorum comprising devices 11-13 is being proposed to be used by the system state machine, where device 13 will act as the leader and the quorum will remain in effect so long as the leader can use a proposal number of 200. Put another way, message 1020 proposes a quorum comprising devices 11-13 to act as the quorum for proposal number 200. Consequently, if a leader of the proposed quorum needs to use the first phase of the Paxos algorithm a second time, then the proposal number would change and, as will be illustrated below, the quorum selection state machine can be used to select another quorum for the new proposal number.

Figure 11D:
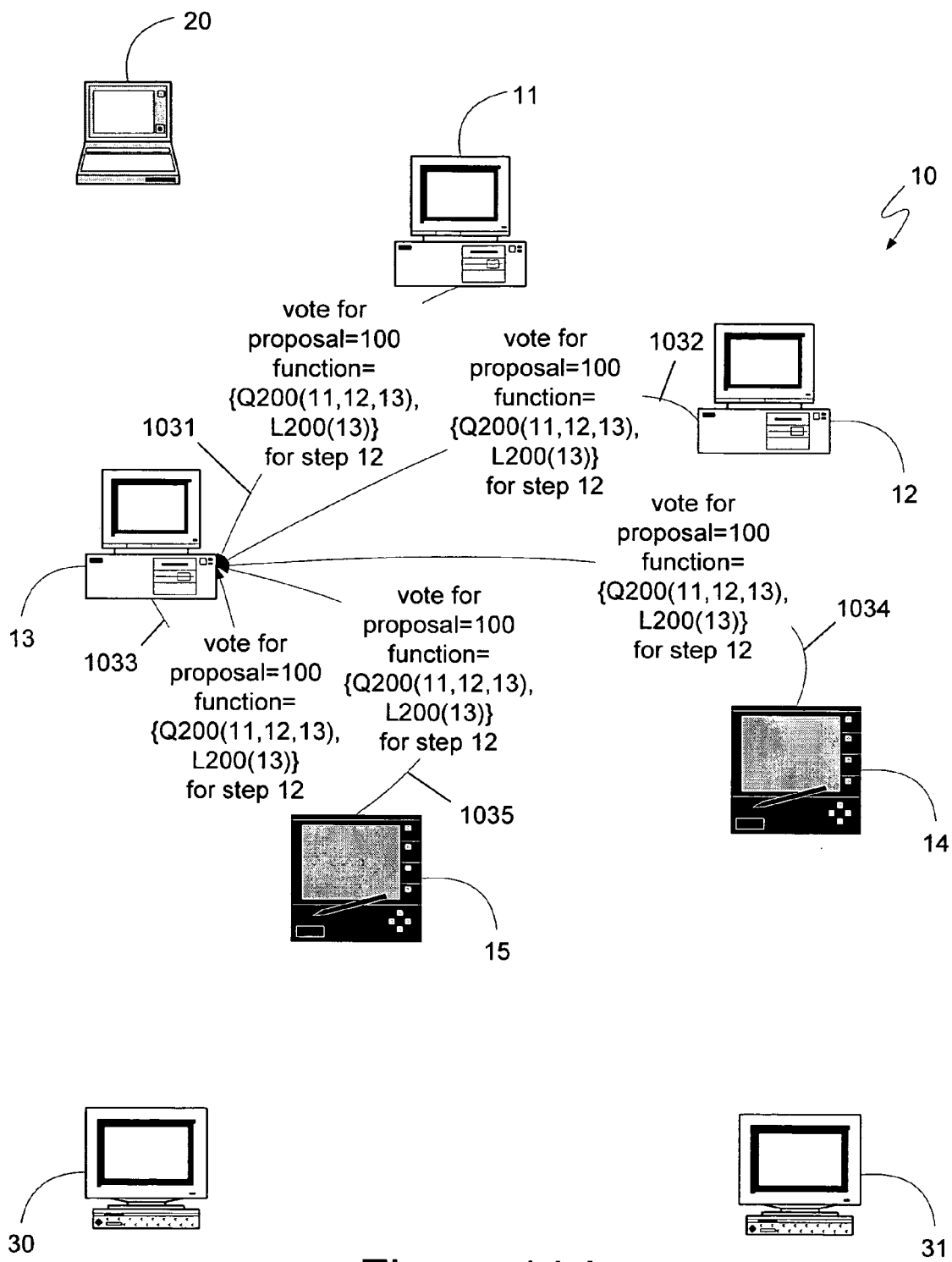
Figure 11E:
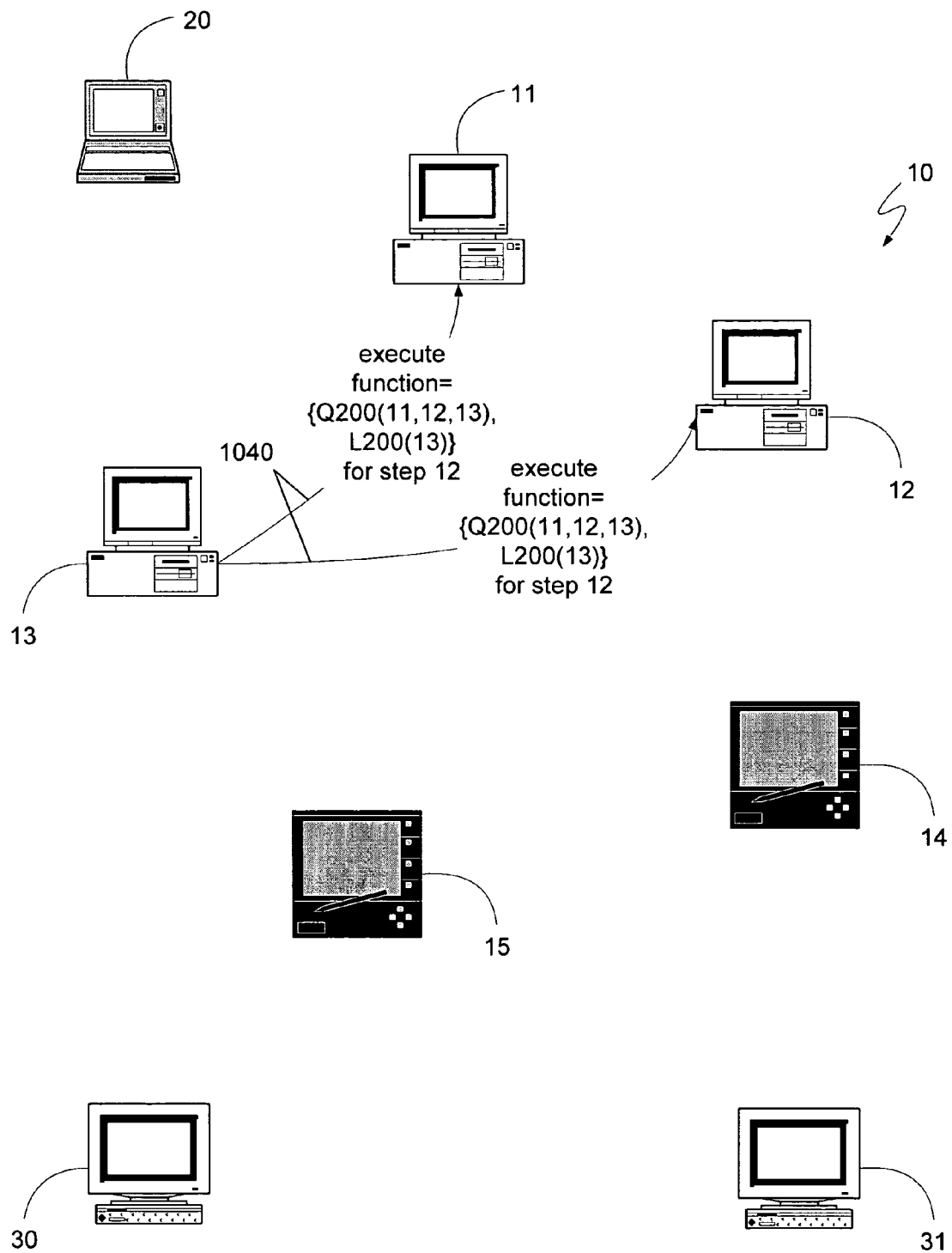

Once each of the devices 11-15 receive the message 1020 they can determine whether to vote for it. As explained in detail above, a device can vote for a current proposal as long as it has not responded to a message having a higher proposal number than the proposal number associated with the current proposal. FIG. 11*d* illustrates each of the devices 11-15 voting for the proposed quorum via vote messages 1031-1035. As explained above, because a quorum can be any collection of the devices implementing a state machine that shares at least one device with every other quorum in the selected set of quorums, even if the leader 13 had only received three votes from the devices 11-15 implementing the illustrated quorum selection state machine, it could have determined that the proposed quorum was selected.

Once the leader 13 has determined that the proposed quorum was selected, it can inform the other main computing devices 11 and 12 via a message, such as message 1040. While message 1040 is illustrated in FIG. 1*e* as being transmitted only to the other main computing devices 11 and 12, the auxiliary computing devices 14 and 15 can also be informed of the selection of the proposed quorum.

Figure 12A:
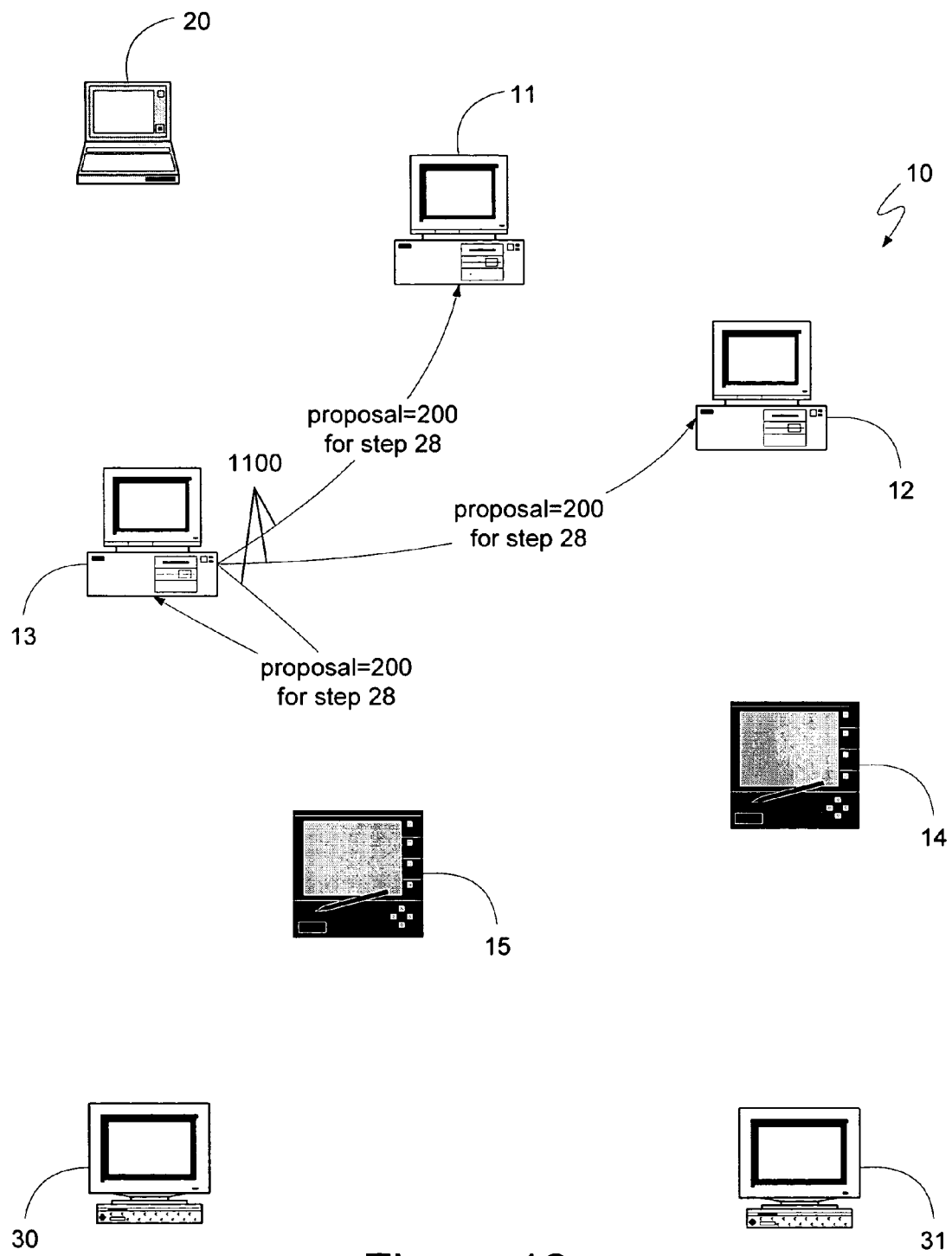
FIGS. 12a-c generally illustrate another aspect of the operation of a second multi-phase consensus algorithm using alternative devices contemplated by an embodiment of the present invention.

After the quorum selection state machine has selected a quorum for a particular proposal number, and has specified a leader device, the selected quorum can be used by the system state machine. Initially, the selected leader device can attempt to learn of any pending, or selected, proposals of which the leader is not aware. Turning to FIG. 12*a*, the selected leader device 13 is shown sending a message having the selected proposal number 200 for the system step that the leader believes is the next system step, namely step 28 in the present example.

Figure 12B:
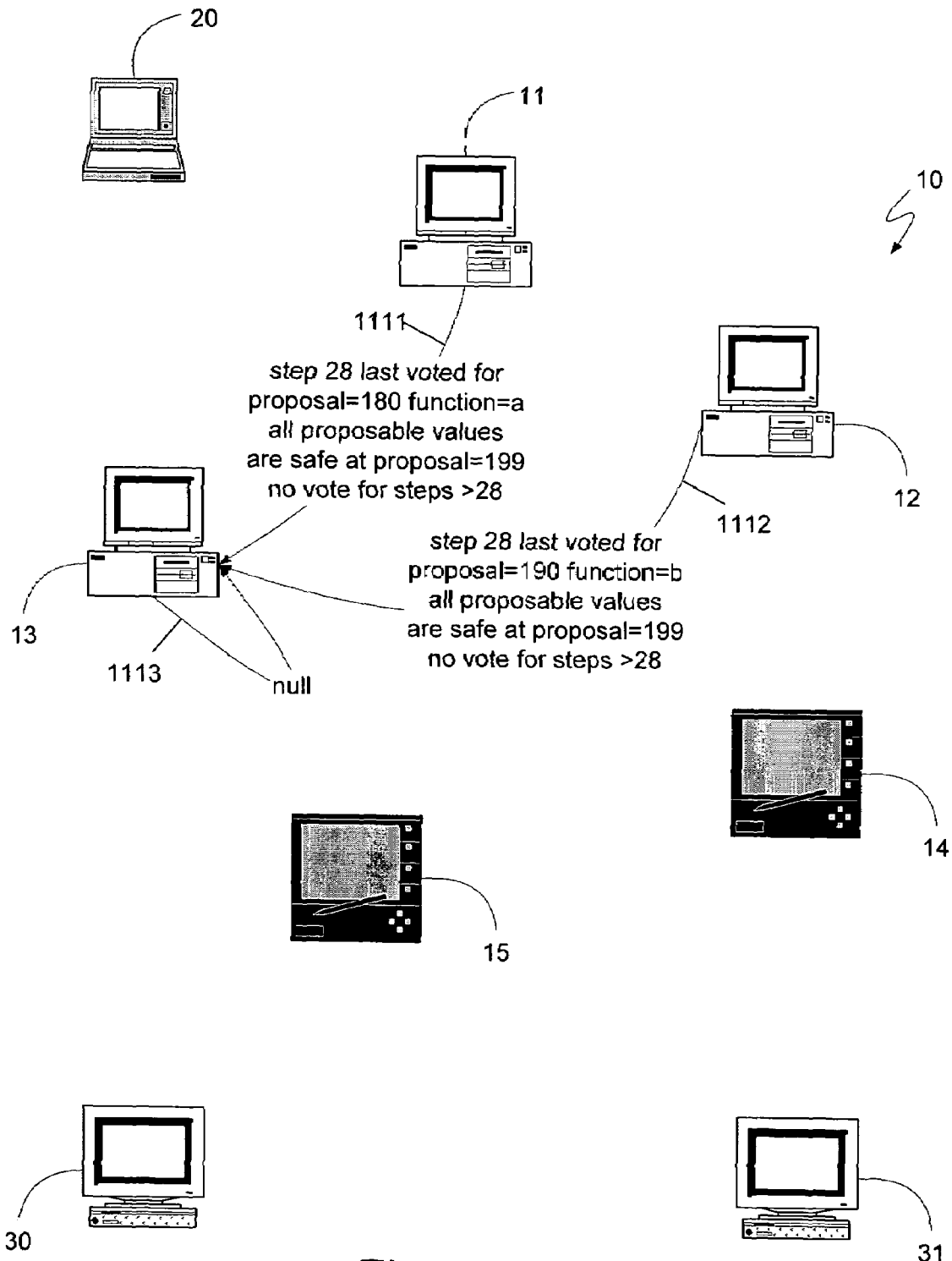

In response to the leader's message 1100, each of the devices of the selected quorum can respond with their last vote information in the manner described in detail above. However, because the composition of a quorum can change with each proposal number, one mechanism contemplated by an embodiment of the present invention that can aid in deciding which function to execute for a given system step is, in response to message 1100, each of the devices can also include any knowledge they have of safe proposals. For example, as shown in FIG. 12*b*, device 11 can send message 1111 indicating that it last voted for a proposal of the function represented by the variable "a", that was proposed using a proposal number of 180, and that it knows that all proposable values are safe at a proposal number of 199. Message 1111 can also indicate that device 11 has not voted for any proposal for any system step beyond step 28. As also shown in FIG. 12*b*, message 1112 from device 12 can contain similar information. For example, message 1112 can indicate that device 12 has not voted for any proposal for any system step beyond step 28, but that it has voted for a function represented by the variable "b", proposed using proposal number 190, and that it knows that all proposable values are safe at a proposal number of 199.

As will be recognized by those skilled in the art, in situations such as the above examples, where the information of functions that each device knows are safe includes the function last voted for, the devices, such as device 11 or 12, need not transmit information regarding their last vote. For example, because device 11 indicates, via message 1111, that it knows that all proposable values are safe, the additional information that it voted for function "a" may be of no consequence and, therefore, need not be included in message 1111.

A device can know a function is safe if it was so informed by the leader of a previous quorum to which the device belonged. A leader can determine a function is safe if it receives a response from at least one device indicating that the device has already voted for the function or indicating that the device knows the function is safe, and an indication that no other quorums, using intervening proposal numbers, could have selected a different function. More specifically, a function to be executed for a particular system step can be safe at a current proposal number if no other function could have been chosen to be executed for that system step using any proposal number that is less than the current proposal number.

Therefore, it can be necessary to know what a quorum associated with each step number that is less than the current step number could have accomplished. Consequently, the quorum selection state machine can use successive proposal numbers, and can attempt to select quorums that share devices with quorums associated with prior proposal numbers. Alternatively, the leader device can send messages, such as message 1100, to devices that were members of previous quorums even if those devices are not members of the currently selected quorum. Once the leader has learned of any functions that may have been chosen by prior quorums using proposal numbers less than the current proposal number, the leader can resume communication with the currently selected quorum. Also, since only a single function can be selected and executed for any given system step, if a leader learns that more than one function is safe, then no function could previously have been selected, and all functions are safe.

An embodiment of the present invention contemplates that the leader can collect from the selected devices an indication of each device's last vote and an indication of which functions the device knows are safe, and from this information the leader can determine functions that are known safe and provide this information to the remaining devices in the quorum before sending any proposal. Specifically, if only one function is indicated as previously voted for, or known safe, then the leader can inform the remaining devices that only that function is safe. Alternatively, if no functions are indicated as previously voted for, or known safe, or if more than one function is indicated as previously voted for, or known safe, then the leader can determine that all functions are safe, and it can inform the remaining devices that all functions are known safe.

By transmitting the known safe information before proposing any functions, the leader can ensure that knowledge of safe functions is propagated among quorums associated with ever increasing proposal numbers even if the devices of the quorum do not get a chance to vote on a proposal before a failure renders the quorum inoperable and a new quorum is selected. For example, a quorum for one proposal number can comprise a first and second device and the first device can fail before any proposals are submitted for a vote. Subsequently, a new quorum for a larger proposal number can be selected to comprise the second device and a third device, and this time the second device can fail before any proposals are submitted for a vote. A third quorum comprising only the third device can then be selected for an even larger proposal number. However, unless the first device had passed along knowledge of safe functions to the second device, and unless the second device had subsequently passed along its own knowledge of safe functions to the third device, the third device may not be able to determine what functions were safe.

Specifically, because both the first and second devices failed before they had a chance to vote on a proposal, they have no last vote information. As a result, by relying only on last vote information, the third device could know that the second device hadn't previously voted for any proposals, but because the second device has never voted, the third device cannot glean any information from the second device about what the first device might have done. Because the third device cannot determine whether the first device has already voted for a proposal, it cannot determine what proposals are safe. Conversely, by propagating knowledge of safe functions independently of the last vote information, the first device could have passed along to the second device that all functions were safe, since no votes had been cast, and the second device could have subsequently passed this information along to the third device. Thus, while a reliance on only last vote information may have caused the system to halt until the first device was repaired, by propagating knowledge of safe functions independently of last vote information, the system can continue operation even in situations similar to this exemplary case.

Figure 12C:
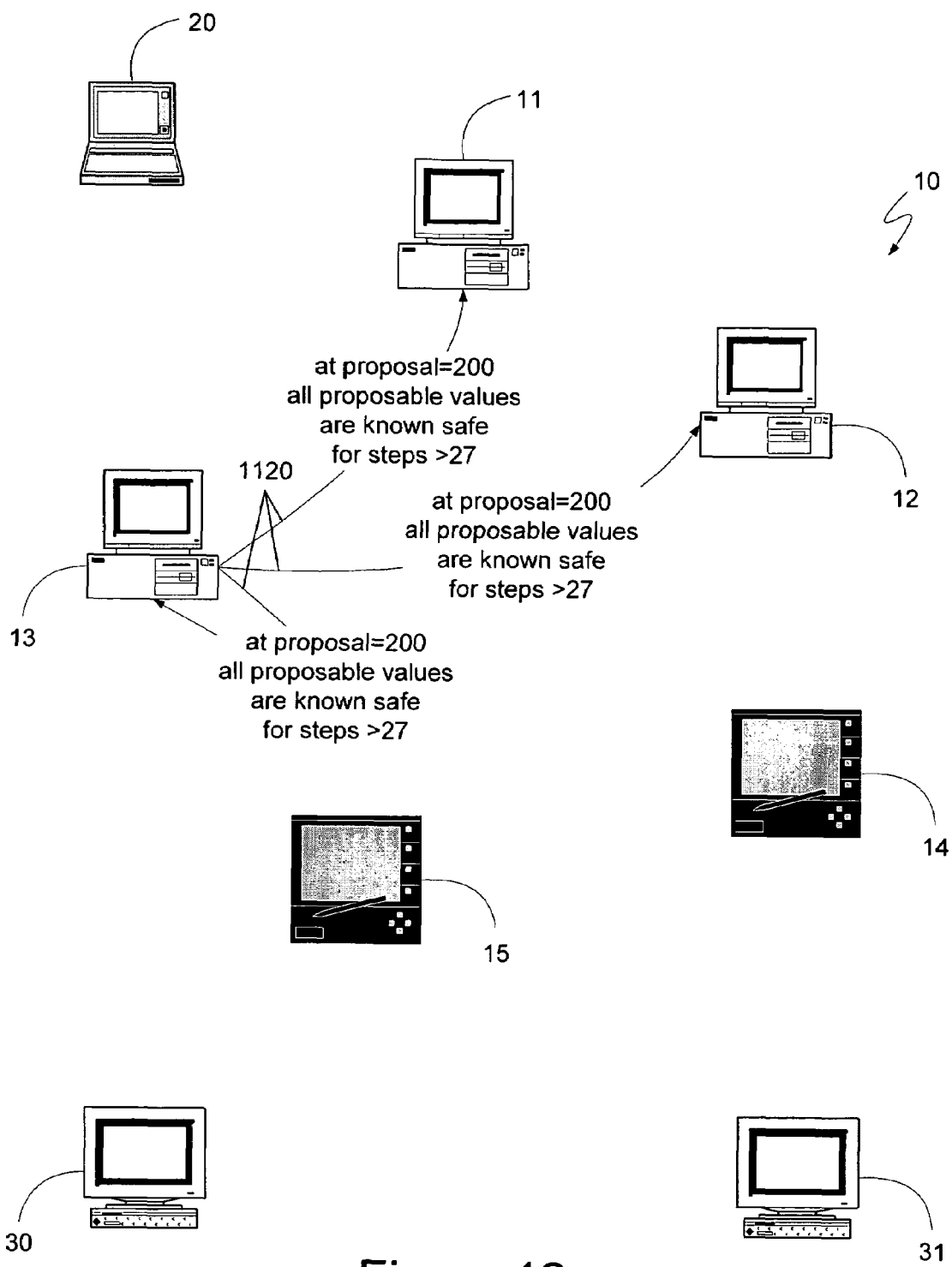

Therefore, before proposing any function for system step 28, the leader 13 can first inform devices 11 and 12 of the functions that it has determined are known safe for proposal 200 based on messages 1111 and 1112. Turning to FIG. 12*c*, the leader 13 can inform devices 11 and 12 that all proposable functions are known safe at proposal number 200 for all steps greater than 27 since all proposable functions were known safe at proposal 199 for step 28, and no function was selected at proposal 199 for step 28, and no information was received regarding known safe functions at proposal number 200 for steps beyond step 28. Upon receiving a message, such as message 1120, the receiving devices can update their knowledge of known safe functions. Thus, even if a client does not request that the system 10 execute a function for a long period of time, and one of the main computing devices 11-13 fails while waiting, knowledge of functions that are known safe can be recorded and used at a later time to ensure that a future quorum can make progress.

If, however, a client, such as client device 20, does request the system state machine, implemented by the distributed computing system 10, to execute a function, the leader 13 can, after having completed the above described steps, propose the function to the remaining devices in the quorum. In the present example, for the current proposal number of 200, all proposable values are known safe for all steps beyond step 27. Consequently, any function that the client 20 wishes to have executed can be proposed for execution at system step 28.

For example, the above detailed description of the selection of a proposal received from the client 20 by a quorum comprising devices 11-13 is equally applicable in the present example. For example, after disseminating message 1120, as illustrated in FIG. 12*c*, the leader 13 can received a request 600 from the client 20 as illustrated in FIG. 7*a*. Thus, as described above, the leader 13 can propose the requested function in message 601 and receive reply messages 611-613 as shown in FIG. 7*b*. From the reply messages 611-613, the leader 13 can determine that the function was selected and can, in appropriate circumstances, execute the function for system step 28 and inform the appropriate devices via messages 620-622 shown in FIG. 7*c*.

If one of the devices 11-13 were to not vote for a proposal, such as if the device had experienced a failure or if it had received a message with a higher proposal number, a different quorum, using a different proposal number, can be selected. For example, as shown in FIG. 8*a*, device 12 can be experiencing a failure and may therefore not respond to the message 701 sent by the leader 13. Thus, as shown in FIG. 8b, the leader 13 will receive messages 711 and 713 from less than a quorum of devices, and the proposal will not be selected. Because one quorum was selected for the proposal number 200, and every device in that quorum has not voted, a new quorum can be selected for an incrementally larger proposal number. Therefore, as a result of the failure of the quorum used by the system state machine, the quorum selection state machine can be used to select a new quorum for the system state machine.

As indicated above, while the quorum selection state machine and the system state machine can be distinct state machines, they can be implemented by the same devices. For example, software for implementing a state machine can comprise two independent threads such that one thread is dedicated to managing the software's participation in the quorum selection state machine, while the other thread is dedicated to managing the software's participation in the system state machine. Alternatively, a computing device can have multiple programs executing simultaneously, with one program managing the device's participation in the quorum selection state machine, while another program manages the device's participation in the system state machine. As will be known by those skilled in the art, if the quorum selection state machine and the system state machine are implemented by the same devices, the messages used to implement each of the state machines can specify which state machine the message is relevant to. For example, messages 1000, 1011-1015, 1020, 1031-1035 and 1040 could specify that they are quorum selection state machine messages, while messages 1100, 1111-1113 and 1120 could specify that they are system state machine messages. Such state-machine information can be part of the payload of the messages, together with information such as the proposal number or the proposal value, or it can be specified in various message headers or in other similar underlying network structures.

Figure 13A:
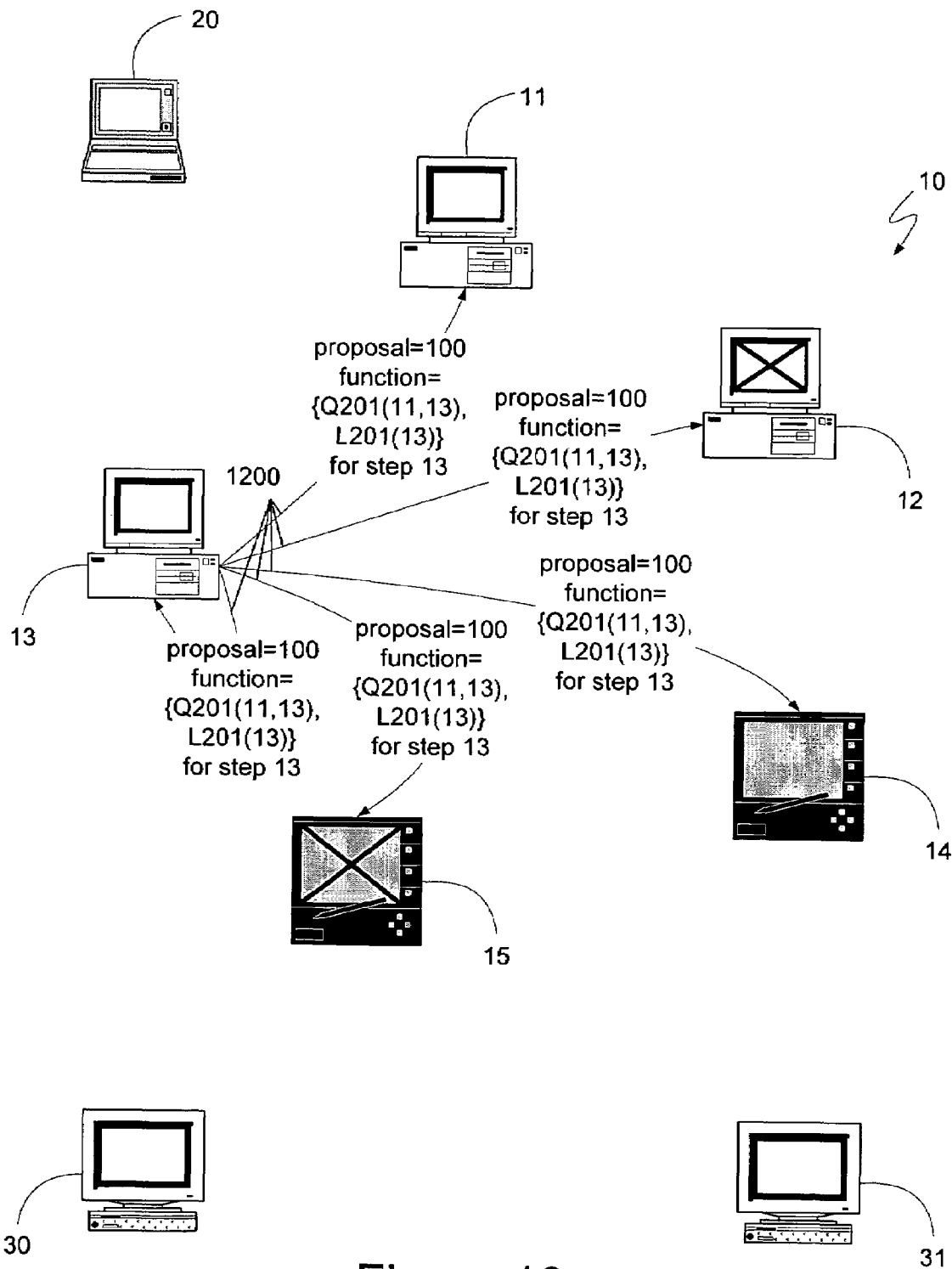
FIGS. 13a-c generally illustrate a further aspect of the operation of a second multi-phase consensus algorithm using alternative devices contemplated by an embodiment of the present invention.

Therefore, because devices 11-13 can participate in both the quorum selection state machine and the system state machine, even though they were executing as part of the system state machine, they can resume their roles as part of the quorum selection state machine as if no intervening operations had occurred. Consequently, as illustrated in FIG. 13a, the leader 13 can initiate a vote among some or all of the devices of the quorum selection state machine without performing the first phase of the Paxos algorithm. Message 1200, therefore, can indicate that the leader 13 is proposing, with a proposal number of 100, that the quorum selection state machine execute, as step 13, a function that defines a quorum comprising devices 11 and 13 for the system state machine. Such a proposed quorum would enable the system state machine to continue operation despite the failure of device 12. The leader 13 can also specify, in message 1200, that the proposed quorum is for proposal number 201 in the system state machine, and that the leader of the proposed quorum is to be device 13.

Because the quorums used by the system state machine are selected by a quorum state machine, and are not required to comprise at least a majority of all of the devices of the distributed computing system 10, there exists the possibility that one quorum may not share any devices with another quorum. Consequently, to ensure that knowledge of safe functions is correctly propagated through a series of quorums associated with a series of proposal numbers, the series of proposal numbers selected by the quorum selection state machine can be sequential. Also, when a leader device determines safe functions, it can verify that at least one device in a quorum was present in a previous quorum for all quorums between the last quorum for which the leader has been informed of one or more functions that are safe and the present quorum. To aid the leader, the quorum selection state machine can avoid selecting successive quorums that do not share a single device. Thus, as shown in FIG. 13a, the proposed quorum includes devices 11 and 13, both of which were part of the previous quorum, and the proposal number associated with the proposed quorum is 201, indicating that no quorums were selected between the previous quorum associated with proposal number 200, and the currently proposed quorum.

Figure 13B:
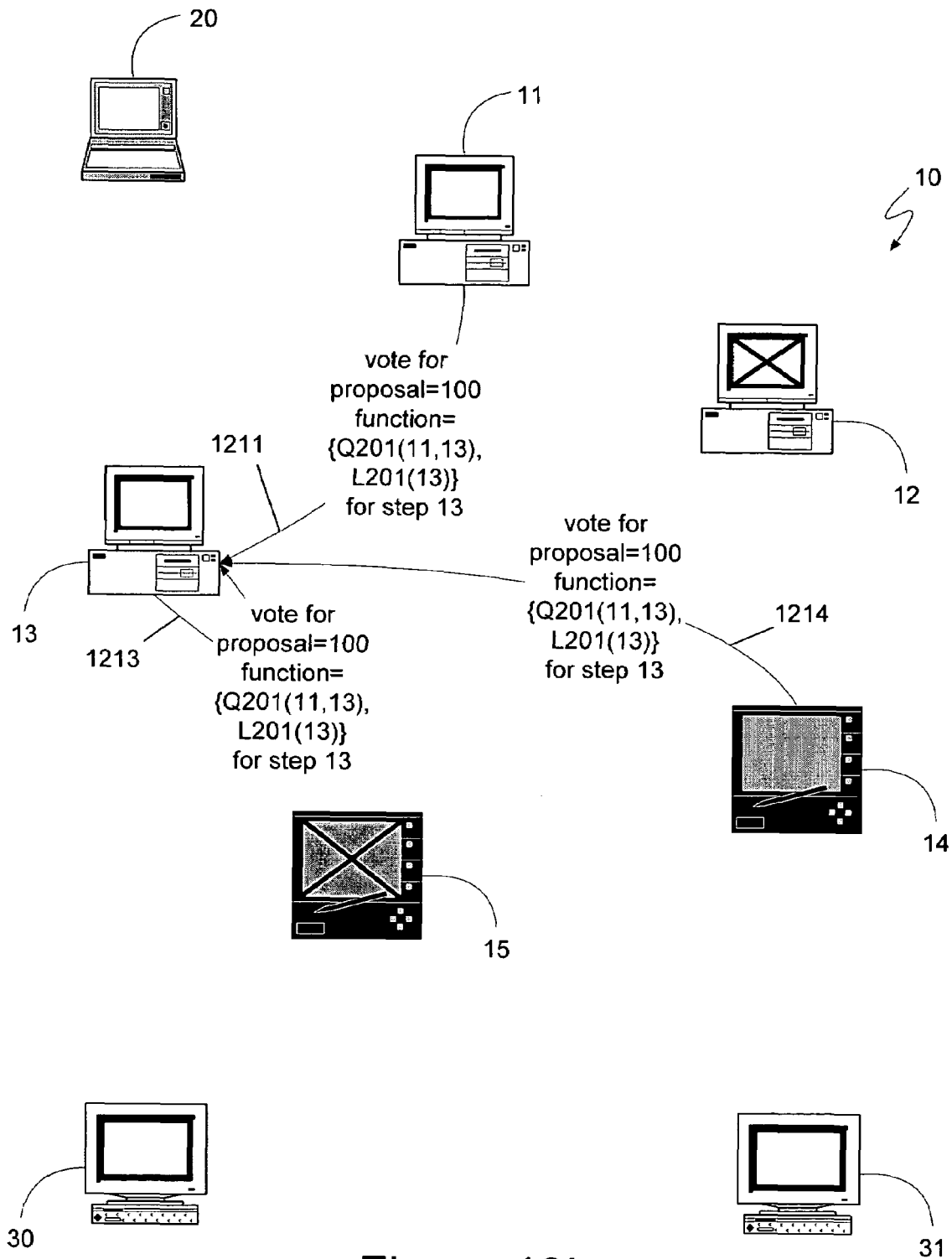

Turning to FIG. 13b, devices 11, 13 and 14 are shown voting for the proposal of message 1200 via messages 1211, 1213 and 1214. Device 12 is illustrated as experiencing a failure, which can be related to the failure of device 12 in the exemplary system state machine, described above. However, merely because a device fails while participating in one state machine does not necessarily entail that it will fail while participating in another state machine. For example, on a single hardware computing device, one software component participating in the system state machine can fail while another software component participating in the quorum selection state machine may continue to operate properly. However, some types of failures, such as hardware or communication failures, can equally affect participation in all state machines. Nevertheless, it can be beneficial to transmit proposals for one state machine to a device even if that device has failed while participating in another state machine. Thus, as shown in FIG. 13a, message 1200 in the quorum selection state machine was sent to device 12 despite the failure of device 12 in the system state machine, as illustrated previously. In the present example, however, device 12 can be experiencing a failure that prevents its participation in both state machines and, consequently, it may not respond to message 1200, as illustrated in FIG. 13b.

Because the exemplary quorum selection state machine illustrated in FIG. 13b comprises five devices, it can tolerate as many as two simultaneous failures. Therefore, even if another device were to fail, the proposal transmitted in message 1200 can still have been selected by a quorum of devices comprising at least three devices. An auxiliary device, like a main device, can also experience failures. For example, as shown in FIG. 13b, device 15 can also be experiencing a failure and, as a result, may not respond to message 1200. Nevertheless, a quorum of devices, comprising devices 11, 13 and 14 are illustrated as having transmitted acceptance messages 1211, 1213 and 1214 to the leader 13 and the leader can, therefore, determine that the function was selected.

Figure 13C:
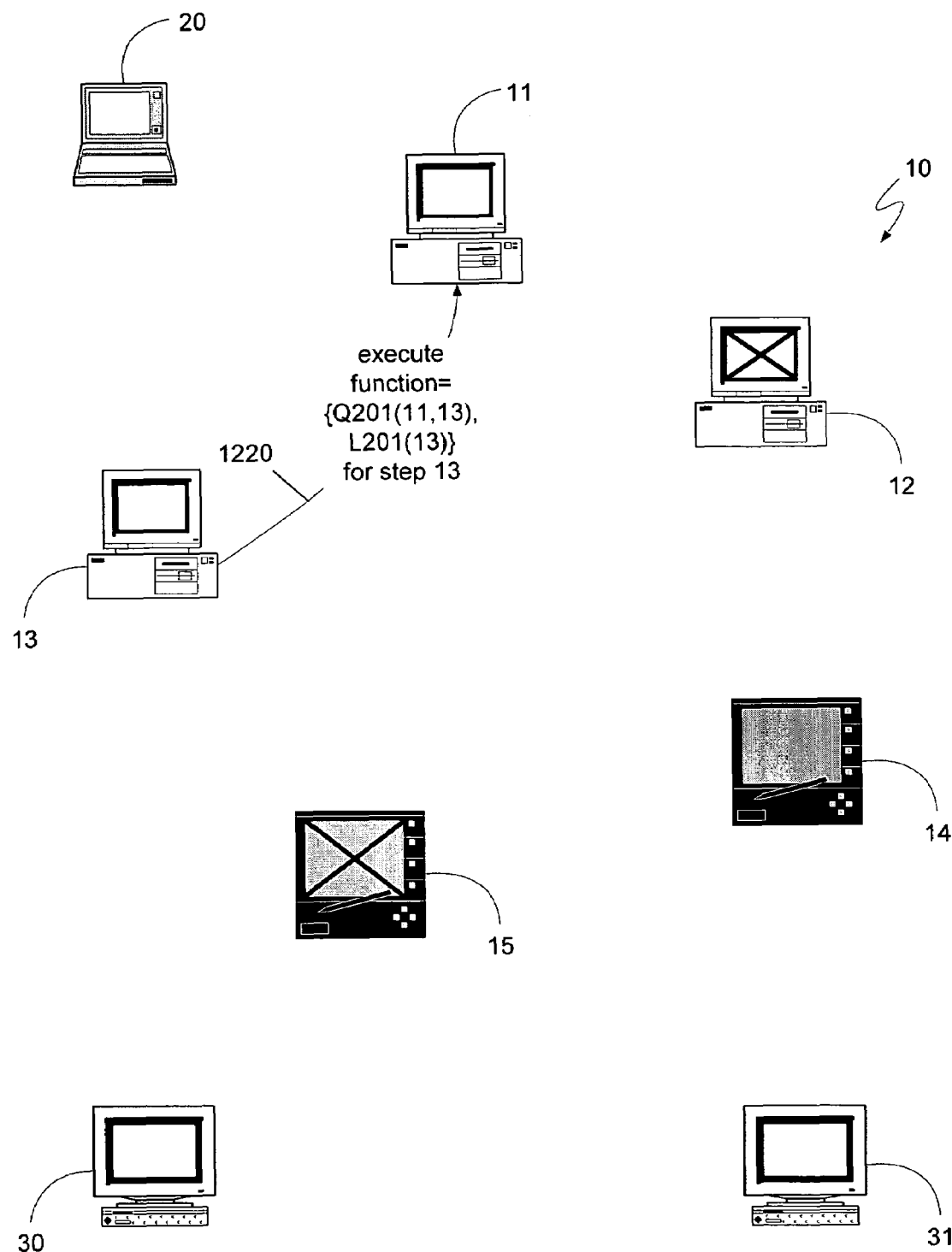

Turning to FIG. 13c, the leader 13 can inform the other computing devices of the selection of a new quorum, the new proposal number the quorum should use, and the leader of the new quorum. Such information can be transmitted in a message 1220 which, although it is shown as being sent only to the operational main computing devices, can also be sent to the auxiliary computing devices to inform them of the selection.

Figure 14A:
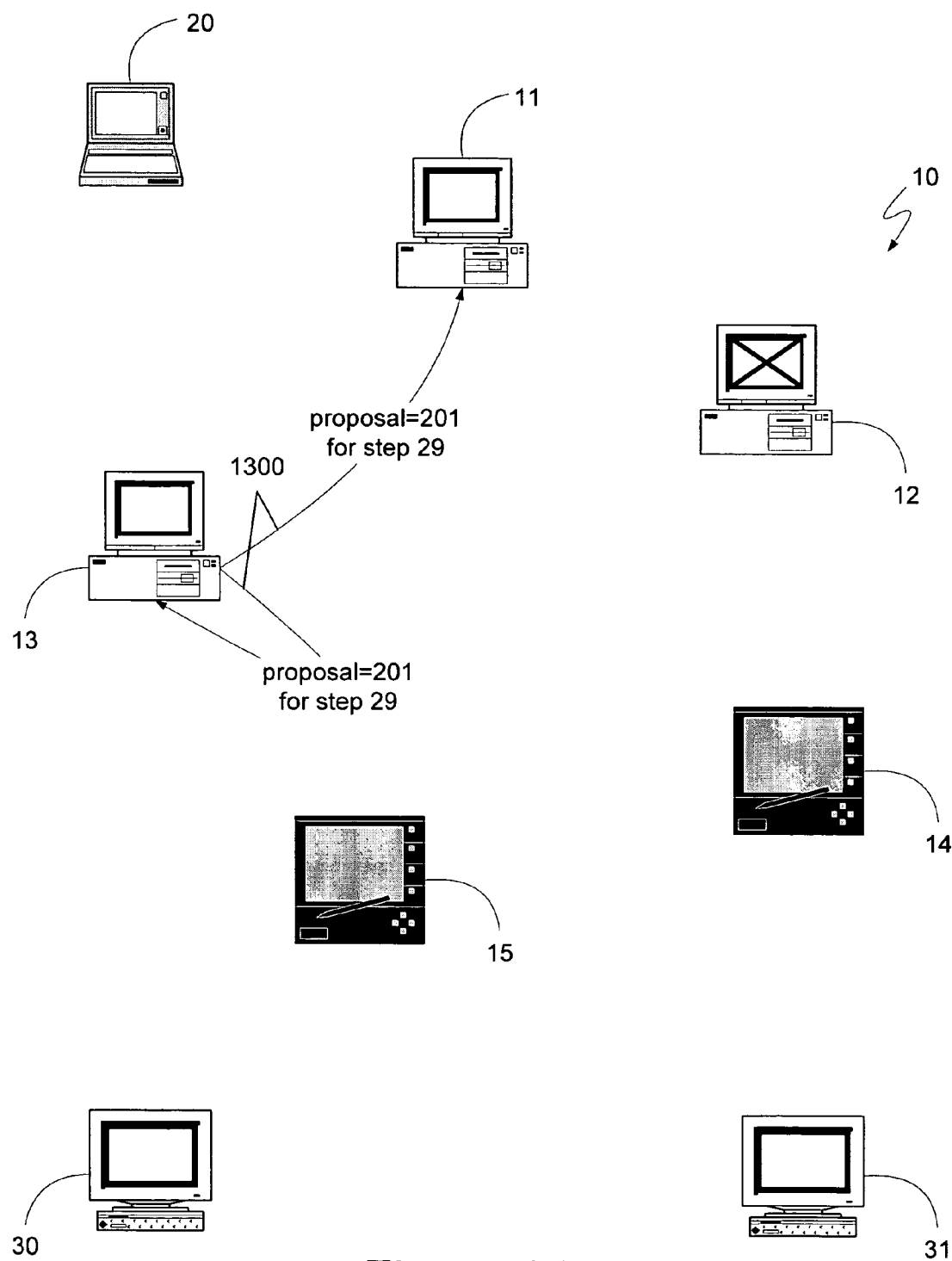
FIGS. 14a-f generally illustrate a still further aspect of the operation of a second multi-phase consensus algorithm using alternative devices contemplated by an embodiment of the present invention.

The selected quorum can then resume operation using the selected leader and the selected proposal number as shown in FIG. 14a. Because a new proposal number has been selected, the leader 13 can learn of prior votes or other known safe proposals by sending a proposal message 1300 to the devices in the selected quorum, namely itself and device 11. The proposal message 1300 can indicate a system step of 29, as no function has yet been decided for step 29 in the illustrative system state machine, since a previous attempt to select a function for step 29 was unsuccessful when device 12 experienced a failure.

Figure 14B:
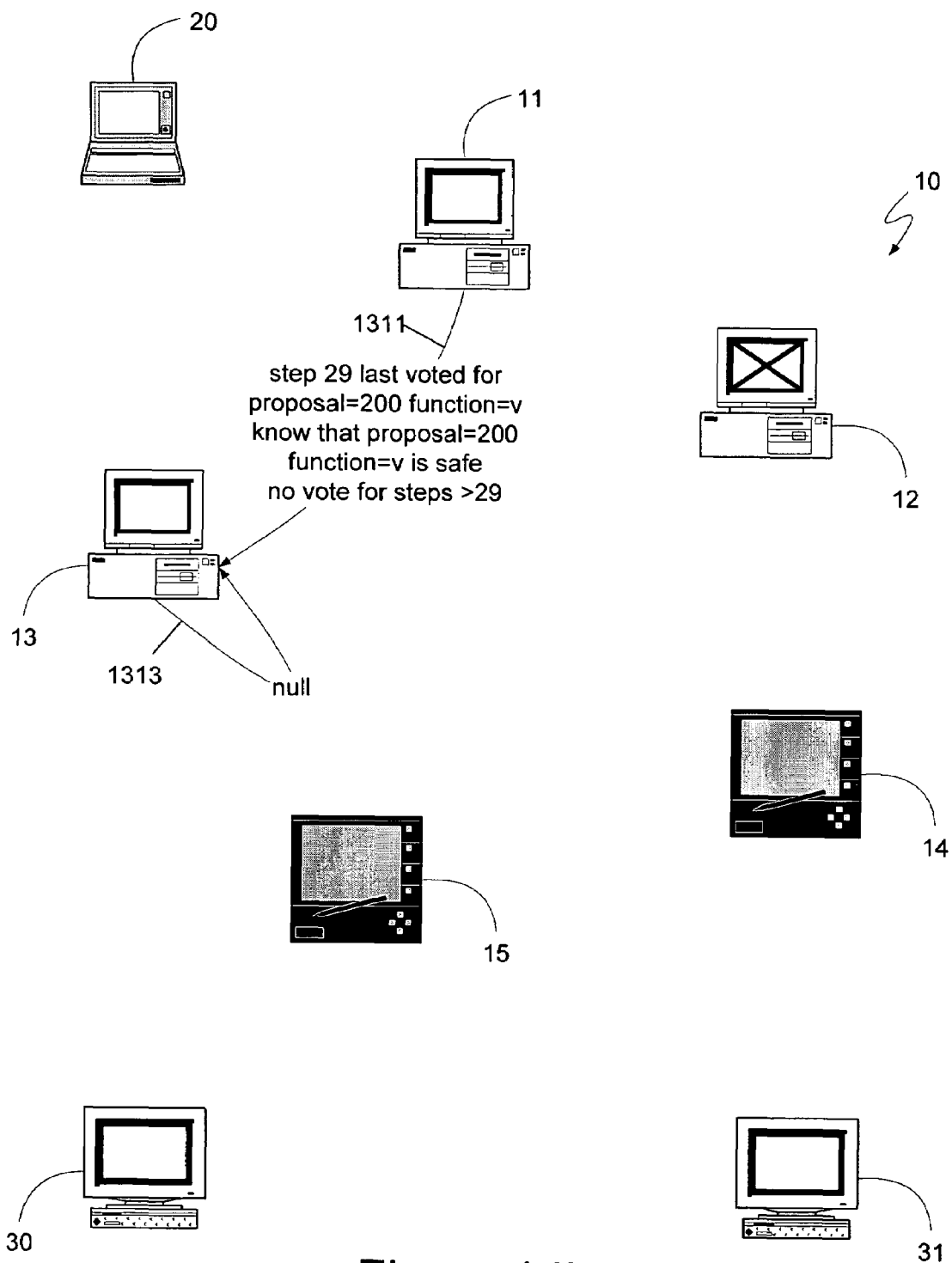

Turning to FIG. 14b, the devices 11 and 13 can respond to the proposal message 1300 with messages 1311 and 1313 providing last vote information and information regarding functions that are known safe. Thus, for example, device 11 can indicate that it last voted for a function represented by the variable "v" having a proposal number of 200, and that it knows that the function "v" is safe at proposal number 200. Device 13, because it could have determined its own last vote information, and any information it had regarding functions that are known to be safe, need not transmit an explicit message containing this information. Therefore, message 1313 does not need to contain any information, as device 13 already has access to its own information.

Figure 14C:
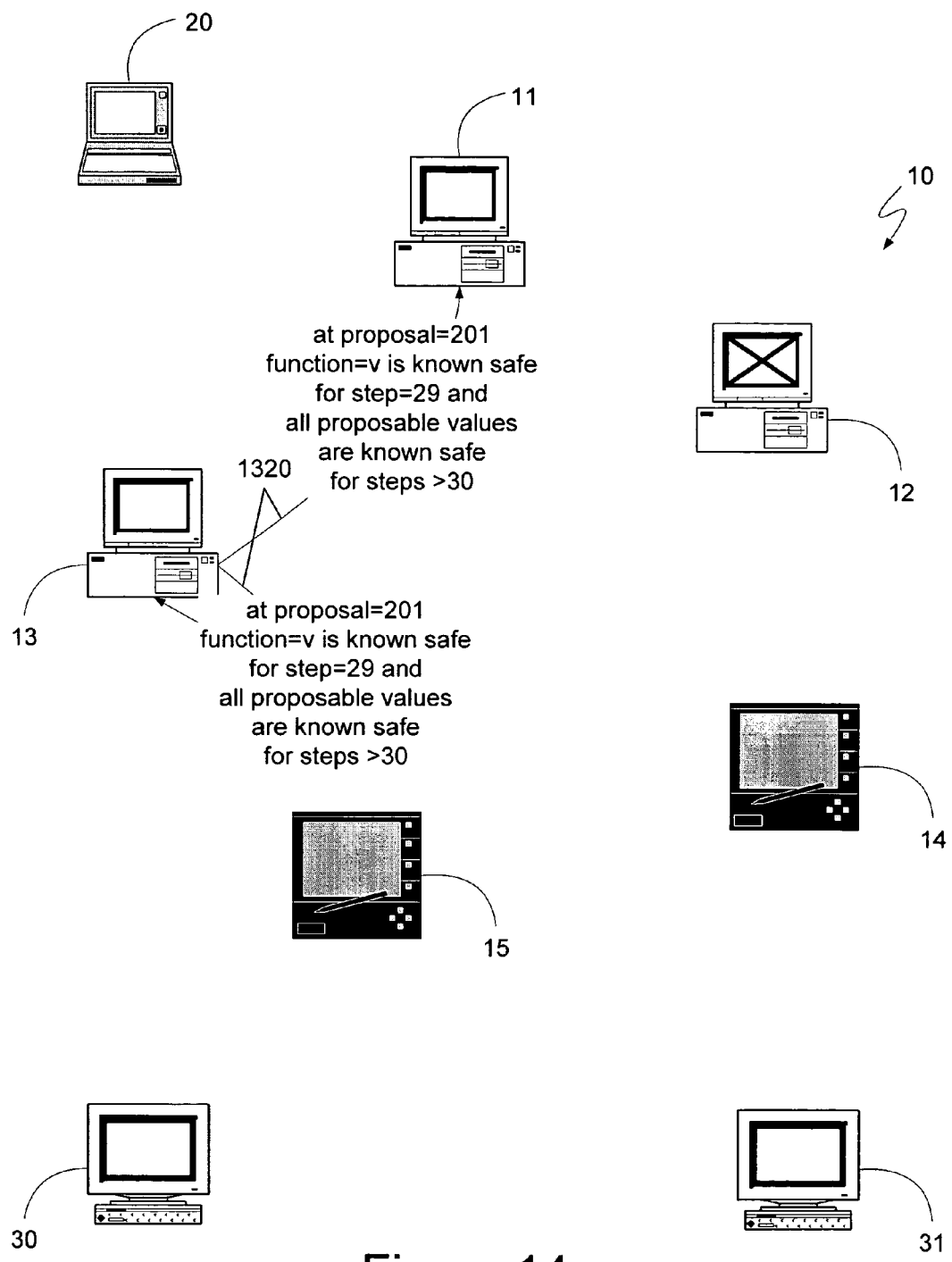

As explained above, the leader can collect the last vote information and the information about functions that are known safe, received in response to the leader's proposal message, and can send a message, such as message 1320 shown in FIG. 14c, that informs the other devices of the quorum about functions that are known safe. For example, because the leader 13 received an indication that function "v" was safe for step 29, and did not receive any information of any other safe functions, the leader can conclude that function "v" is the only safe function at proposal number 220 for step 29. Additionally, because the leader 13 did not receive any information regarding safe functions for steps greater than 29, it can conclude that all proposable functions are safe for all steps greater than 29 and can include this information in message 1320.

As indicated above, it can be important that a distributed computing system execute a requested function, such as a banking withdrawal, only once. Thus, merely because a function was previously voted for by one device does not necessarily mean that the leader must propose that function. Instead, as illustrated, the leader can learn if there are any other safe functions before proposing a function. In such a manner, the leader can attempt to prevent the same function from being proposed and selected more than once. Additionally, unique function identifiers can be used to aid the leader or the other devices, such as by allowing them to detect duplicate functions so that execution of a function can be defined to have no effect if the same function was already executed.

Figure 14D:
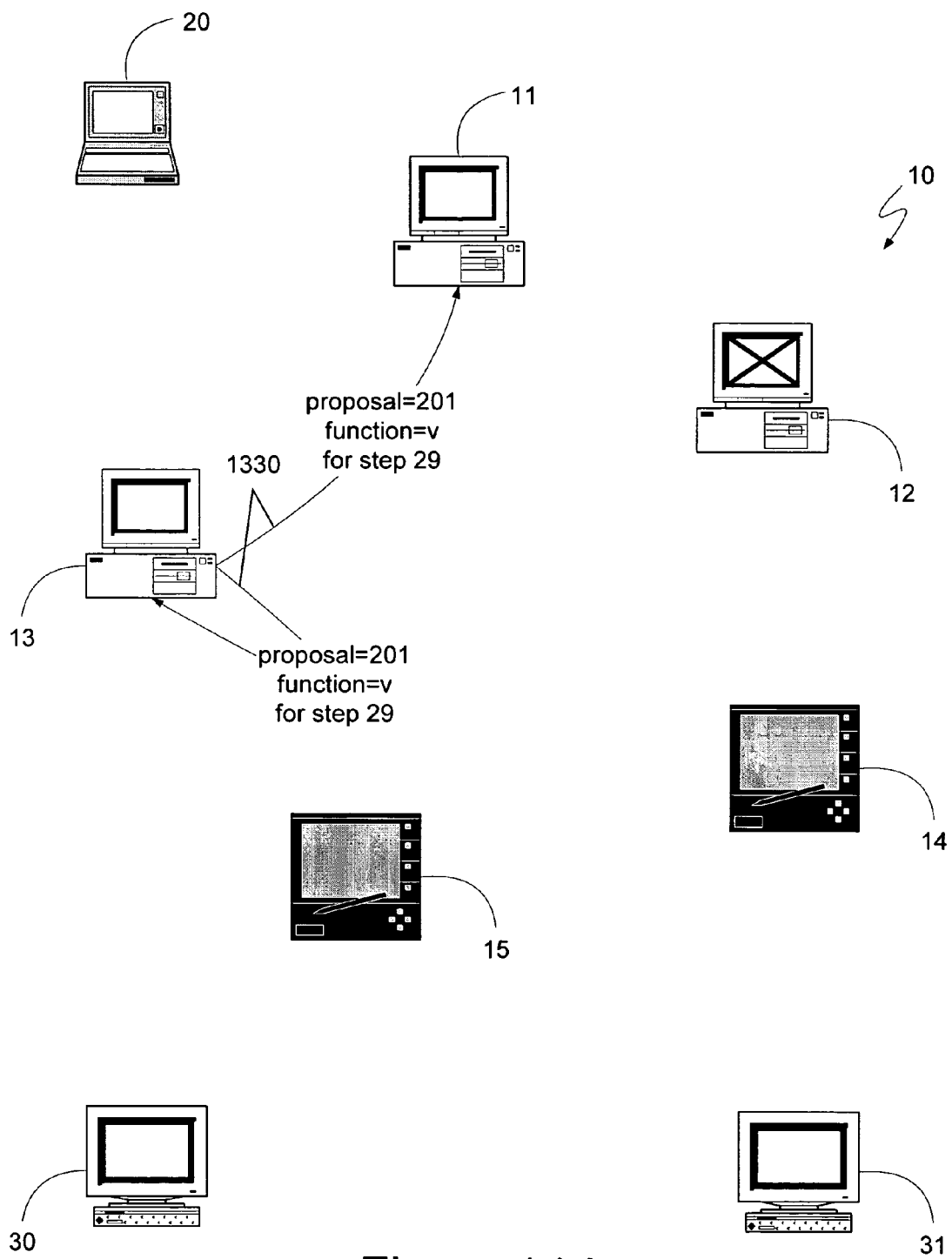

In the same manner as described above, once the leader has disseminated information regarding functions that are known safe, it can proceed to attempt to have the system state machine select proposed functions. Thus, turning to FIG. 14d, the leader 13 is shown sending message 1330 proposing that the system state machine select the function "v" for step 29. Because the function "v" was indicated in message 1320 as the only safe function for step 29, the leader 13 need not wait for a client request, but can propose function "v" on its own and attempt to have it selected. As before, because the quorum has been defined by the quorum selection state machine to not include device 12, the leader 13 need only send messages, such as message 1330, to itself and to device 11.

Figure 14E:
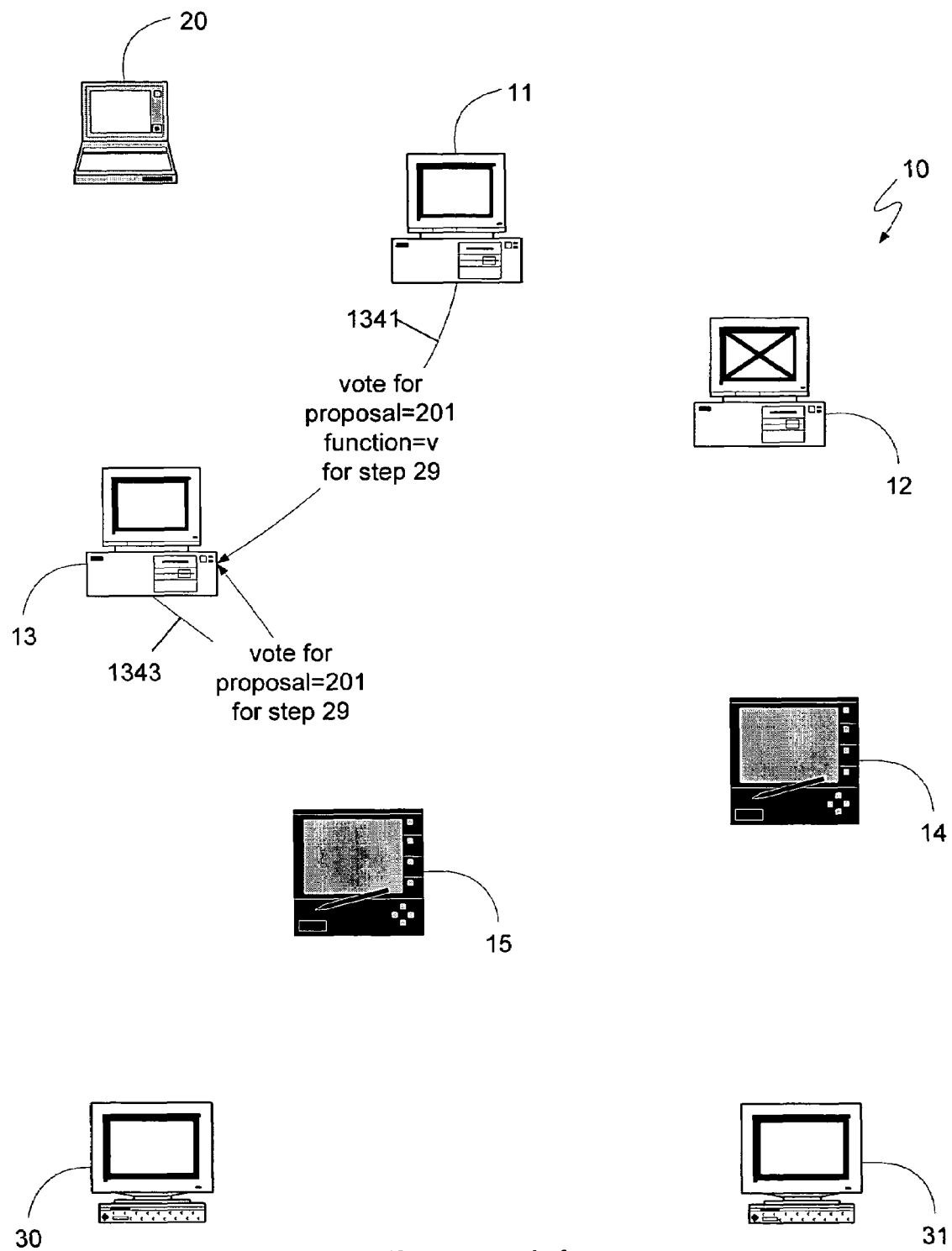
Figure 14F:
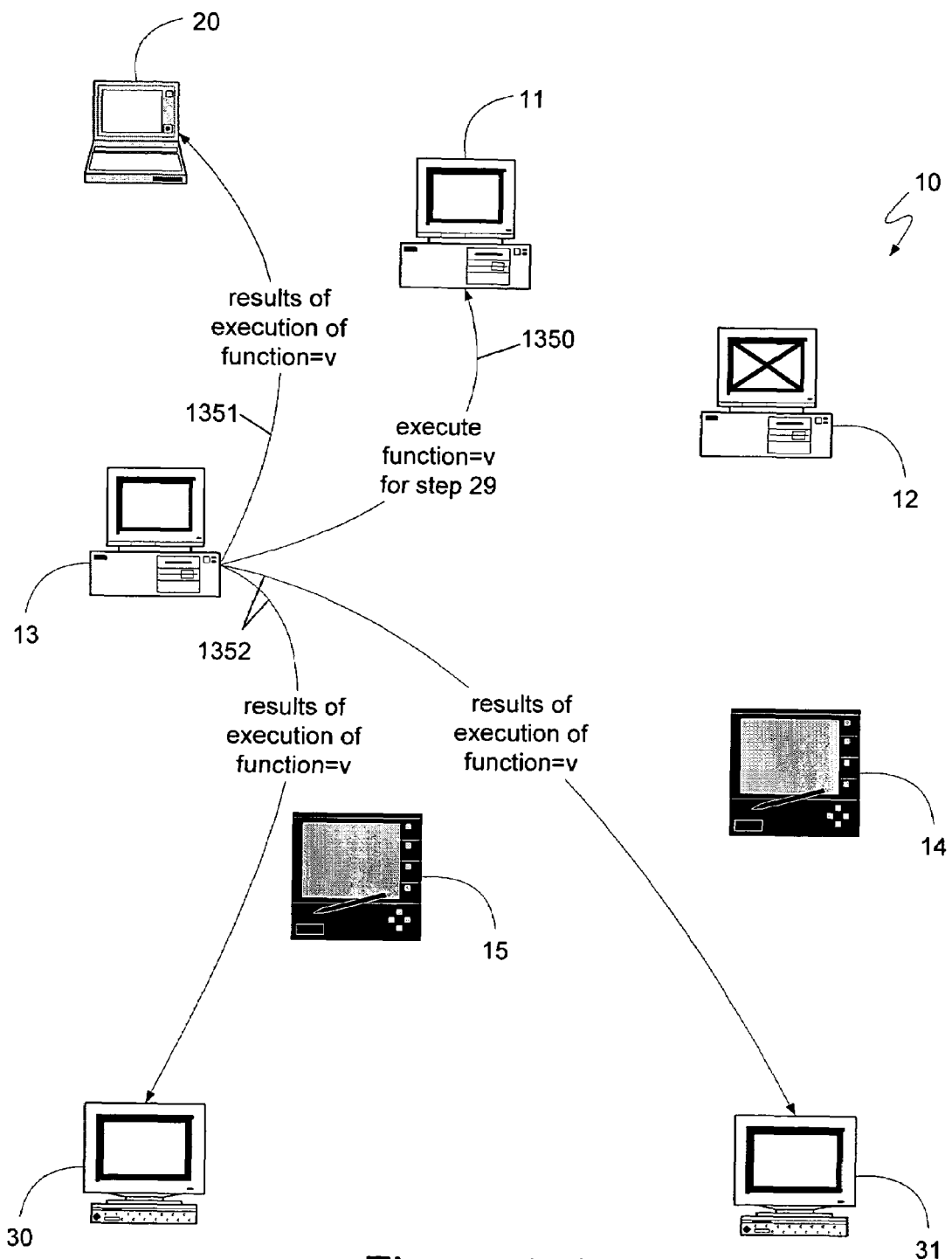

Turning to FIG. 14e, devices 11 and 13 are shown voting for the proposed function "v". Because the quorum defined by the quorum selection state machine comprises devices 11 and 13, each of the devices in the quorum has voted for the function, and the leader 13 can determine that the function was selected. Thus, as shown in FIG. 14f, the leader 13 can, in appropriate circumstances, execute the function and communicate the results of that execution to the client 20 via message 1351 and to other interested devices 30 and 31 via message 1352. Alternatively, if devices 30 and 31 are learner devices, the leader 13 can communicate the fact that function "v" was selected, in an analogous manner to that in which the leader informs device 11 of the selection of the function "v" with message 1350. Therefore, even though the overall distributed computing system 10 comprises five devices, a system state machine quorum can be as few as one device, so long as at least a majority of the devices in the quorum section state machine voted for it.

The operation of the system state machine can continue with devices 11 and 13 in a manner analogous to that described above with reference to FIG. 10. For example, as shown in FIG. 10a, the client 20 can send a request 900 to the leader 13, who can then propose it to the selected quorum via a message, such as message 901. Of course, FIG. 10a differs from the present example, in step number and proposal number. Nevertheless, the selection of the function proposed by the client 20 can proceed in an analogous manner to that illustrated in FIG. 10b, where the leader receives the votes of the devices in the quorum, and in FIG. 10c, where the leader informs other devices of the selection of the requested function, or of the results of the execution of the requested function.

As can be seen from the above examples, the system state machine can tolerate faults by relying on the quorum selection state machine to define a quorum to exclude faulty devices. Consequently, so long as one main computing device remains operational, the quorum selection state machine can define a quorum, namely the one remaining operational main computing device, for the system state machine to use. However, every time that the quorum selection state machine removes a device from the quorum used by the system state machine, the system state machine's ability to tolerate future failures decreases. One solution contemplated by an embodiment of the present invention is to add new or repaired main computing devices to the quorums used by the system state machine. The quorum selection state machine can add a device to a system state machine's quorum in a manner analogous to the removal of a device described in detail above. The newly added device can then learn of previously selected proposals through the standard procedures contemplated by the Paxos algorithm, such as by polling other devices and the like. So long as at least one computing device from a previous quorum remains operational for a sufficient length of time, the newly added device can learn of the previously selected functions, and can achieve a common state.

In addition to adding new or repaired devices, the system state machine's ability to tolerate future faults can be increased by applying a stricter criteria prior to removing a device that is believed to be experiencing a failure. For example, removing a device merely because it has not responded to a leader's message can unnecessarily remove properly functioning devices. Therefore, one mechanism contemplated by an embodiment of the present invention is that an array can be maintained, in the manner described in detail above, to indicate whether one device believes another device is experiencing a failure. Such an array can be maintained by the quorum selection state machine.

Each of the devices implementing the quorum selection state machine can maintain information, described in detail above, that is associated with the Paxos algorithm. In addition, the auxiliary devices can conserve the amount of storage space used by relying on hashes, or only storing the fact that a quorum was selected, in the manner also described in detail above. The main computing devices implementing the system state machine can maintain information regarding each device's last vote, and can also maintain information regarding functions that are known safe. Specifically, each of the main computing devices in the system state machine can maintain information comprising: (1) the highest proposal number for which a device has received or sent a message, (2) the largest proposal number for which the device has cast a vote, (3) the vote information recorded for that proposal number, (4) the largest proposal number for which the device knows of a value that is safe at that proposal number, and (5) the value or set of values that the device knows are safe. As explained above, in some circumstances the largest proposal number for which the device has cast a vote and the vote information recorded for that proposal number can already be encompassed by the value or set of values that the device knows are safe and the largest proposal number for which the device knows of a value that is safe at that proposal number. In such a case, the largest proposal number for which the device has cast a vote and the vote information recorded for that proposal number need not be maintained separately. When a device receives a message with a higher proposal number than any it has received before, such as message 1300, the device can update the vote information for all lower proposal numbers whose corresponding vote information is still an initial value by replacing the initial value with a zero value. In such a manner, a device can more easily determine and respond with information regarding functions that are safe. As indicated above, a device may not be able to change a vote corresponding to a particular proposal number. Vote information, therefore, may be changed from an initial value to another value, but may not be subsequently changed. The vote information, and some or all of the above listed information can be maintained by a device in either volatile storage 130 or non-volatile storage, such as hard disk 141, floppy disk 152, or optical disk 156, shown in FIG. 2.

Modified Paxos Algorithm with Reduced Message Delay

Whether a quorum selection state machine selects the quorum to be used by a system state machine, or whether one quorum selects a set of quorums and then uses a quorum from the selected set, at least two message delays are introduced between the receipt, by a leader device, of a client's request, and the transmission of the results of the client's request by the leader device to the client. Specifically, one message delay is introduced when the leader proposes the function requested by the client to the other devices in the quorum, and a second message delay is introduced when the other devices in the quorum vote for the proposal.

An alternative approach, contemplated by an embodiment of the present invention, can eliminate these message delays by having the clients of the distributed computing system send their requests directly to the devices of a selected quorum, and the devices of the selected quorum can respond directly to the clients. If a client receives a response from all of the devices in the quorum, then it can determine that the requested function was selected. Thus, once a leader device has learned of and completed pending proposals and is merely waiting for a client request, it can, instead, signal to the devices of the quorum that they should treat any requests from the client as proposals from the leader having a determined proposal number. The determined proposal number can be identified as a fast proposal number, signifying that, for the fast proposal number, the devices can vote for proposals received directly from the client. The client can then communicate with the devices of the quorum in a manner analogous to the communication between the leader and the devices described in detail above. As will be known to those skilled in the art, such an approach has been called "Fast Paxos" and is described in co-pending U.S. patent application Ser. No. 10/184,767, filed on Jun. 28, 2002, and entitled "Fast Transaction Commit", the disclosure of which is hereby incorporated by reference in its entirety to further explain or describe any teaching or suggestion contained within the present specification that is consistent with its disclosures.

Allowing clients to communicate directly with the devices of a quorum can result in conflicts where two devices propose different functions at approximately the same time. One solution is to increase the number of devices in a quorum so that any two quorums not only share at least one device, but that they share at least a majority of the devices of the distributed computing system. Therefore, if a sufficient number of main computing devices are present in the distributed computing system, at least one quorum in the set of quorums selected using the above described procedures can have a sufficient number of devices to allow clients to communicate directly with the devices of that quorum, and thereby implement a reduced message delay consensus algorithm, such as Fast Paxos. If a device suffers a failure, or if another main computing device is to be added, a different quorum from the set of quorums, and a different, non-fast proposal number can be used to complete any pending functions and to select a new set of quorums in the manner described in detail above.

Alternatively, because the system state machine is implemented by a quorum, selected by a quorum state machine, that already comprises all of the devices of the system state machine, the number of devices in a quorum does not need to be increased. More specifically, because there are no devices of the system state machine that are not part of the selected quorum, and because each of the devices vote for proposals, conflicting proposals from clients can prevent any proposal from being selected. However, in the event of a conflict, a new, non-fast, proposal number can be used to resolve the conflict. Therefore, a system state machine that seeks to use a reduced message delay consensus algorithm, such as Fast Paxos, can have the quorum selection state machine select, in an analogous manner as was described above, two proposal numbers for one quorum and leader. The first proposal number can be a fast proposal number, and the second proposal number can be a non-fast proposal number. The non-fast proposal number can then be used by the selected quorum and leader to resolve a conflict without involving the quorum selection state machine.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for selecting a value in a distributed computing system comprising one or more main computing devices and one or more auxiliary computing devices, the method comprising the steps of:

proposing a first set of quorums comprising a first preferred quorum comprising all of the operational main computing devices and one or more additional quorums comprising one or more of the one or more main computing devices and one or more of the one or more auxiliary computing devices so that any two quorums in the proposed first set of quorums share at least one computing device;

receiving a first set of vote responses from a first quorum, wherein the first quorum comprises at least one operational main computing device; and if the first set of vote responses indicate that every computing device in the first quorum has voted for the proposed set of quorums:

proposing the value to a second quorum from the first set of quorums;

receiving a second set of vote responses from the second quorum; and determining that the value was selected if the second set of vote responses from the second quorum indicate that every computing device in the second quorum has voted for the value.

2. The method of claim 1, wherein the second quorum is the first preferred quorum from the first set of quorums.

3. The method of claim 1, wherein, if the second set of vote responses from the second quorum indicate that every computing device in the second quorum has not voted for the value, the method further comprises the steps of:

proposing the value to a third quorum that is different than the second quorum, the third quorum being in the first set of quorums;

receiving a third set of vote responses from the third quorum; and determining that the value was selected if any combination of vote responses from the second set of vote responses and the third set of vote responses indicates that every computing device in the third quorum has voted for the value.

4. The method of claim 3, wherein, if the second set of vote responses from the second quorum indicate that every computing device in the second quorum has not voted for the value, the method further comprises the steps of:

determining one or more faulty computing devices in the second quorum; and proposing, to the third quorum, a second set of quorums comprising a second preferred quorum comprising all of the operational main computing devices, and one or more additional quorums comprising one or more of the one or more main computing devices and one or more of the one or more auxiliary computing devices so that any two quorums in the proposed second set of quorums share at least one computing device, and wherein further the second preferred quorum does not include the one or more faulty computing devices.

5. The method of claim 4, wherein the determining the one or more faulty computing devices comprises the steps of:

perceiving a failure of a target computing device;

entering, by performing a state machine command, an indication of the perceived failure of the target computing device into a data structure, the data structure correlating a perceiving computing device and the target computing device; and determining that the target computing device is faulty by reference to the data structure.

6. The method of claim 3, wherein the proposing the value to the third quorum comprises sending a hash of the value to one or more auxiliary computing devices in the third quorum.

7. The method of claim 1, wherein, if the first set of vote responses indicate that every computing device in the first quorum has voted for the proposed set of quorums, the method further comprising the step of: proposing a no-operation value for every system step between a current system step and a future system step at which the first set of quorums becomes effective, wherein the proposed first set of quorums is a current system step value selected for the current system step.

8. The method of claim 1, wherein, if the first set of vote responses indicate that every computing device in the first quorum has voted for the proposed set of quorums, the method further comprising the step of: if the first quorum comprises one or more auxiliary computing devices, informing the one or more auxiliary computing devices that values have been selected for system steps through a future system step at which the first set of quorums becomes effective, thereby enabling the one or more auxiliary computing devices to erase information related to the system steps through the future system step.

9. The method of claim 1, wherein the value is a function to be executed for a system step.

10. The method of claim 1, wherein, if the first set of vote responses indicate that every computing device in the first quorum has voted for the proposed set of quorums, the method further comprising the step of: communicating with the at least one operational main computing device to ensure that the at least one operational main computing device has recorded values selected for system steps through a future system step at which the first set of quorums becomes effective.

11. The method of claim 10, wherein the at least one operational main computing device has recorded values selected for system steps through the future system step if it has recorded a checkpoint state at a checkpoint system step and values selected for system steps from the checkpoint system step through the future system step.

12. The method of claim 1, further comprising the steps of:

proposing a proposal number for system steps larger than a last known system step; and receiving a first set of proposal responses from a first set of computing devices, the first set of proposal responses comprising, for system steps larger than the last known system step, last vote information and prior proposal response information for each computing device in the first set of computing devices.

13. The method of claim 1, wherein, if the first set of vote responses indicate that every computing device in the first quorum has voted for the proposed set of quorums and if the second set of vote responses from the second quorum indicate that every computing device in the second quorum has voted for the value, the method further comprising the steps of:

indicating, to the second quorum, that subsequent values received directly from one or more clients are to be treated as proposed values having a proposal number equivalent to that used to propose the value; and indicating, to the second quorum, that responses to the subsequent values are to be sent to the one or more clients;

wherein the second quorum comprises more computing devices than twice a number of tolerable failures.

14. A computer-readable storage medium having computer-executable instructions for selecting a value in a distributed computing system comprising one or more main computing devices and one or more auxiliary computing devices, the computer-executable instructions performing steps comprising: proposing a first set of quorums comprising a first preferred quorum comprising all of the operational main computing devices and one or more additional quorums comprising one or more of the one or more main computing devices and one or more of the one or more auxiliary computing devices so that any two quorums in the proposed first set of quorums share at least one computing device; receiving a first set of vote responses from a first quorum, wherein the first quorum comprises at least one operational main computing device; and if the first set of vote responses indicate that every computing device in the first quorum has voted for the proposed set of quorums: proposing the value to a second quorum from the first set of quorums; receiving a second set of vote responses from the second quorum; and determining that the value was selected if the second set of vote responses from the second quorum indicate that every computing device in the second quorum has voted for the value.

15. The computer-readable storage medium of claim 14, wherein the second quorum is the first preferred quorum from the first set of quorums.

16. The computer-readable storage medium of claim 14 having further computer-executable instructions for, if the second set of vote responses from the second quorum indicate that every computing device in the second quorum has not voted for the value performing steps comprising: proposing the value to a third quorum that is different than the second quorum, the third quorum being in the first set of quorums; receiving a third set of vote responses from the third quorum; and determining that the value was selected if any combination of vote responses from the second set of vote responses and the third set of vote responses indicates that every computing device in the third quorum has voted for the value.

17. The computer-readable storage medium of claim 16 having further computer-executable instructions for, if the second set of vote responses from the second quorum indicate that every computing device in the second quorum has not voted for the value, performing steps comprising: determining one or more faulty computing devices in the second quorum; and proposing, to the third quorum, a second set of quorums comprising a second preferred quorum comprising all of the operational main computing devices, and one or more additional quorums comprising one or more of the one or more main computing devices and one or more of the one or more auxiliary computing devices so that any two quorums in the proposed second set of quorums share at least one computing device, and wherein further the second preferred quorum does not include the one or more faulty computing devices.

18. The computer-readable storage medium of claim 17, wherein the computer-executable instructions for determining the one or more faulty computing devices comprise computer-executable instructions for performing steps comprising: perceiving a failure of a target computing device; entering, by performing a state machine command, an indication of the perceived failure of the target computing device into a data structure, the data structure correlating a perceiving computing device and the target computing device; and determining that the target computing device is faulty by reference to the data structure.

19. The computer-readable storage medium of claim 16, wherein the computer-executable instructions for proposing the value to the third quorum comprise computer-executable instructions for sending a hash of the value to one or more auxiliary computing devices in the third quorum.

20. The computer-readable storage medium of claim 14 having further computer-executable instructions for, if the first set of vote responses indicate that every computing device in the first quorum has voted for the proposed set of quorums, performing steps comprising: proposing a no-operation value for every system step between a current system step and a future system step at which the first set of quorums becomes effective, wherein the proposed first set of quorums is a current system step value selected for the current system step.

21. The computer-readable storage medium of claim 14 having further computer-executable instructions for, if the first set of vote responses indicate that every computing device in the first quorum has voted for the proposed set of quorums, performing steps comprising: if the first quorum comprises one or more auxiliary computing devices, informing the one or more auxiliary computing devices that values have been selected for system steps through a future system step at which the first set of quorums becomes effective, thereby enabling the one or more auxiliary computing devices to erase information related to the system steps through the future system step.

22. The computer-readable storage medium of claim 14, wherein the value is a function to be executed for a system step.

23. The computer-readable storage medium of claim 22, wherein the function is identified by a unique function identifier.

24. The computer-readable storage medium of claim 14 having further computer-executable instructions for, if the first set of vote responses indicate that every computing device in the first quorum has voted for the proposed set of quorums, performing steps comprising: communicating with the at least one operational main computing device to ensure that the at least one operational main computing device has recorded values selected for system steps through a future system step at which the first set of quorums becomes effective.

25. The computer-readable storage medium of claim 24, wherein the at least one operational main computing device has recorded values selected for system steps through the future system step if it has recorded a checkpoint state at a checkpoint system step and values selected for system steps from the checkpoint system step through the future system step.

26. The computer-readable storage medium of claim 14, having further computer-executable instructions for performing steps comprising: proposing a proposal number for system steps larger than a last known system step; and receiving a first set of proposal responses from a first set of computing devices, the first set of proposal responses comprising, for system steps larger than the last known system step, last vote information and prior proposal response information for each computing device in the first set of computing devices.

27. The computer-readable storage medium of claim 14 having further computer-executable instructions for, if the first set of vote responses indicate that every computing device in the first quorum has voted for the proposed set of quorums and if the second set of vote responses from the second quorum indicate that every computing device in the second quorum has voted for the value, performing steps comprising: indicating, to the second quorum, that subsequent values received directly from one or more clients are to be treated as proposed values having a proposal number equivalent to that used to propose the value; and indicating, to the second quorum, that responses to the subsequent values are to be sent to the one or more clients; wherein the second quorum comprises more computing devices than twice a number of tolerable failures.

28. A main computing device operating as part of a distributed computing system comprising one or more main computing devices and one or more auxiliary computing devices, the main computing device comprising:
  a processing unit performing steps comprising:
    proposing a first set of quorums comprising a first preferred quorum comprising all of the operational main computing devices and one or more additional quorums comprising one or more of the one or more main computing devices and one or more of the one or more auxiliary computing devices so that any two quorums in the proposed first set of quorums share at least one computing device;
    if a first set of vote responses indicate that every computing device in a first quorum has voted for the proposed set of quorums, proposing the value to a second quorum from the first set of quorums; and
    if a second set of vote responses from the second quorum indicate that every computing device in the second quorum has voted for the value, determining that the value was selected; and
  a network interface performing steps comprising:
    receiving the first set of vote responses from the first quorum, wherein the first quorum comprises at least one operational main computing device; and
    receiving a second set of vote responses from the second quorum.

29. The main computing device of claim 28, wherein the second quorum is the first preferred quorum from the first set of quorums.

30. The main computing device of claim 28, wherein the processing unit, if the second set of vote responses from the second quorum indicate that every computing device in the second quorum has not voted for the value, performs additional steps comprising: proposing the value to a third quorum that is different than the second quorum, the third quorum being in the first set of quorums and determining that the value was selected if any combination of vote responses from the second set of vote responses and a third set of vote responses from the third quorum indicates that every computing device in the third quorum has voted for the value; and wherein further the network interface, if the second set of vote responses from the second quorum indicate that every computing device in the second quorum has not voted for the value, performs additional steps comprising: receiving the third set of vote responses from the third quorum.

31. The main computing device of claim 28, wherein the processing unit, if the second set of vote responses from the second quorum indicate that every computing device in the second quorum has not voted for the value, performs additional steps comprising: determining one or more faulty computing devices in the second quorum; and proposing, to the third quorum, a second set of quorums comprising a second preferred quorum comprising all of the operational main computing devices, and one or more additional quorums comprising one or more of the one or more main computing devices and one or more of the one or more auxiliary computing devices so that any two quorums in the proposed second set of quorums share at least one computing device, and wherein further the second preferred quorum does not include the one or more faulty computing devices.

32. The main computing device of claim 31, wherein the determining the one or more faulty computing devices comprises:
  perceiving a failure of a target computing device;
  entering, by performing a state machine command, an indication of the perceived failure of the target computing device into a data structure, the data structure correlating a perceiving computing device and the target computing device; and
  determining that the target computing device is faulty by reference to the data structure.

33. The main computing device of claim 30, wherein the proposing the value to the third quorum comprises utilizing the network interface to send a hash of the value to one or more auxiliary computing devices in the third quorum.

34. The main computing device of claim 28, wherein the processing unit performs additional steps comprising: if the first set of vote responses indicate that every computing device in the first quorum has voted for the proposed set of quorums, proposing a no-operation value for every system step between a current system step and a future system step at which the first set of quorums becomes effective, wherein the proposed first set of quorums is a current system step value selected for the current system step.

35. The main computing device of claim 28, wherein the network interface performs additional steps comprising: if the first set of vote responses indicate that every computing device in the first quorum has voted for the proposed set of quorums and if the first quorum comprises one or more auxiliary computing devices, transmitting to the one or more auxiliary computing devices an indication that values have been selected for system steps through a future system step at which the first set of quorums becomes effective, thereby enabling the one or more auxiliary computing devices to erase information related to the system steps through the future system step.

36. The main computing device of claim 28, wherein the value is a function to be executed for a system step.

37. The main computing device of claim 28, wherein the processing unit performs additional steps comprising: if the first set of vote responses indicate that every computing device in the first quorum has voted for the proposed set of quorums, utilizing the network interface to communicate with the at least one operational main computing device to ensure that the at least one operational main computing device has recorded values selected for system steps through a future system step at which the first set of quorums becomes effective.

38. The main computing device of claim 28, wherein the processing unit performs additional steps comprising: proposing a proposal number for system steps larger than a last known system step; and wherein further the network interface performs additional steps comprising: receiving a first set of proposal responses from a first set of computing devices, the first set of proposal responses comprising, for system steps larger than the last known system step, last vote information and prior proposal response information for each computing device in the first set of computing devices.

39. The main computing device of claim 28, wherein the processing unit performs additional steps comprising: if the first set of vote responses indicate that every computing device in the first quorum has voted for the proposed set of quorums and if the second set of vote responses from the second quorum indicate that every computing device in the second quorum has voted for the value, utilizing the network interface to indicate to the second quorum that subsequent values received directly from one or more clients are to be treated as proposed values having a proposal number equivalent to that used to propose the value and that responses to the subsequent values are to be sent to the one or more clients, wherein the second quorum comprises more computing devices than twice a number of tolerable failures.

* * * * *